(12) United States Patent
Ishikawa et al.

(10) Patent No.: US 8,327,825 B2
(45) Date of Patent: Dec. 11, 2012

(54) CONTROL APPARATUS FOR INTERNAL COMBUSTION ENGINE

(75) Inventors: Shinichi Ishikawa, Takanezawa-machi (JP); Kazuhito Tokugawa, Takanezawa-machi (JP)

(73) Assignee: Keihin Corporation, Shinjuku-Ku, Tokyo (JP)

( * ) Notice: Subject to any disclaimer, the term of this patent is extended or adjusted under 35 U.S.C. 154(b) by 370 days.

(21) Appl. No.: 12/702,341

(22) Filed: Feb. 9, 2010

(65) Prior Publication Data

US 2010/0212633 A1  Aug. 26, 2010

(30) Foreign Application Priority Data

Feb. 20, 2009  (JP) ................. 2009-037460
Feb. 20, 2009  (JP) ................. 2009-037461
Mar. 9, 2009  (JP) ................. 2009-055422
Mar. 9, 2009  (JP) ................. 2009-055423

(51) Int. Cl.
  *F02P 5/04*  (2006.01)
  *F02P 5/00*  (2006.01)
(52) U.S. Cl. .............. 123/406.23; 123/406.35
(58) Field of Classification Search ........... 123/406.2, 123/406.23, 406.35, 406.58, 406.59, 334; 701/114
See application file for complete search history.

(56) References Cited

U.S. PATENT DOCUMENTS

| | | | | |
|---|---|---|---|---|
| 5,588,409 A | * | 12/1996 | Mizuno et al. | 123/339.11 |
| 6,044,807 A | * | 4/2000 | Hata | 123/41 E |
| 7,059,300 B2 | * | 6/2006 | Ikeda | 123/406.55 |
| 7,451,739 B2 | * | 11/2008 | Yasui et al. | 123/406.23 |
| 2005/0139194 A1 | * | 6/2005 | Ikeda | 123/406.55 |
| 2007/0235007 A1 | * | 10/2007 | Yasui et al. | 123/406.23 |
| 2009/0064966 A1 | * | 3/2009 | Nakasaka | 123/339.11 |

FOREIGN PATENT DOCUMENTS

| | | |
|---|---|---|
| JP | 1986-58683 | 4/1986 |
| JP | 62-186063 | 8/1987 |
| JP | 63-277861 | 11/1988 |
| JP | 01-232169 | 9/1989 |

(Continued)

OTHER PUBLICATIONS

Notification of Grounds for Rejection from the Japanese Patent Office, Japanese Patent Appl. No. JP2009-037460, Jul. 25, 2012, 5 pages including English translation.

(Continued)

*Primary Examiner* — Mahmoud Gimie
(74) *Attorney, Agent, or Firm* — Lau & Associates

(57) ABSTRACT

In an apparatus for controlling an internal combustion engine mounted on a vehicle, comprising an engine speed detector that detects speed of the engine, an ignition timing calculator that calculates an ignition timing of the engine based on at least the detected engine speed, a load detector that detects load in a compression stroke of the engine, and an ignition controller that controls the ignition timing to be the calculated timing, and controls the ignition timing to be a retarded timing than the calculated timing when the detected load is equal to or greater than a threshold value. With this, it becomes possible to avoid the unnecessary decrease of engine output which adversely affects driving feel of the operator, and effectively prevent the knocking and kickback from occurring.

9 Claims, 32 Drawing Sheets

FOREIGN PATENT DOCUMENTS

| | | |
|---|---|---|
| JP | 1990-19874 | 2/1990 |
| JP | 2002-004992 | 1/2002 |
| JP | 2005-220866 | 8/2005 |
| JP | 2006-063971 | 3/2006 |
| JP | 2006-207565 | 8/2006 |
| JP | 2006-274998 | 10/2006 |
| JP | 2008-014287 | 1/2008 |

OTHER PUBLICATIONS

Notification of Grounds for Rejection from the Japanese Patent Office, Japanese Patent Appl. No. JP2009-037461, Jul. 23, 2012, 3 pages including English translation.

* cited by examiner

CONTROL APPARATUS FOR INTERNAL COMBUSTION ENGINE

BACKGROUND OF THE INVENTION

1. Field of the Invention

This invention relates to a control apparatus for an internal combustion engine.

2. Description of the Related Art

When an internal combustion engine is operated at low speed such as idle speed, abrupt opening of a throttle valve of an air intake pipe may cause the knocking and starter pedal kickback (hereinafter called "kickback") induced by reverse rotation of a crankshaft which occurs because air-fuel mixture burns before a piston passes the top dead center (TDC). Several techniques have been proposed for preventing such the kickback, etc., from occurring.

For example, it is known that, when a change amount of throttle opening is at or above a predetermined value, the ignition timing is retarded so as not to burn air-fuel mixture before a piston passes the TDC, as taught by Japanese Laid-Open Patent Application Nos. 2006-63971 ('971) and Hei 1(1996)-232169 ('169). Also, Japanese Laid-Open Patent Application No. 2006-274998 ('998) discloses a technique to detect engine speed of immediately before igniting, determine that the kickback likely occurs when the engine speed is decreased, and retard the ignition timing.

However, since the techniques in '971 and '169 are configured to retard the ignition timing when the change amount is at or above the predetermined value, the ignition timing is retarded even when the throttle valve is abruptly opened not in the intake stroke but in another stroke, i.e., even when the intake air is not increased and a compression load in the compression stroke is not increased. In this case, the engine output is unnecessarily decreased and it may adversely affect driving feel of the operator of the vehicle on which the engine is mounted.

Also, in the technique in '998 configured to retard the ignition timing to correspond to the engine speed of immediately before the ignition, the more the ignition timing is advanced relative to the TDC, the more it becomes difficult to accurately detect the decrease in the engine speed of immediately before reaching the TDC. Therefore, the kickback cannot be effectively prevented.

Further, in the case that the ignition is conducted when the forward rotation of a crankshaft is reversed, a reverse rotation load may affect the crankshaft, etc., and result in a damage of an engine body or the like. Japanese patent No. 2780257 discloses a technique to cope with this problem by disabling the ignition of the engine when the reverse of crankshaft rotation is detected.

In order to restart the engine after the ignition is disabled as above, the disabled condition has to be canceled and the cancellation is usually done at the time when the engine, precisely the crankshaft is stopped. A configuration to cancel the disabled condition after the elapse of a certain period of time after the ignition is disabled, is taught by Japanese Laid-Open Patent Application No. 2005-220866 ('866).

However, when, for example, the driver (operator) restarts the engine by manipulating a starter motor (or continuously manipulating a starter lever or kick starter pedal in the case of a motorcycle) before the engine, precisely the crankshaft is completely stopped, the engine can not be started because the ignition remains disabled. It is disadvantageous.

Even when the configuration set out in '866 is applied, the crankshaft is possibly still reversely rotated after the elapse of the certain period of time. The ignition after canceling the disabled condition under this circumstance may result in a damage of an engine body or the like, as described above.

SUMMARY OF THE INVENTION

A first object of this invention is therefore to overcome the foregoing drawbacks by providing a control apparatus for an internal combustion engine that can avoid the unnecessary decrease of engine output which adversely affects driving feel of the operator, and effectively prevent the knocking and kickback from occurring.

In order to achieve the first object, this invention provides an apparatus for controlling an internal combustion engine mounted on a vehicle, comprising: an engine speed detector that detects speed of the engine; an ignition timing calculator that calculates an ignition timing of the engine based on at least the detected engine speed; a load detector that detects load in a compression stroke of the engine; and an ignition controller that controls the ignition timing to be the calculated timing, and controls the ignition timing to be a retarded timing than the calculated timing when the detected load is equal to or greater than a threshold value.

A second object of this invention is therefore to overcome the foregoing drawbacks by providing a control apparatus for an internal combustion engine that can disable the ignition when a crankshaft is reversely rotated and cancel the disabled condition at the appropriate timing, thereby improving the restart performance.

In order to achieve the first object, this invention provides an apparatus for controlling an internal combustion engine mounted on a vehicle, comprising: a crank angle signal outputter that outputs a crank angle signal at every predetermined crank angle of a crankshaft of the engine; an AC generator that generates AC voltage by being driven by rotation of the crankshaft; a polarity determiner that determines a polarity of the AC voltage from the AC generator when the crank angle signal is outputted; a crankshaft rotation direction determiner that compares periods of the determined polarities of the AC voltage with forward rotation polarity periods which are exhibited when the crankshaft is rotated forward, and determines that the crankshaft is rotated forward when the periods of the determined polarities are identical with the forward rotation polarity periods and that the crankshaft is rotated reversely when they are not identical; and an ignition controller that controls an ignition timing and has an ignition disabler that disables an ignition of the engine when reverse rotation of the crankshaft is determined and cancels the disabled condition of the ignition of the engine when the periods of the determined polarities are identical with the forward rotation polarity periods after the reverse rotation of the crankshaft is determined.

BRIEF DESCRIPTION OF THE DRAWINGS

The above and other objects and advantages of the invention will be more apparent from the following description and drawings in which.

DETAILED DESCRIPTION OF THE PREFERRED EMBODIMENTS

A control apparatus for an internal combustion engine according to preferred embodiments of the present invention will now be explained with reference to the attached drawings.

Figure 1:
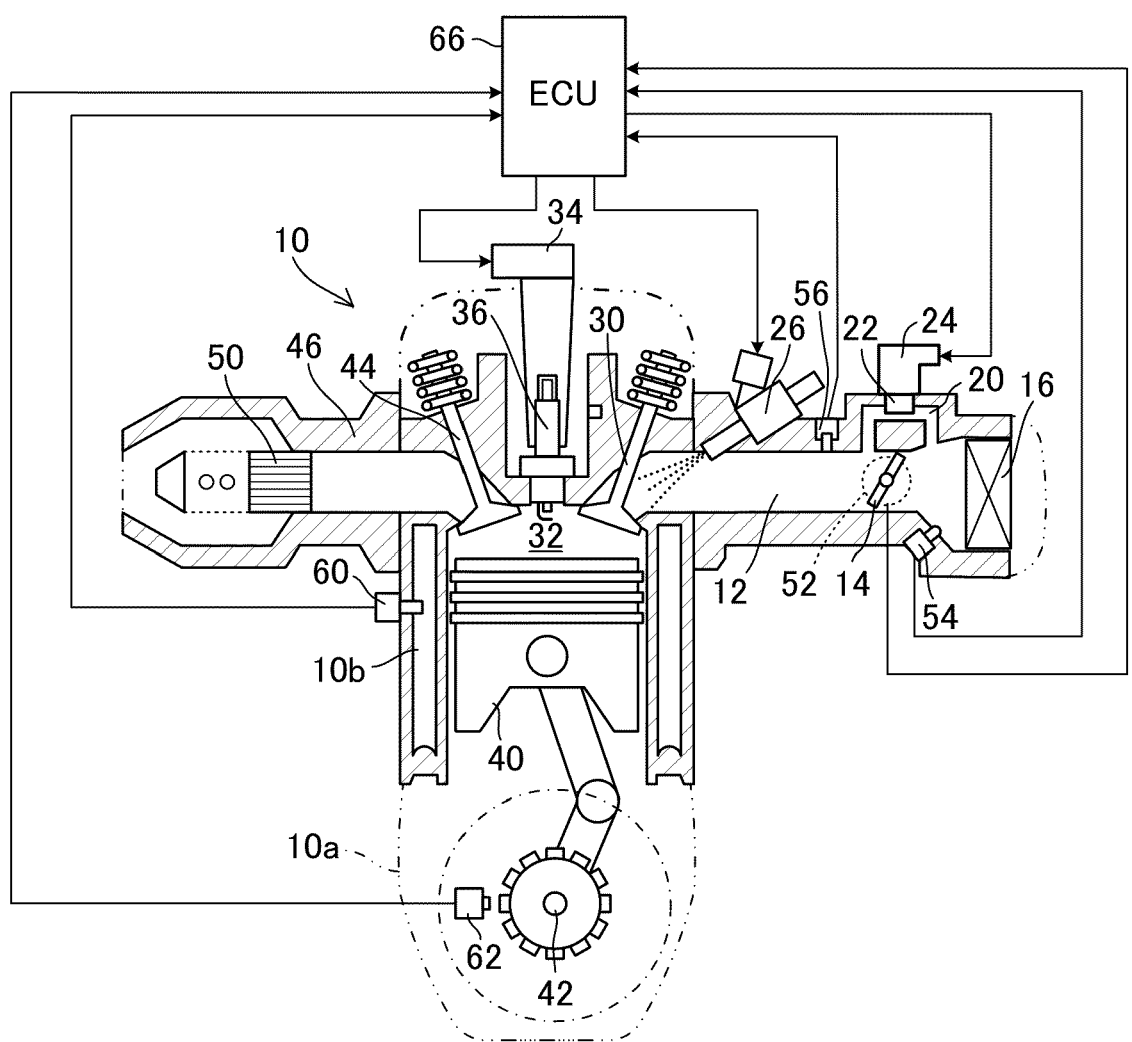
FIG. 1 is an overall view schematically showing a control apparatus for an internal combustion engine according to a first embodiment of this invention.

FIG. 1 is an overall view schematically showing a control apparatus for an internal combustion engine according to a first embodiment of this invention.

In FIG. 1, reference numeral 10 designates an internal combustion engine 10 mounted on a vehicle (e.g., a motorcycle; not shown). The engine 10 is a 4-cycle, single-cylinder, water-cooled gasoline engine having a displacement of 250 cc or thereabout. Reference numeral 10a designates a crank case of the engine 10.

A throttle valve 14 is installed in an intake pipe 12 of the engine 10. The throttle valve 14 is mechanically connected via a throttle wire (not shown) to an accelerator or throttle grip (not shown) provided at a handlebar of the vehicle to be manually operable by the operator, and is opened and closed in accordance with an amount of manipulation of the accelerator to regulate the flow rate of air sucked in through an air cleaner 16 and flowing through the intake pipe 12 into the engine 10. The opening of the throttle valve 14 is positioned at idle opening (fully-opened) position when the accelerator is not operated.

The intake pipe 12 is connected to a bypass 20 interconnecting the upstream side and downstream side of the throttle valve 14 to make the air flow circumvent the throttle valve 14. An idle speed control valve (ISC valve) 22 is installed at the bypass 20 to regulate the flow rate of air flowing through the bypass 20, thereby controlling the idle engine speed. The ISC valve 22 is operated by a stepper motor 24.

An injector 26 is installed downstream of the throttle valve 14 at the intake pipe 12 for injecting gasoline fuel into the intake air regulated by the throttle valve 14 and ISC valve 22. The injected fuel mixes with intake air to form air-fuel mixture that flows into a combustion chamber 32 when an intake valve 30 opens.

The air-fuel mixture flowing into the combustion chamber 32 is ignited to burn by a spark discharge from a spark plug 36 supplied with high voltage from an ignition coil 34, thereby driving a piston 40 downward in FIG. 1 to rotate a crankshaft 42. When an exhaust valve 44 opens, the exhaust gas produced by the combustion passes through an exhaust pipe 46. A catalytic converter 50 is installed at the exhaust pipe 46 for removing harmful components of the exhaust gas. The exhaust gas purified by the catalytic converter 50 further flows to be discharged outside the engine 10.

A throttle opening sensor 52 constituted of a potentiometer is installed near the throttle valve 14 and produces an output or signal indicative of the opening TH of the throttle valve 14. An intake air temperature sensor 54 installed upstream of the throttle valve 14 in the intake pipe 12 produces an output or signal corresponding to the temperature TA of intake air and an absolute pressure sensor 56 installed downstream of the throttle valve 14 produces an output or signal indicative of absolute pressure (intake pressure) PMB in the intake pipe 22.

A coolant temperature sensor 60 is attached to a coolant passage 10b of a cylinder block of the engine 10 and produces an output or signal corresponding to the temperature TW of the engine 10 (engine coolant temperature). A crank angle sensor 62 installed near the crankshaft 42 of the engine 10 produces an output or signal indicative of the crank angle position (piston position).

Figure 2:
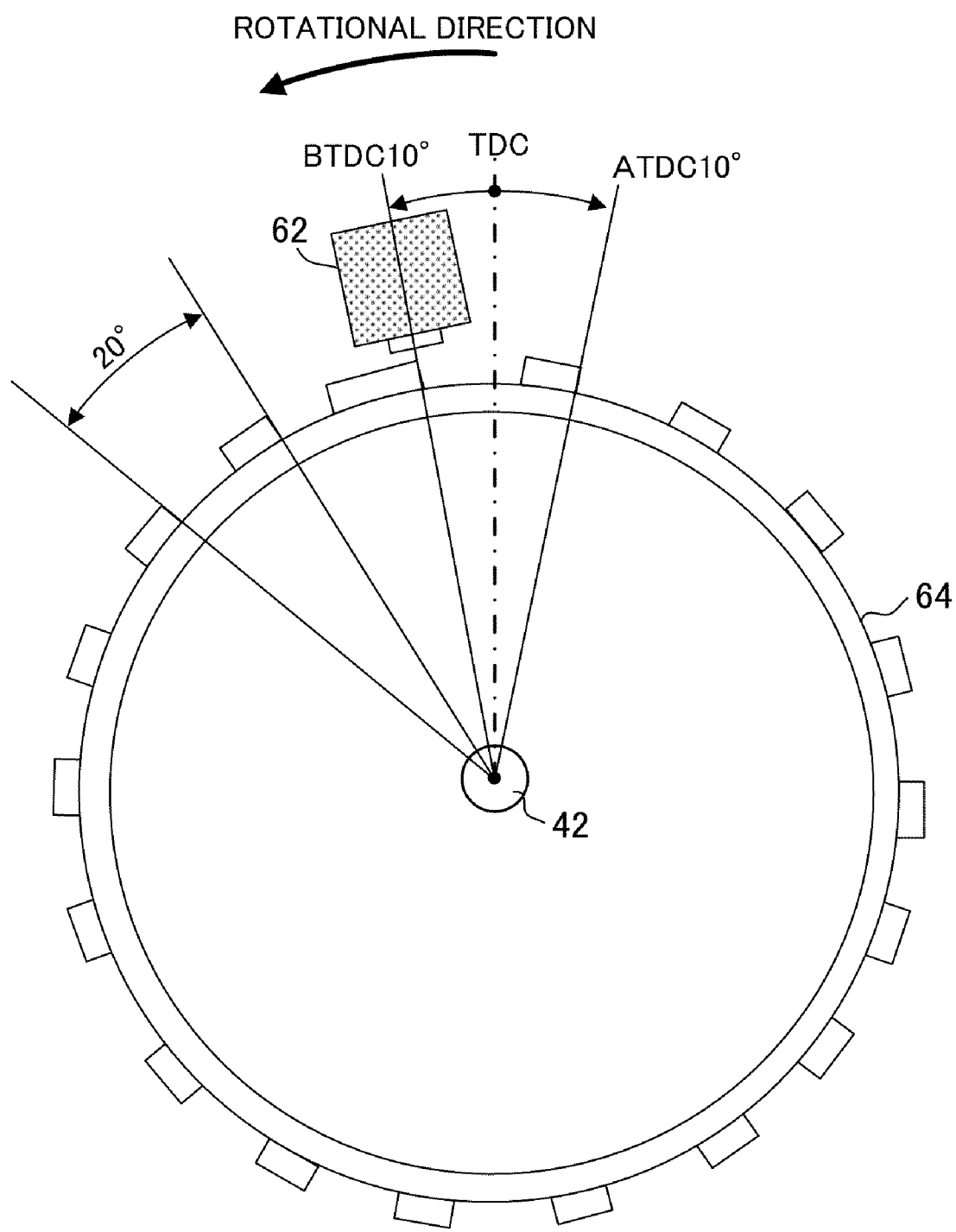
FIG. 2 is an explanatory view for explaining a crank angle detection process of a crank angle sensor shown in FIG. 1.

FIG. 2 is an explanatory view for explaining a crank angle detection process of the crank angle sensor 62.

As shown in FIG. 2, the crank angle sensor 62 is positioned to face a timing rotor 64 that is connected to the crankshaft 42 to be rotated in association therewith. The crank angle sensor 62 comprising an electromagnetic pickup sensor is fastened on a wall surface (static position) of the crank case 10a. A plurality of, i.e., eighteen magnetic projections are installed at predetermined interval on the circumference of the timing rotor 64. Specifically, the rear ends of the projections are positioned at equal angular intervals (20 degrees) in the rotational direction of the rotor 64. One of the projections is a reference projection used for detecting a reference angle position. The reference projection is formed so that the length of its front end to rear end is longer than that of each of the other projections, and the rear end is positioned at 10 degrees before the TDC (BTDC10°; crank angle reference position). The crank angle sensor 62 detects pulse signals corresponding to the projections, which are produced in accordance with the rotation of the timing rotor 64, for detecting the crank angle.

Eighteen crank angle positions for one rotation (360° CA) of the crankshaft 42 are designated by 18 numbers (CALSTG) of 0 to 17 with a position at 10 degrees after the TDC (ATDC10°) as 0. As a result, the crank angle position (piston position) can be determined by referring to the number (CALSTG).

Following to determination of strokes of the engine operation, thirty-six crank angle positions for two rotations (720° CA) of the crankshaft 42 are designated by 36 numbers (STAGE) of 0 to 35 with a position at 10 degrees after the bottom dead center or BDC (ABDC10°) as 0. As a result, the intake stroke, compression stroke, expansion stroke and exhaust stroke can be determined by referring to the number (STAGE). Specifically, the numbers 26 to 35 correspond to the intake stroke, the numbers 0 to 8 the compression stroke, the numbers 9 to 17 the expansion stroke, and the numbers 18 to 25 the exhaust stroke.

The explanation of FIG. 1 is resumed. The outputs from the throttle opening sensor 52 and other sensors are sent to an electronic control unit (ECU) 66.

Figure 3:
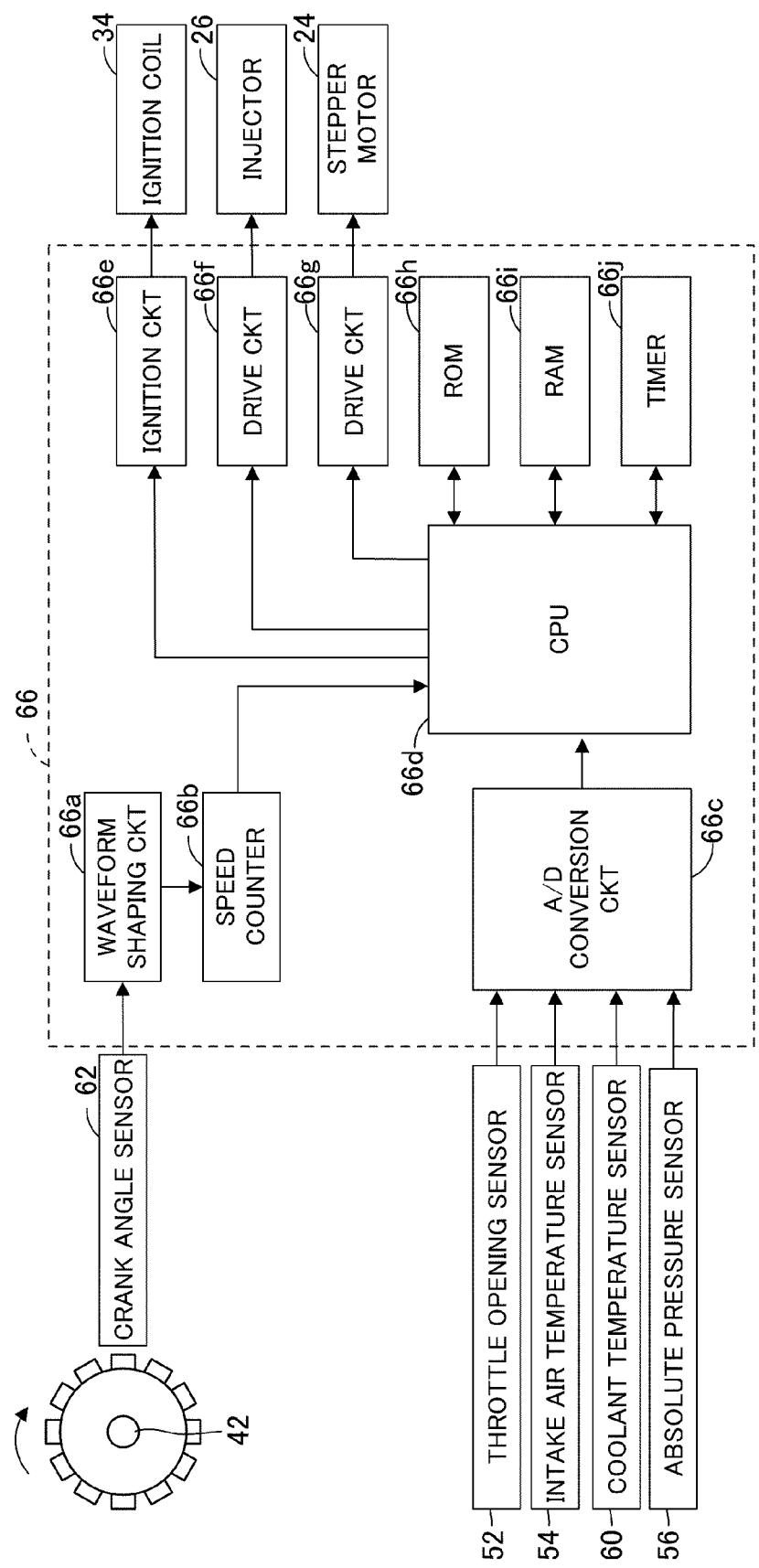
FIG. 3 is a block diagram showing an overall configuration of an electronic control unit shown in FIG. 1.

FIG. 3 is a block diagram showing an overall configuration of the ECU 66.

The ECU 66 comprises a microcomputer having a waveform shaping circuit 66a, speed counter 66b, A/D conversion circuit 66c, CPU 66d, ignition circuit 66e, two drive circuits 66f and 66g, ROM 66h, RAM 66i and timer 66j.

The waveform shaping circuit 66a waveform-shapes outputs (signal waveform) from the crank angle sensor 62 into pulse signals to be outputted to the speed counter 66b. The speed counter 66b counts the inputted pulse signals and sends signals indicative of engine speed NE and the foregoing number (CALSTG, STAGE) representing the crank angle to the CPU 66d. The A/D conversion circuit 66c receives the outputs of the sensors and converts an analog signal value to a digital signal value to be outputted to the CPU 66d.

Based on the inputted signals, the CPU 66d carries out a calculation in accordance with a program stored in the ROM 66h, and it sends an ignition output signal to the ignition circuit 66e so as to control current supply of the ignition coil 34 to operate the ignition plug 36, thereby controlling the ignition timing of the engine 10. Specifically, the CPU 66d operates to supply the current to the primary side of the ignition coil 34 through the ignition circuit 66e and, when the ignition output signal is transmitted to block the current on the primary side, operates the ignition plug 36 with high voltage generated on the secondary side of the ignition coil 34 to control the ignition timing of the engine 10. The CPU 66d carries out a calculation based on the inputted signals in the same manner and, at the fuel injection timing, sends a fuel injection control signal to the drive circuit 66f for controlling the operation of the injector 26 (i.e., conducts a fuel injection control), while sending a control signal to the drive circuit 66g for controlling the operation of the stepper motor 24.

The RAM 66i is used for temporarily storing the parameters such as the throttle opening TH, engine speed NE, etc., and the timer 66j is used for time measurement in the program.

Figure 4:
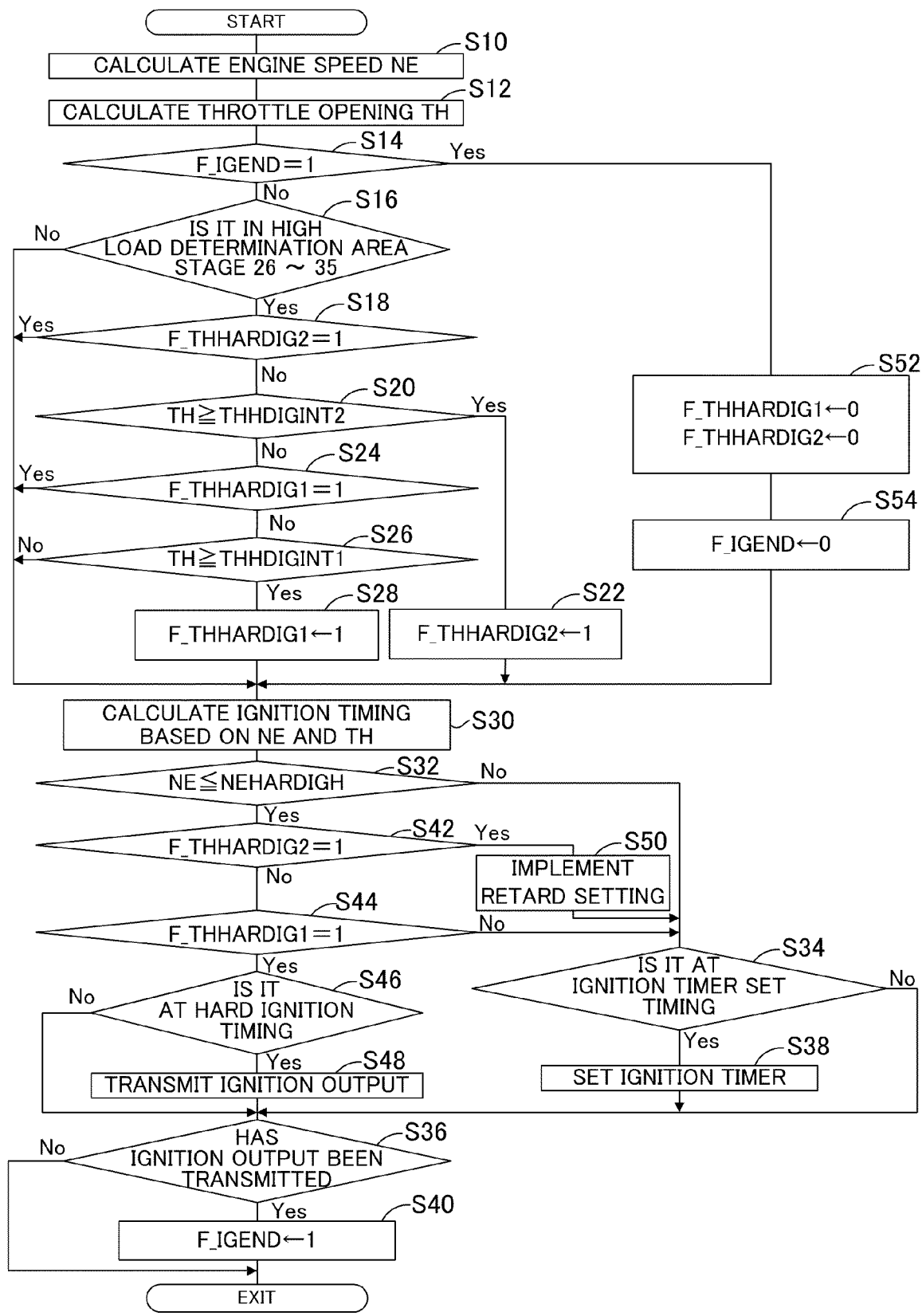
FIG. 4 is a flowchart showing the operation of the apparatus shown in FIG. 1.

FIG. 4 is a flowchart showing the operation of the apparatus according to this embodiment. The illustrated program is executed by the CPU 66d every time a crank angle signal (number CALSTG or STAGE) is inputted.

In S10, the engine speed NE is calculated. Specifically, it is calculated based on the elapsed time from previous input of the crank angle signal to this time input thereof, i.e., based on crank angle signal interval time.

The program proceeds to S12, in which the throttle opening TH is calculated based on the signal from the throttle opening sensor 52, and to S14, in which it is determined by referring to an ignition end flag F_IGEND whether the ignition output has been transmitted. A bit of the flag F_IGEND is set to 1 when the ignition output is transmitted (described later). The result in the first program loop is No and the program proceeds to S16.

In S16, it is determined whether the program is in a high load determination area. Specifically, it is determined by referring to the crank angle signal (number (STAGE)) of this time whether the number is one of 26 to 35 i.e., it is in the intake stroke.

When the result in S16 is Yes, the program proceeds to S18, in which it is determined by referring to a second high load determination flag F_THHARDIG2 whether a second high load determination has been completed. A bit of the flag F_THHARDIG2 is set to 1 when the engine 10 is determined in the next step to be under high load. The second high load determination is made for determining whether the engine 10 is under a load of still higher than a load determined by a first high load determination, which will be described later. The result in the first program loop is No since a bit of the flag F_THHARDIG2 is 0, and the program proceeds to S20.

In S20, it is determined whether the throttle opening TH is equal to or greater than a second high load determination threshold value (second threshold value) THHDIGINT2, which is set greater than a first high load determination threshold value (first threshold value) THHDIGINT1 (described later) and is a value enabling to indicate that the engine load is quite high, e.g., 40 degrees.

When the result in S20 is Yes, the program proceeds to S22, in which it is determined that the second high load determination has been completed and a bit of the flag F_THHARDIG2 is set to 1.

When the result in S20 is No, the program proceeds to S24, in which it is determined by referring to a first high load determination flag F_THHARDIG1 whether the first high load determination has been completed. A bit of the flag F_THHARDIG1 is set to 1 when the engine 10 is determined in the next step to be under high load. The result in the first program loop is No since a bit of the flag F_THHARDIG1 is 0, and the program proceeds to S26.

In S26, it is determined whether the throttle opening TH is equal to or greater than the first threshold value THHDIGINT1, which is a value enabling to indicate that the engine load is high, e.g., 20 degrees.

When the result in S26 is Yes, the program proceeds to S28, in which it is determined that the first high load determination has been completed and a bit of the flag F_THHARDIG1 is set to 1.

When the result in S26 is No, the program proceeds to S30. When the result in S16 is No or the result in S18 or S24 is Yes, the program also proceeds to S30.

In S30, the ignition timing is calculated based on the engine speed NE and throttle opening TH. Specifically, the set timing of an ignition timer and an ignition timer value are obtained as the ignition timing by referring to a map stored in the ROM 66h using the engine speed NE and throttle opening TH. The engine speed NE and throttle opening TH used in this step can be either values calculated in the present program loop or average values of predetermined program loops.

Next, in S32, it is determined whether the engine speed NE is equal to or less than a hard ignition upper limit speed NEHARDIGH, which is a value enabling to indicate that the engine 10 is operated at low speed such as idle speed, e.g., 2000 rpm. The hard ignition is an ignition method to transmit the ignition output at a predetermined crank angle (e.g., BTDC10°), while the calculation ignition (soft ignition) is an ignition method using the ignition timer.

When the result in S32 is No, the program proceeds to S34, in which it is determined whether this program is at the calculated set timing of the ignition timer. Specifically, it is determined by referring to the present number (STAGE) whether the number corresponds to the set timing of the ignition timer. When it is not at the ignition timer set timing, the result in S34 is No and the program proceeds to S36, in which whether the ignition output has been transmitted is determined When the result in S34 is No, the result in S36 is naturally No and the program is terminated.

On the other hand, when the result in S34 is Yes, i.e., it is at the ignition timer set timing, the program proceeds to S38, in which the ignition timer value calculated in S30 is set to the ignition timer for conducting the calculation ignition. The ignition timer is a down counter and when its value reaches 0, the ignition output is transmitted. The ignition output transmission (ignition timing) through the calculation ignition method is set at the advanced position compared to that through the hard ignition method, except for a case described later.

The program proceeds to S36, in which it is determined whether the ignition output has been transmitted. The result becomes No until the ignition timer value reaches 0 and the program is terminated, while the result becomes Yes upon reaching 0 and the program proceeds to S40, in which a bit of the ignition end flag F_IGEND is set to 1.

When the result in S32 is Yes, the program proceeds to S42, in which it is determined whether a bit of the second high load determination flag F_THHARDIG2 is 1. When the result in S42 is No, in S44, it is determined whether a bit of the first high load determination flag F_THHARDIG1 is 1. When the result in S44 is No, the program proceeds to S34 to conduct the calculation ignition. The processing in S36 onward is the same as explained above.

When the result in S44 is Yes, the program proceeds to S46, in which it is determined whether the program is at the hard ignition timing Specifically, it is determined by referring to the present number (STAGE) whether the number corresponds to the predetermined crank angle (BTDC10°). When it is not at the hard ignition timing, the result is No and, via S36, the program is terminated.

When the result in S46 is Yes, i.e., it is at the hard ignition timing, the program proceeds to S48, in which the ignition output is transmitted, i.e., the hard ignition is conducted and, via S36, to S40, in which a bit of the flag F_IGEND is set to 1.

When the result in S42 is Yes, the program proceeds to S50, in which a retard setting is implemented. Specifically, the ignition timer set timing and ignition timer value are set so as to transmit the ignition output at the retarded position more than the case of the hard ignition. For instance, the ignition timer set timing is set to 30 degrees before the TDC (BTDC30°) and the ignition timer value is set so that the ignition output is transmitted at 5 degrees before the TDC (BTDC5°).

Next, in S34, the calculation ignition is conducted based on the retard-set ignition timer set timing and ignition timer value. The processing in S36 onward is the same as explained above.

When the result in S14 is Yes, the program proceeds to S52, in which bits of the flags F_THHARDIG1 and F_THHARDIG2 are reset to 0, and to S54, in which a bit of the flag F_IGEND is reset to 0.

Figure 5:
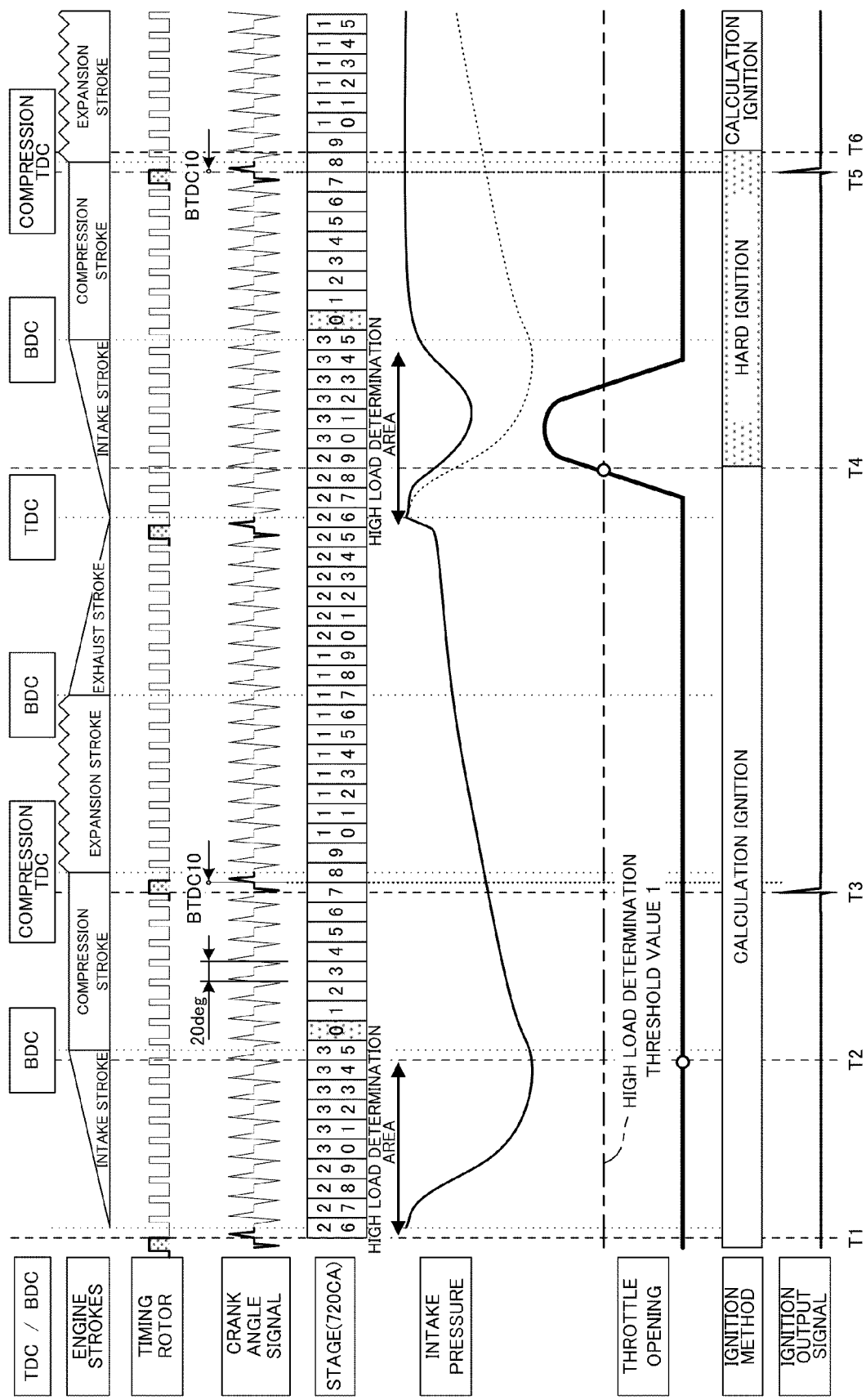
FIG. 5 is a time chart for explaining the process of the FIG. 4 flowchart.
Figure 6:
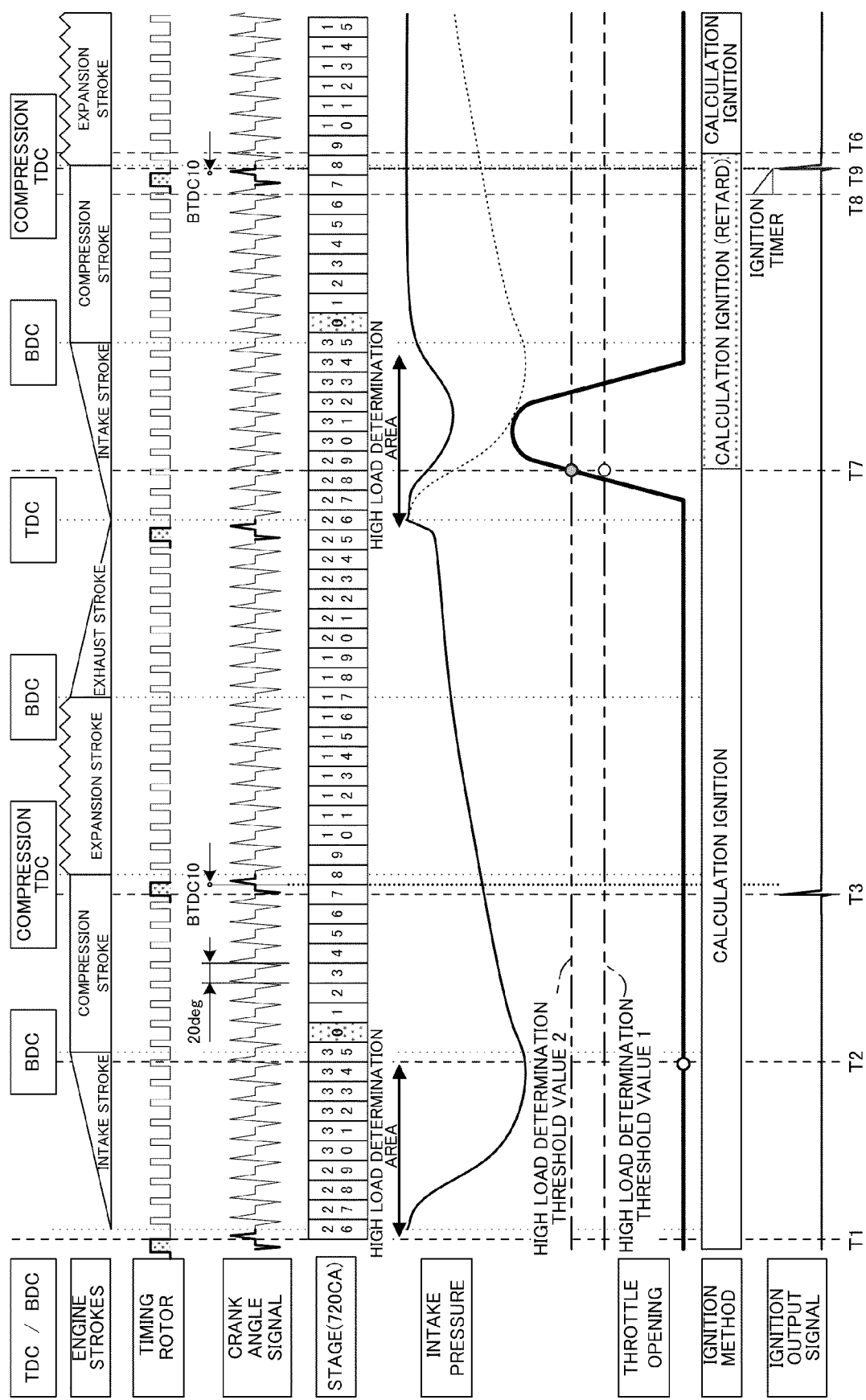
FIG. 6 is a time chart similarly explaining the process of the FIG. 4 flowchart.

FIGS. 5 and 6 are time charts for explaining the process of the FIG. 4 flowchart.

As shown in FIG. 5, the intake stroke corresponding to the numbers (STAGE) 26 to 35 is the high load determination area where the high load determination is implemented based on the throttle opening TH. Since the throttle opening TH is below the first threshold value THHDIGINT1 during a period from the time T1 to T2 and the engine 10 is determined to be not under high load, the ignition output is transmitted through the calculation ignition method at the time T3. The calculation ignition is conducted at the advanced position compared to the hard ignition crank angle (BTDC10°).

Since, at the time T4, the throttle opening TH is at or above the first threshold value THHDIGINT1 in the high load determination area, the ignition method is changed to the hard ignition and the hard ignition is conducted at the time T5. After the ignition, the high load determination is discontinued and the hard ignition method is canceled at the time T6.

As shown in FIG. 6, since, at the time T7, the throttle opening TH is at or above the second threshold value THHDIGINT2 in the high load determination area, the ignition timer is set at the time T8 and the ignition is conducted at the time T9 at the more retarded timing compared to the hard ignition.

Thus, when the throttle opening TH detected in the intake stroke is at or above the first threshold value THHDIGINT1, the hard ignition is conducted at the more retarded timing compared to the calculation ignition. Specifically, in the case where the throttle opening TH is increased in the intake stroke, since a load of compressing the intake air is increased in the next compression stroke and it may cause the knocking and kickback, the ignition timing is retarded. In other words, even when the throttle opening increase is detected in another stroke other than the intake stroke, since it does not lead to the increase in the intake air compression load and, accordingly, either knocking or kickback will not occur, the ignition timing is not retarded. Since the ignition timing is retarded only when the knocking and kickback likely occur, it becomes possible to avoid the unnecessary decrease of the engine output which adversely affects driving feel of the operator of the vehicle on which the engine 10 is mounted, and effectively prevent the knocking and kickback from occurring.

Further, when the throttle opening TH detected in the intake stroke is at or above the second threshold value THHDIGINT2, the ignition is conducted at the still more retarded timing compared to the hard ignition. In the case where the throttle opening TH is further increased in the intake stroke, since the intake air compression load is also further increased in the compression stroke and the knocking and kickback are more likely to occur, the ignition timing is retarded more. With this, it becomes possible to prevent the knocking and kickback from occurring further efficiently.

Further, when the engine speed NE is at or below the hard ignition upper limit speed NEHARDIGH and the throttle opening TH detected in the intake stroke is at or above the first and second threshold values THHDIGINT1 and THHDIGINT2, the ignition timing is retarded. In other words, the ignition timing is retarded only when the inertial energy of the crankshaft 42 rotation is small and the engine speed NE is in the low speed area, such as idle speed, where the knocking and kickback likely occur. With this, the foregoing effects can be achieved further efficiently.

A control apparatus for an internal combustion engine according to a second embodiment of this invention will be explained. In this embodiment, the intake pressure PMB is used for high load determination in place of the throttle opening TH.

Figure 7:
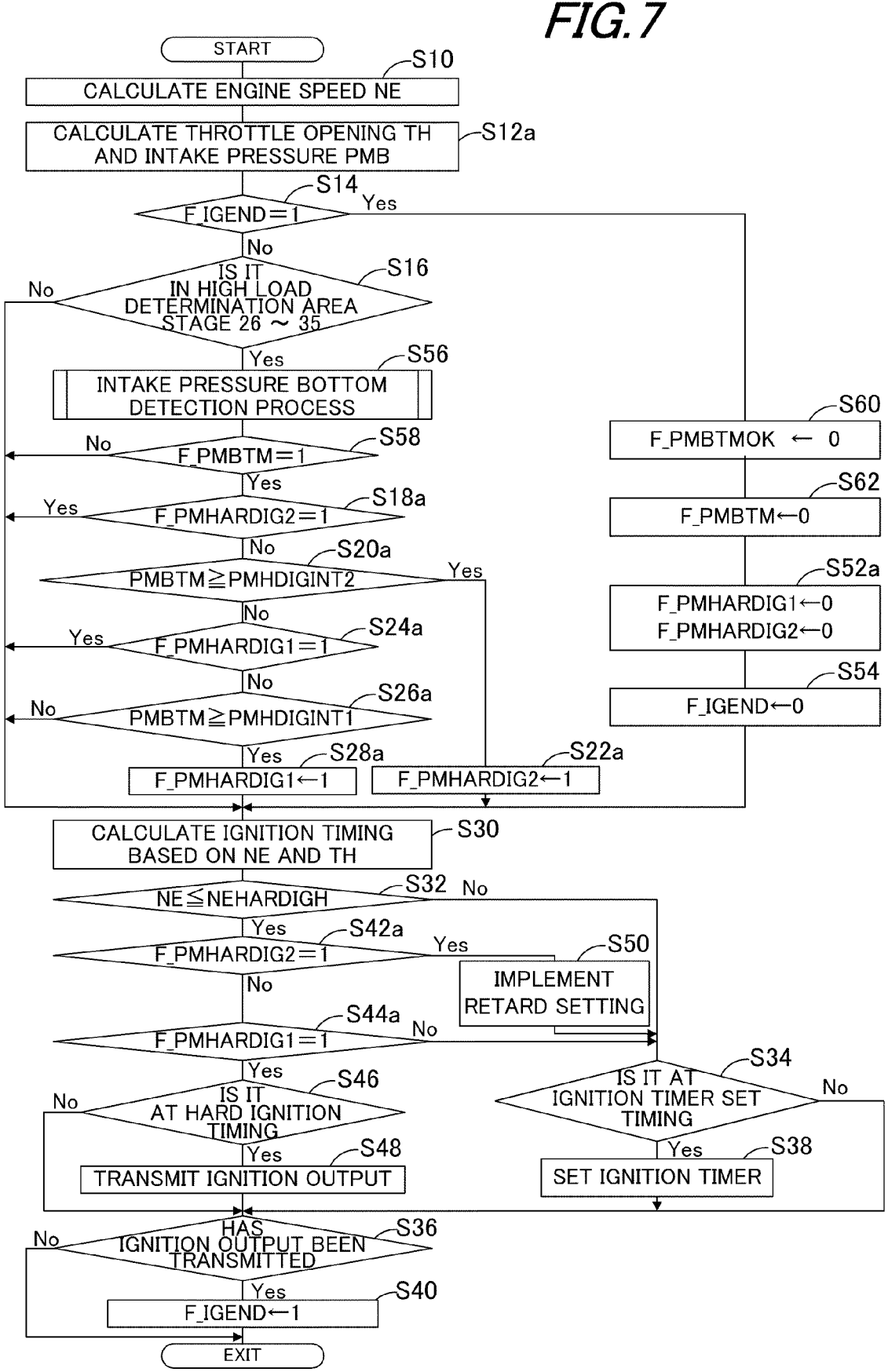
FIG. 7 is a flowchart similar to FIG. 4, but showing the operation of a control apparatus for an internal combustion engine according to a second embodiment of this invention.

FIG. 7 is a flowchart similar to FIG. 4, but showing the operation of a control apparatus for an internal combustion engine according to the second embodiment. The explanation for the same steps as those of FIG. 4 will be omitted and step numbers of the steps similar to those of FIG. 4 are suffixed with "a." The other steps are indicated by new step numbers.

In S12a, in addition to the throttle opening TH, the intake pressure PMB is calculated based on the signal from the absolute pressure sensor 56.

When the result in S16 is Yes, the program proceeds to S56, in which an intake pressure bottom detection process is conducted.

Figure 8:
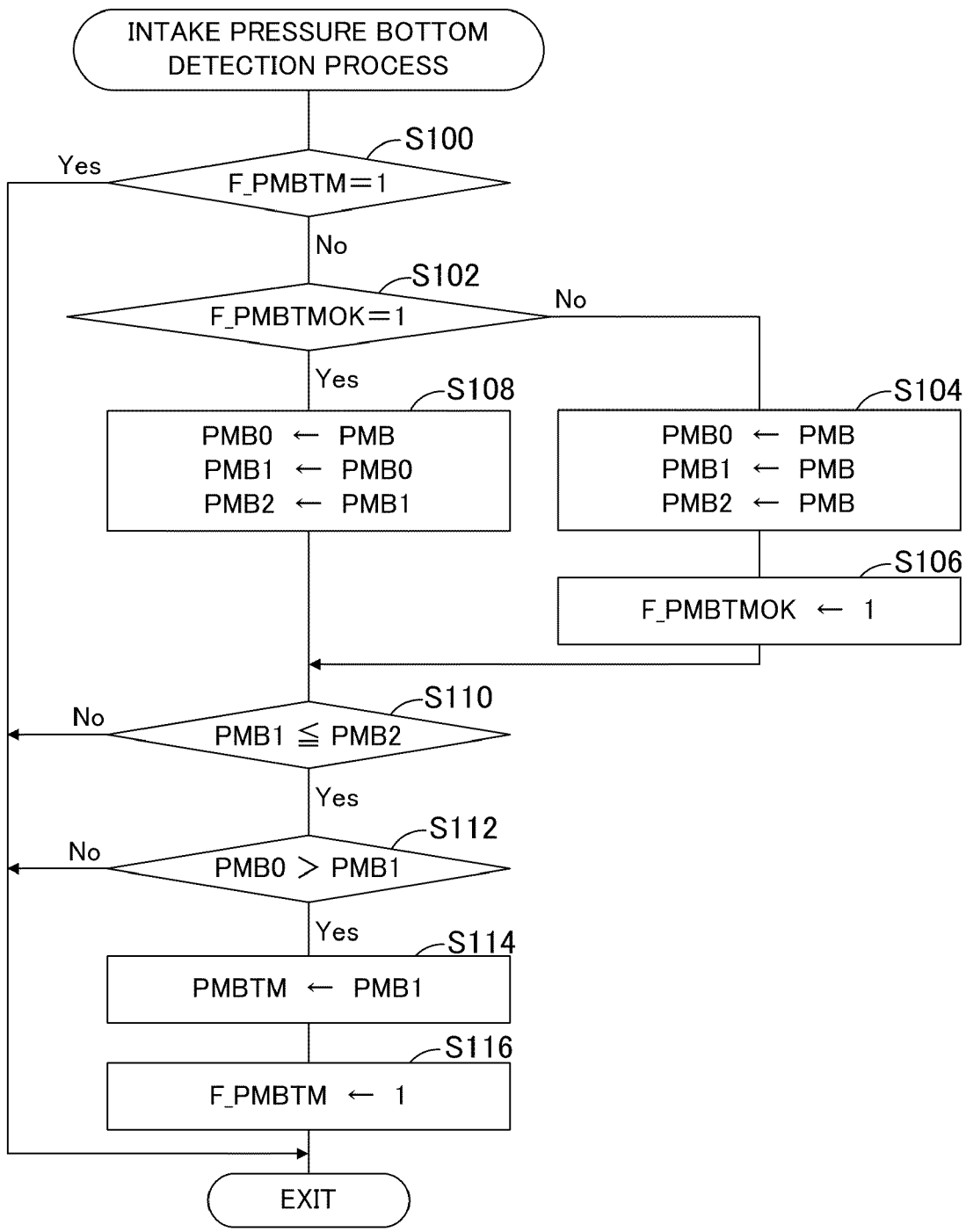
FIG. 8 is a subroutine flowchart showing an intake pressure bottom detection process in FIG. 7.

FIG. 8 is a subroutine flowchart showing the process.

In S100, it is determined by referring to an intake pressure bottom detection completed flag F_PMBTM whether the intake pressure bottom detection has been completed. A bit of the flag F_PMBTM is set to 1 when an intake pressure bottom value is set (described later). The result in the first program loop is No and the program proceeds to S102.

In S102, it is determined by referring to an intake pressure bottom detection start flag F_PMBTMOK whether the intake pressure bottom detection has been started. The result in the first program loop is No and the program proceeds to S104.

In S104, the intake pressure PMB calculated this time is set to each of three intake pressure bottom detection parameters PMB0, PMB1 and PMB2.

The program proceeds to S106, in which a bit of the flag F_PMBTMOK is set to 1. As a result, the result in S102 becomes Yes in the next and ensuing loops and the program proceeds S108.

In S108, the parameters PMB0, PMB1 and PMB2 are updated. Specifically, the present intake pressure PMB is set to the parameter PMB0, the previous value of the parameter PMB0 to the parameter PMB1, and the previous value of the parameter PMB1 to the parameter PMB2. The parameters PMB0, PMB1 and PMB2 are hereinafter called the "present parameter," "previous parameter" and "last but one parameter," respectively.

Next, in S110, it is determined whether the intake pressure PMB detected in the preceding program loop is a decreased value. Specifically, the determination is made by checking as to whether the previous parameter PMB1 is equal to or less than the last but one parameter PMB2. When the result is Yes, in S112, it is determined whether the intake pressure PMB detected in this program loop is an increased value, i.e., the present parameter PMB0 is greater than the previous parameter PMB1.

When the result in S112 is Yes, the program proceeds to S114, in which the previous parameter PMB1 is set to an intake pressure bottom value PMBTM, and to S116, in which a bit of the flag F_PMBTM is set to 1 and this subroutine program is terminated. When the result in S100 is Yes, or the result in S110 or S112 is No, the remaining steps are skipped and the program is terminated.

Returning to the FIG. 7 flowchart, the program proceeds to S58, in which it is determined by referring to the flag F_PMBTM whether the intake pressure bottom detection has been completed. When the result is Yes, the program proceeds to S18a, in which it is determined by referring to a second high load determination flag F_PMHARDIG2 whether the second high load determination has been completed. A bit of the flag F_PMHARDIG2 is set to 1 when the engine 10 is determined in the next step to be under high load. The result in the first program loop is No since a bit of the flag F_PMHARDIG2 is 0, and the program proceeds to S20a.

In S20a, it is determined whether the intake pressure bottom value PMBTM is equal to or greater than a second high load determination threshold value (second threshold value) PMHDIGINT2, which is set greater than a first high load determination threshold value (first threshold value) PMHDIGINT1 (described later) and is a value enabling to indicate that the engine load is quite high, e.g., 70 kPa.

When the result in S20a is Yes, in S22a, it is determined that the second high load determination has been completed and a bit of the flag F_PMHARDIG2 is set to 1.

When the result in S20a is No, the program proceeds to S24a, in which it is determined by referring to a first high load determination flag F_PMHARDIG1 whether the first high load determination has been completed. A bit of the flag F_PMHARDIG1 is set to 1 when the engine 10 is determined in the next step to be under high load. The result in the first program loop is No since a bit of the flag F_PMHARDIG1 is 0, and the program proceeds to S26a.

In S26a, it is determined whether the intake pressure bottom value PMBTM is equal to or greater than the first threshold value PMHDIGINT1, which is set to a value enabling to indicate that the engine load is high, e.g., 50 kPa.

When the result in S26a is Yes, in S28a, it is determined that the first high load determination has been completed and a bit of the flag F_PMHARDIG1 is set to 1.

When the result in S26a is No, the program proceeds to S30. When the result in S58 is No, or the result in S18a or S24a is Yes, the program also proceeds to S30. Since the processing in S30 onwards is substantially the same as those of FIG. 4 flowchart, the explanation thereof is omitted.

When the result in S14 is Yes, the program proceeds to S60, in which a bit of the intake pressure bottom detection start flag F_PMBTMOK is reset to 0, to S62, in which a bit of the intake pressure bottom detection completed flag F_PMBTM is reset to 0, and to S52a, in which bits of the first and second high load determination flags F_PMHARDIG1 and F_PMHARDIG2 are reset to 0.

Figure 9:
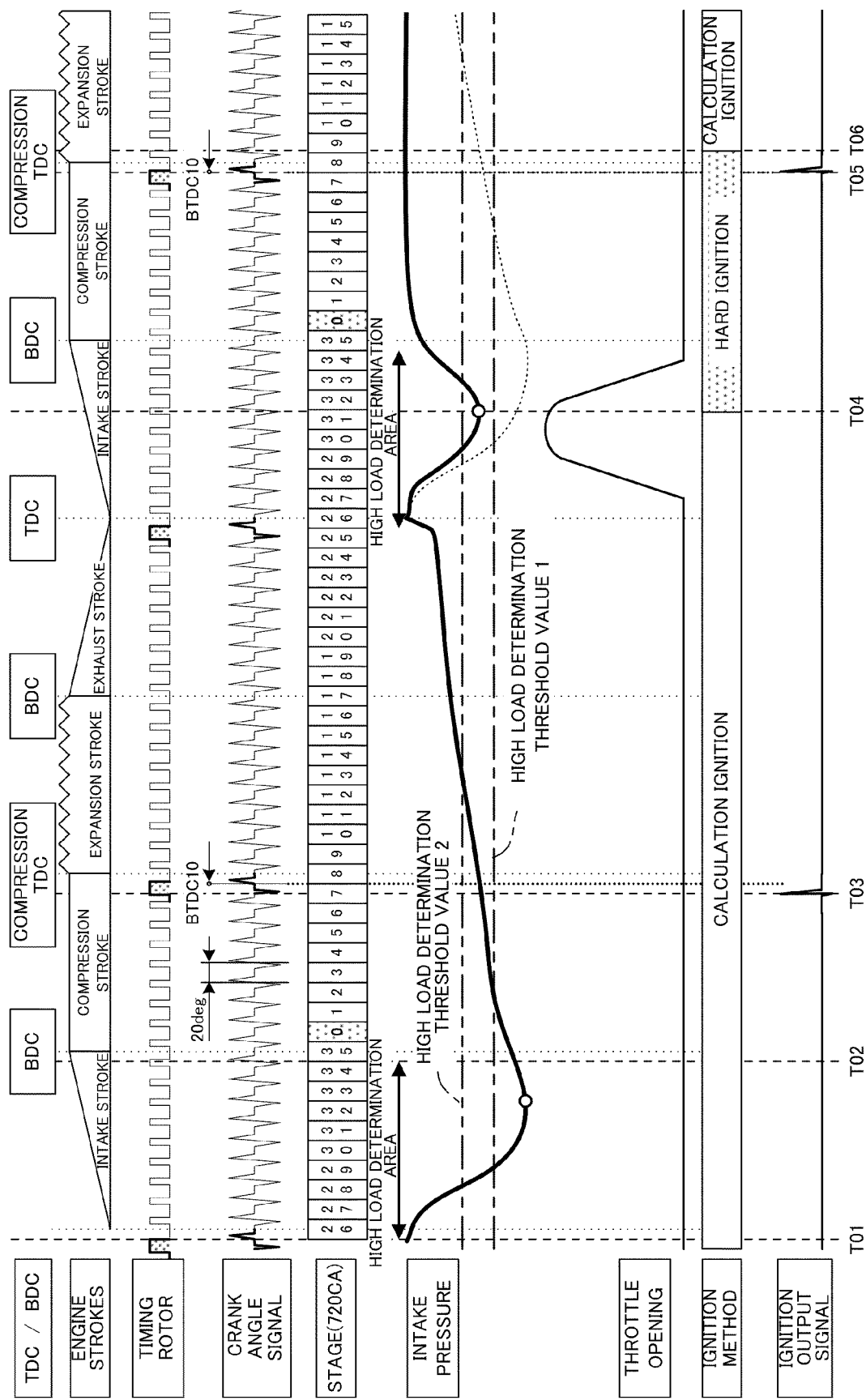
FIG. 9 is a time chart for explaining the processes of the flowcharts of FIGS. 7 and 8.
Figure 10:
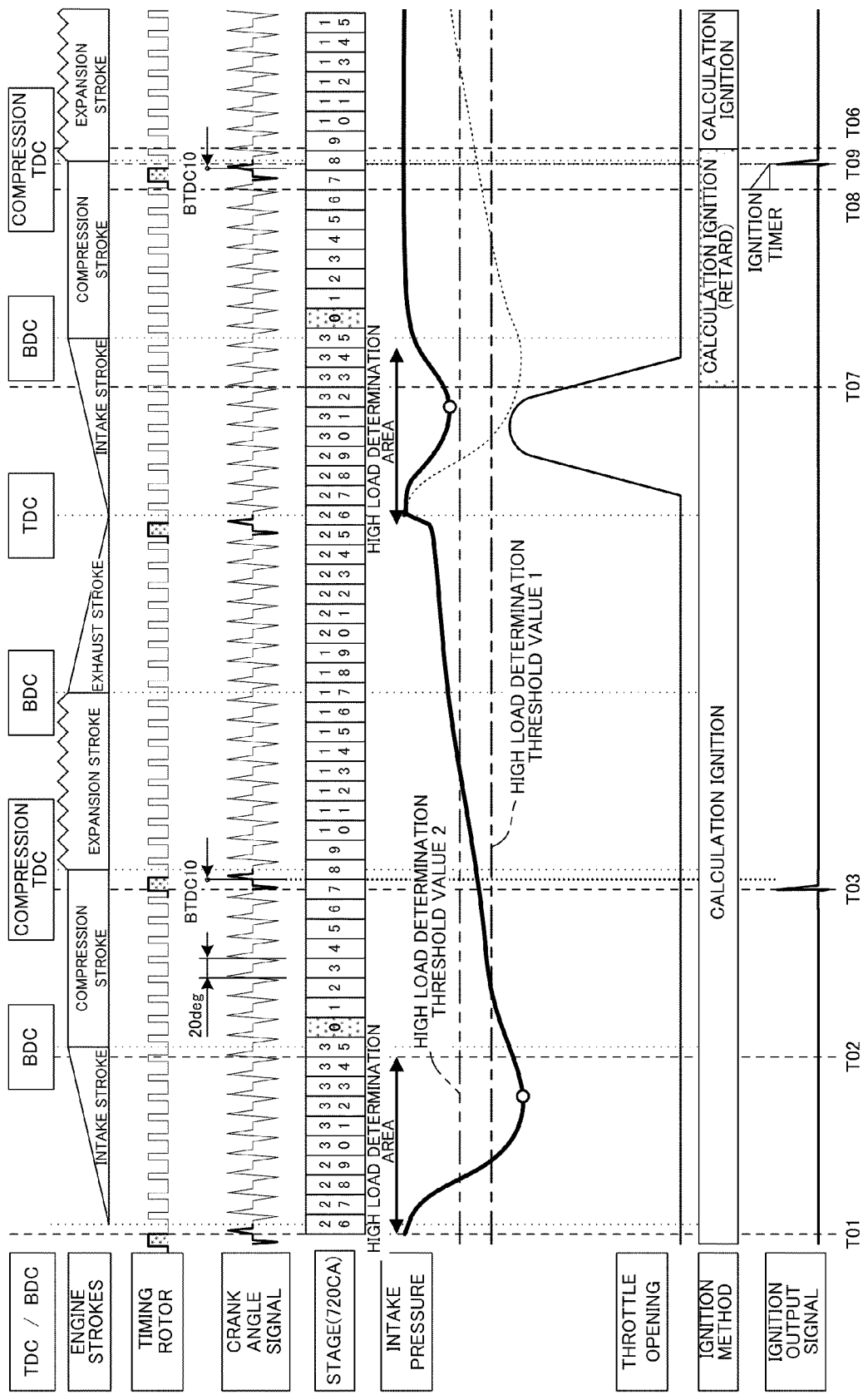
FIG. 10 is a time chart similarly explaining the processes of the flowcharts of FIGS. 7 and 8.

FIGS. 9 and 10 are time charts for explaining the processes of the flowcharts of FIGS. 7 and 8.

As shown in FIG. 9, the intake stroke corresponding to the numbers (STAGE) 26 to 35 is the high load determination area where the high load determination is implemented based on the intake pressure bottom value PMBTM. Since the value PMBTM is below the first threshold value PMHDIGINT1 during a period from the time T01 to T02 and the engine 10 is determined to be not under high load, the ignition output is transmitted through the calculation ignition method at the time T03. The calculation ignition is conducted at the advanced position more than the hard ignition crank angle (BTDC10°).

Since, at the time T04, the value PMBTM is at or above the first threshold value PMHDIGINT1 in the high load determination area, the ignition method is changed to the hard ignition and the hard ignition is conducted at the time T05. After the ignition, the high load determination is discontinued and the hard ignition method is canceled at the time T06.

As shown in FIG. 10, since, at the time T07, the value PMBTM is at or above the second threshold value PMHDIGINT2 in the high load determination area, the ignition timer is set at the time T08 and the ignition output is transmitted at the time T09 at the more retarded timing compared to the hard ignition.

Thus, when the value PMBTM detected in the intake stroke is at or above the first threshold value PMHDIGINT1, the hard ignition is conducted at the more retarded timing compared to the calculation ignition. Further, when the value PMBTM detected in the intake stroke is at or above the second threshold value PMHDIGINT2, the ignition is conducted at the still more retarded timing compared to the hard ignition. Owing to this configuration, the same effects as those of the first embodiment can be achieved.

Figure 11:
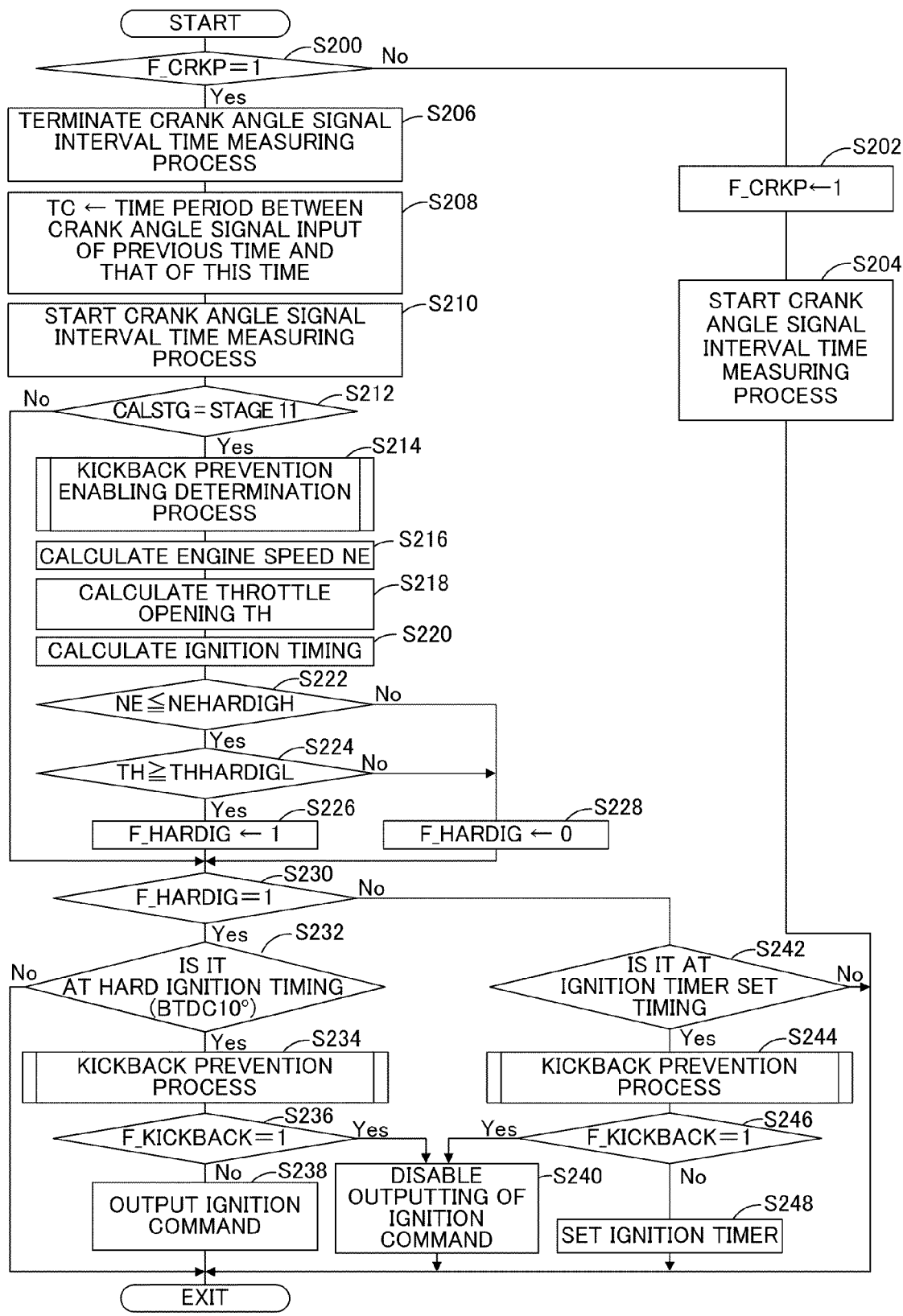
FIG. 11 is a flowchart showing the operation of a control apparatus for an internal combustion engine according to a third embodiment of this invention.

FIG. 11 is a flowchart showing the operation of a control apparatus for an internal combustion engine according to a third embodiment of this invention. The illustrated program is executed every time the crank angle signal is inputted by the CPU 66d after activation thereof.

In S200, it is determined by referring to a crank angle signal first input flag F_CRKP whether it is not the first time that the crank angle signal is inputted. When it is the first time, the result is No and the program proceeds to S202, in which a bit of the flag F_CRKP is set to 1.

In S204, a crank angle signal interval time measuring process is started, i.e., the timer 66j is started to measure a time period from this time input of the crank angle signal to next input thereof, and the program is terminated. When the program is executed upon inputting of the next crank angle signal, the result in S200 becomes Yes and in S206, the crank angle signal interval time measuring process is terminated, i.e., the timer 66j is stopped.

The program proceeds to S208, in which a timer value indicative of a period between the crank angle signal input of previous time and that of this time is set as a time TC, and to S210, in which, similarly to S204, the crank angle signal interval time measuring process is started to measure the interval time of until next input of the crank angle signal. Thus, the interval time (crank angle signal interval time) TC between two consecutive crank angle signals is sequentially measured.

Next, in S212, it is determined by referring to the number (CALSTG) inputted with the crank angle signal to the CPU 66d whether the number is 11, i.e., the crank angle signal representing the stage 11 is inputted in this program loop. The stage 11 indicates a piston position near the BDC.

When the result in S212 is Yes, in S214, a kickback prevention enabling determination process is conducted.

Figure 12:
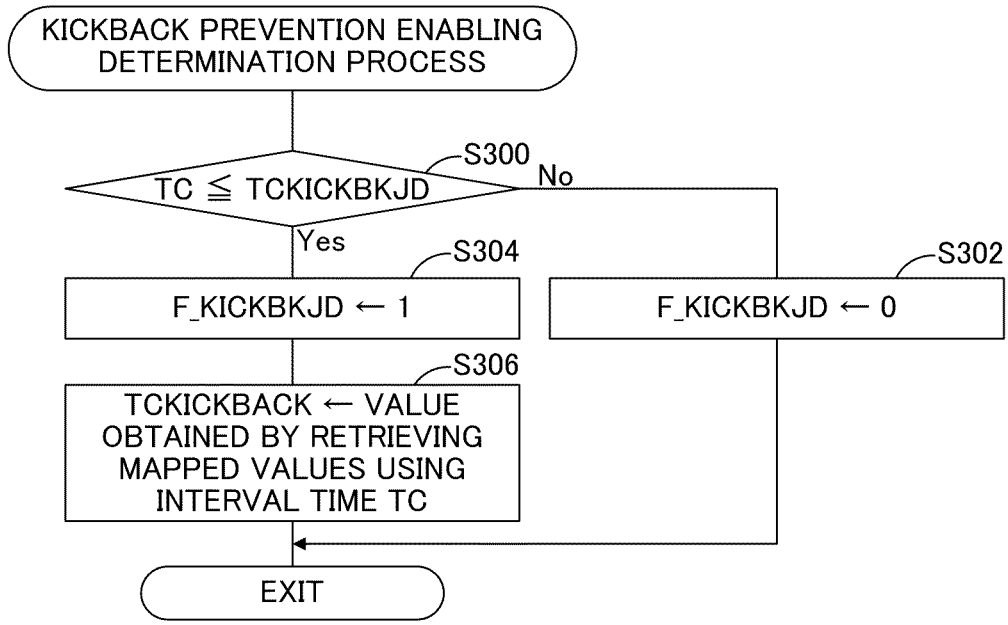
FIG. 12 is a subroutine flowchart showing the kickback prevention enabling determination process in FIG. 11.

FIG. 12 is a subroutine flowchart showing the process.

In S300, it is determined whether the crank angle signal interval time TC is equal to or less than a predetermined value TCKICKBKJD. Since this program starts when the result in S212 is Yes, the interval time TC is of the vicinity of the BDC. The predetermined value TCKICKBKJD is set to a value corresponding to full-firing engine speed (750 rpm), e.g., 4.4 milliseconds. In other words, S300 is a step to determine whether the engine speed near the BDC is at or above a threshold value (full-firing engine speed corresponding value).

When the result in S300 is No, i.e., the engine speed near the BDC is low, the program proceeds to S302, in which a bit of a kickback prevention determination flag F_KICKBKJD is reset to 0 and the subroutine program is terminated.

When the result in S300 is Yes, i.e., the engine speed near the BDC is high to some extent, the program proceeds to S304, in which a bit of the flag F_KICKBKJD is set to 1.

Next, in S306, a kickback prevention ignition cut upper limit value TCKICKBACK (described later) is calculated based on the interval time TC of near the BDC. The value TCKICKBACK is calculated by retrieving mapped values (kickback prevention ignition cut upper limit map) in the ROM 66h by using the interval time TC of near the BDC.

Figure 13:
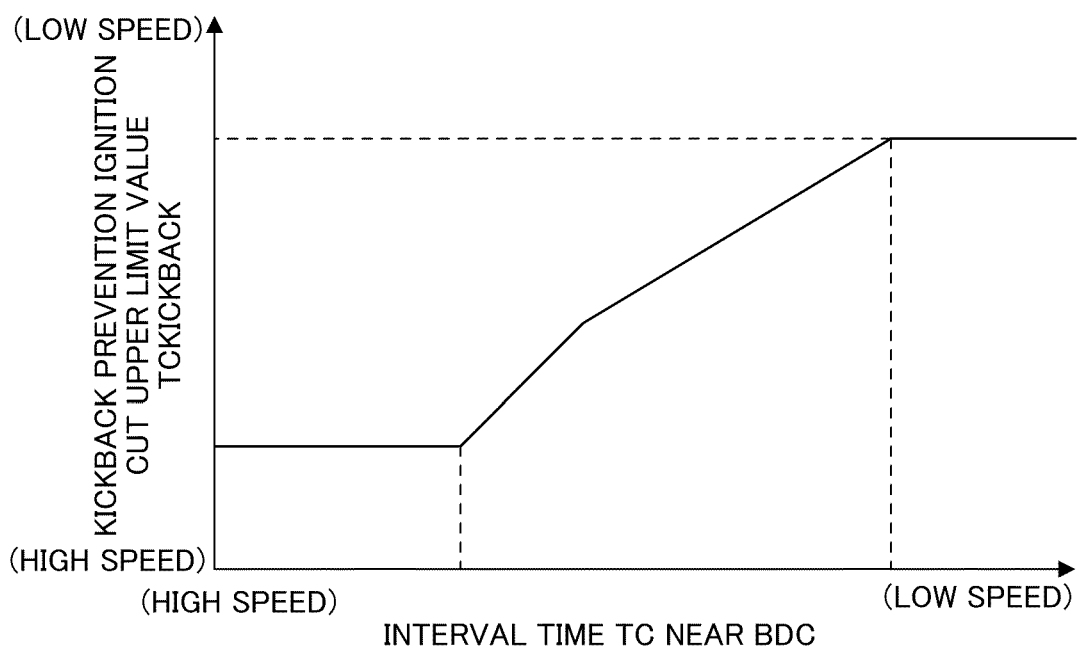
FIG. 13 is a graph showing a kickback prevention ignition cut upper limit value shown in FIG. 12 with respect to crank angle signal interval time of near the BDC.

FIG. 13 is a graph showing the kickback prevention ignition cut upper limit map.

As illustrated, the value TCKICKBACK is set to increase with increasing interval time TC of near the BDC, i.e., with decreasing engine speed of near the BDC.

Returning to the FIG. 11 flowchart, the program proceeds to S216, in which the engine speed NE (rpm) is calculated based on a sum of the interval times TC over the crank 360° CA, and to S218, in which the throttle opening TH is calculated.

In S220, similarly to the first embodiment, the ignition timing is calculated based on the calculated engine speed NE and throttle opening TH. In the third embodiment, the ignition timer set timing is fixed to 30 degrees before the TDC (BTDC30°) and various ignition timer values are prepared.

In S222, it is determined whether the engine speed NE is equal to or less than a hard ignition upper limit speed NEHARDIGH, which is set to a value enabling to indicate that the engine speed NE is low, such as idle speed, e.g., 1700 rpm.

When the result in S222 is Yes, the program proceeds to S224, in which it is determined whether the throttle opening TH is equal to or greater than a hard ignition lower limit opening THHARDIGL, which is set to a throttle opening value suitable for the hard ignition, e.g., 10 degrees.

When the result in S224 is Yes, in S226, a bit of a hard ignition flag F_HARDIG, whose initial value is 0, is set to 1. On the other hand, when the result in S222 or S224 is No, the program proceeds to S228, in which a bit of the flag F_HARDIG is reset to 0. When a bit of the flag F_HARDIG is 0, the calculation ignition is conducted as explained later.

Next (and when the result in S212 is No), the program proceeds to S230, in which the flag F_HARDIG is referred to. When a bit of the flag F_HARDIG is 1 and the hard ignition is to be conducted, the program proceeds to S232, in which it is determined whether it is at the hard ignition timing, i.e., whether a predetermined crank angle signal (signal representing BTDC10°) is inputted in this program loop.

When the result in S232 is No, the remaining steps are skipped and the program is terminated. When the result is Yes, in S234, a kickback prevention process is conducted.

Figure 14:
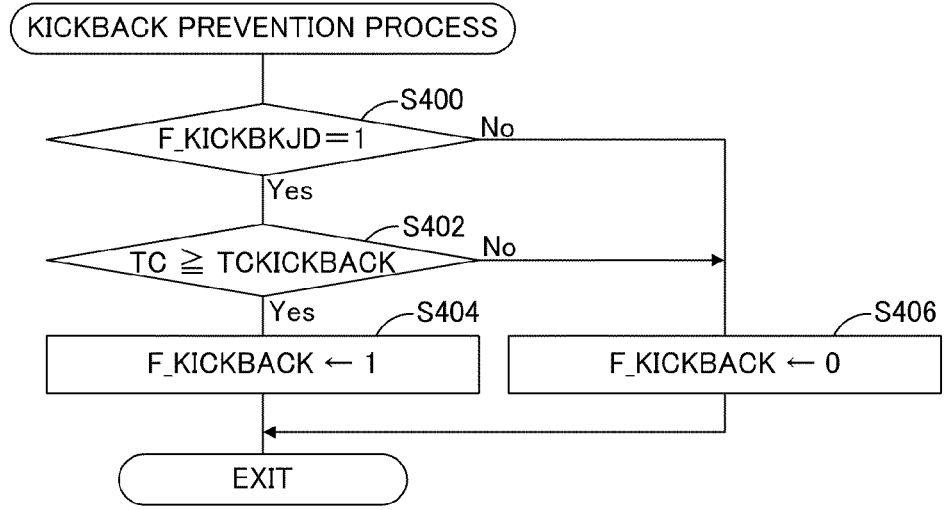
FIG. 14 is a subroutine flowchart showing kickback prevention process in FIG. 11.

FIG. 14 is a subroutine flowchart showing the process.

In S400, it is determined by referring to the kickback prevention determination flag F_KICKBKJD whether ignition cut for preventing the kickback is enabled.

When the result in S400 is Yes, the program proceeds to S402, in which it is determined whether the interval time TC is equal to or greater than the kickback prevention ignition cut upper limit value TCKICKBACK. Since this subroutine program is executed when the result in S232 is Yes, accordingly the interval time TC here is of immediately before a hard ignition command is outputted. Specifically, in S402, it is determined whether the engine speed of immediately before the hard ignition command is outputted is at or below a threshold value (corresponding to the value TCKICKBACK).

When the result in S402 is Yes, i.e., the engine speed of immediately before the hard ignition command is outputted is low, the program proceeds to S404, in which a bit of a kickback prevention ignition cut flag F_KICKBACK is set to 1.

When the result in S402 is No, i.e., the engine speed of immediately before the hard ignition command is outputted is high to some extent, the program proceeds to S406, in which a bit of the flag F_KICKBACK is reset to 0.

Returning to the FIG. 11 flowchart, in S236, the flag F_KICKBACK is referred to. When a bit of the flag F_KICKBACK is 0, the program proceeds to S238, in which the hard ignition command is outputted to the ignition circuit 66e, while, when it is 1, the program proceeds to S240, in which outputting of the hard ignition command to the ignition circuit 66e is disabled.

When the result in S230 is No, the program proceeds to S242, in which it is determined whether it is at the ignition timer set timing calculated in S220, i.e., whether a predetermined crank angle signal (signal representing BTDC30°) is inputted in this program loop.

When the result in S242 is No, the remaining steps are skipped and the program is terminated. When the result is Yes, in S244, similarly to S234, the kickback prevention process is conducted.

Although the details will not be given because the subroutine program is the same as S234, the interval time TC in this process is of immediately before the ignition timer set timing of the calculation ignition (soft ignition). When the interval time TC is at or above the kickback prevention ignition cut upper limit value TCKICKBACK, a bit of the flag F_KICKBACK is set to 1, otherwise a bit of the flag F_KICKBACK is reset to 0. In other words, when the engine speed of immediately before the ignition timer set timing is low, a bit of the flag F_KICKBACK is set to 1 and when it is high to some extent, a bit of the flag F_KICKBACK is reset to 0.

Next, in S246, the flag F_KICKBACK is referred to. When a bit of the flag F_KICKBACK is 0, the program proceeds to S248, in which the ignition timer value calculated in S220 is set in the ignition timer. The ignition timer is a down counter and when its value reaches 0, the ignition command set at the ignition timer set timing is sent to the ignition circuit 66e.

When a bit of the flag F_KICKBACK is 1 in S246, the program proceeds to S240. This means that the ignition timer value is not set in the ignition timer and, as a result, outputting of the ignition command to the ignition circuit 66e is disabled. Specifically, the ignition is cut off even when the calculation ignition (soft ignition) method is selected.

Figure 15:
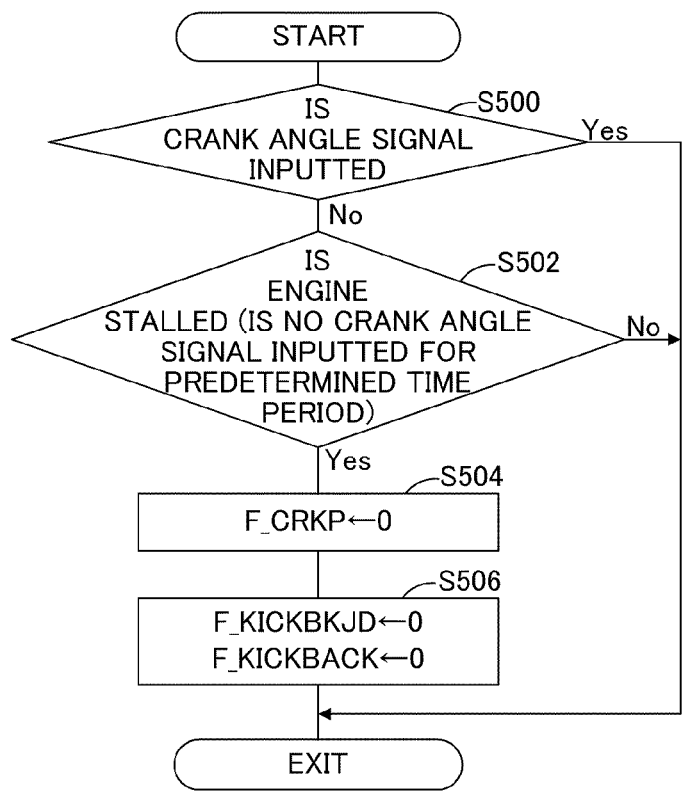
FIG. 15 is a flowchart showing a parameter reset process which is conducted by a CPU.

FIG. 15 is a flowchart showing a parameter reset process which is conducted by the CPU 66d in parallel with the FIG. 4 flowchart. The illustrated program is executed every 5 milliseconds, regardless of input of the crank angle signal.

In S500, it is determined whether the crank angle signal is inputted. When the result is No, the program proceeds to S502, in which it is determined whether the engine 10 is stalled (stopped). Specifically, a time period that no crank angle signal is inputted is measured by the timer 66j and when a predetermined time period (e.g., 200 milliseconds) has elapsed, the engine 10 is determined to be stalled. The processing of S500 and S502 is repeated until the predetermined time period elapses.

When the result in S502 is Yes, in S504, a bit of a crank angle signal first input flag F_CRKP is reset to 0, and in S506, bits of the kickback prevention determination flag F_KICKBKJD and kickback prevention ignition cut flag F_KICKBACK are reset to 0.

Figure 16:
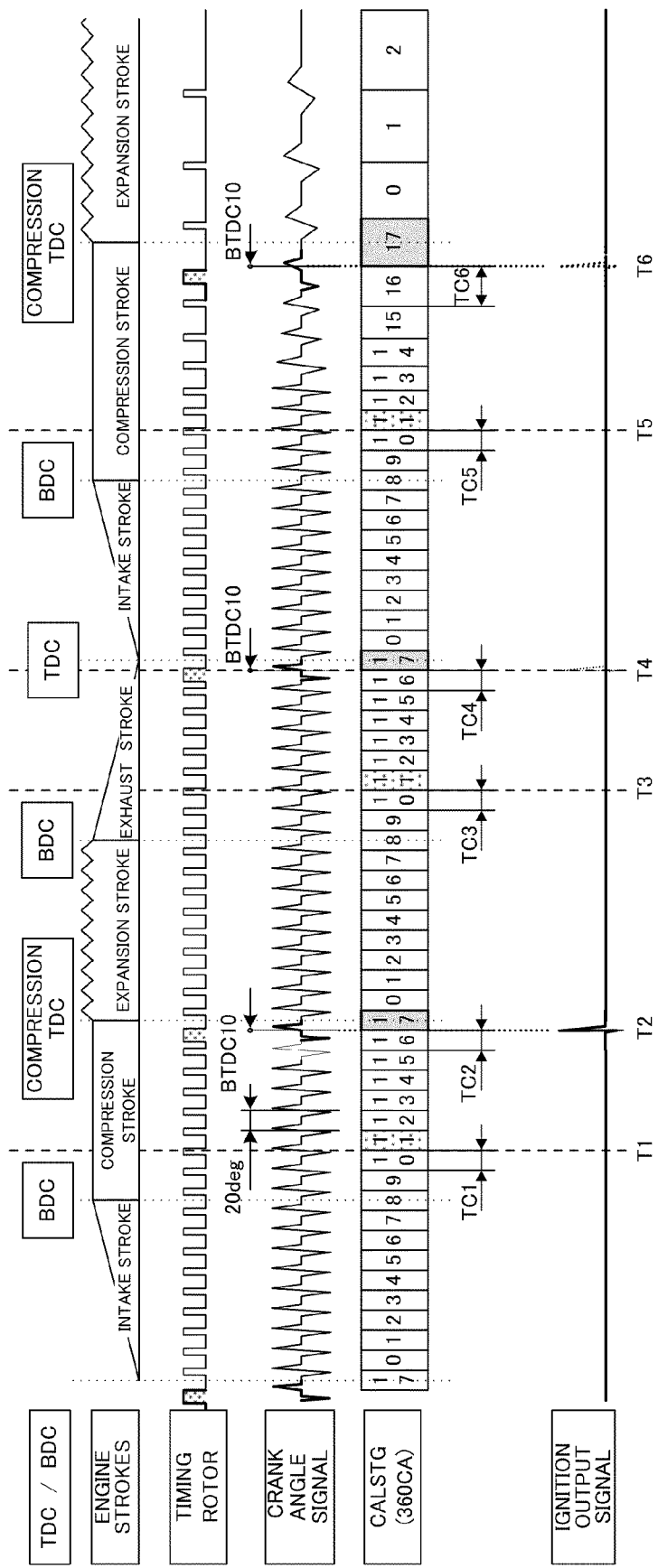
FIG. 16 is a time chart for explaining the processes of the flowcharts of FIGS. 11, 12 and 14.

FIG. 16 is a time chart for explaining the processes of the flowcharts of FIGS. 11, 12 and 14.

At the time T1, the interval time TC of near the BDC, i.e., time TC1 is calculated and, as described, the kickback prevention ignition cut upper limit value TCKICKBACK is calculated based on the time TC1.

At the time T2, the interval time TC of immediately before the hard ignition, i.e., interval time TC2 is calculated. Since the interval time TC2 is less than the value TCKICKBACK (the engine speed of immediately before the hard ignition is high) and the kickback will not occur, the ignition output signal is sent to the ignition circuit 66e without cutting off the ignition.

At the time T3, similarly to the time T1, the interval time TC of near the BDC, i.e., interval time TC3 is calculated and the value TCKICKBACK is calculated based on the interval time TC3.

At the time T4, the interval time TC of immediately before the hard ignition, i.e., interval time TC4 is calculated and the interval time TC4 is compared with the value TCKICKBACK. However, since it is determined to be in the exhaust stroke in another program, the ignition output signal is not transmitted.

At the time T5, similarly to the time T1, the interval time TC of near the BDC, i.e., interval time TC5 is calculated and the value TCKICKBACK is calculated based on the interval time TC5.

At the time T6, the interval time TC of immediately before the hard ignition, i.e., interval time TC6 is calculated. Since the interval time TC6 is at or above the value TCKICKBACK (the engine speed of immediately before the hard ignition is low) and the kickback likely occurs, outputting of the ignition output signal is disabled (the ignition is cut off).

Although FIG. 16 illustrates the case of the hard ignition, the same can be said for the case of the calculation ignition (soft ignition). Specifically, no matter which one of the hard ignition and calculation ignition is selected based on the engine speed NE and throttle opening TH, the ignition is cut off to prevent the kickback from occurring.

Although the foregoing third embodiment is configured so that, as in S402 and S404 in FIG. 14, when the interval time TC of immediately before the ignition command is outputted is at or above the value TCKICKBACK, the ignition is cut off, in addition thereto, it may be configured to stop the current supply to the primary side of the ignition coil 34 when the interval time TC of immediately before the ignition command is outputted is at or above a second upper limit value set equal to or greater than the value TCKICKBACK.

Further, although outputting of the ignition command is disabled based on the interval time TC of immediately before the ignition command is outputted, it suffices if the interval time TC is of near the time point of outputting the ignition command.

Further, as shown in FIG. 16, although the interval time TC in the stage 10 is employed as that of near the BDC, any interval time TC in one of the stages 6 to 9 or the average of the interval times TC of the multiple stages among the stages 6 to 10 can also be applied.

Figure 17:
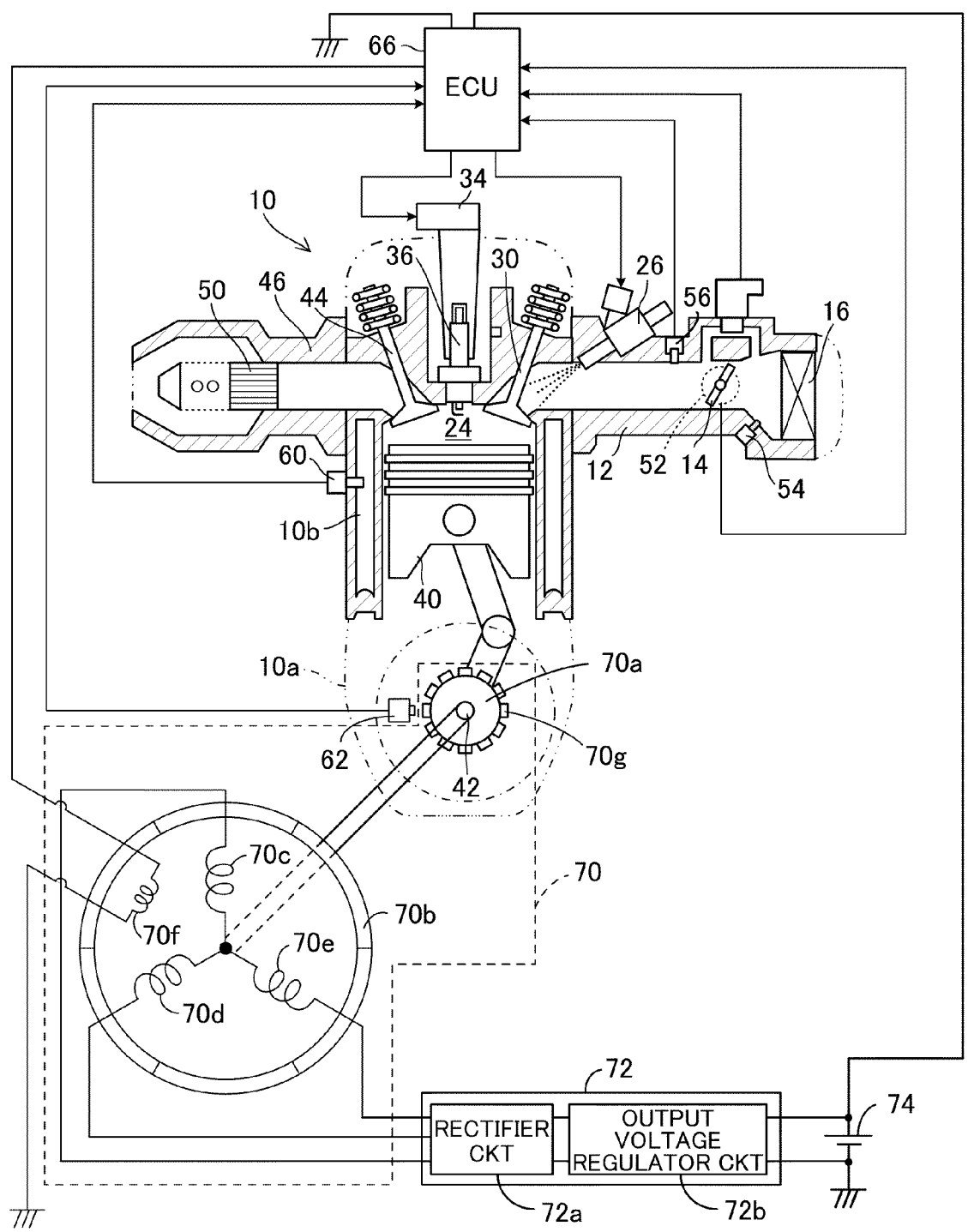
FIG. 17 is an overall view similar to FIG. 1, but schematically showing a control apparatus for an internal combustion engine according to a fourth embodiment of this invention.

FIG. 17 is an overall view similar to FIG. 1, schematically showing a control apparatus for an internal combustion engine according to a fourth embodiment of this invention.

The explanation will be made with focus on points of difference from the first embodiment. In the fourth embodiment, an AC generator 70 is connected to the crankshaft 42 of the engine 10. The generator 70 includes a rotor (timing rotor) 70a connected to the crankshaft 42, permanent magnets 70b attached to the rotor 70a, three-phase stator coils 70c, 70d, 70e and a reverse rotation detection coil 70f installed to face the permanent magnets 70b, and other components.

Figure 18:
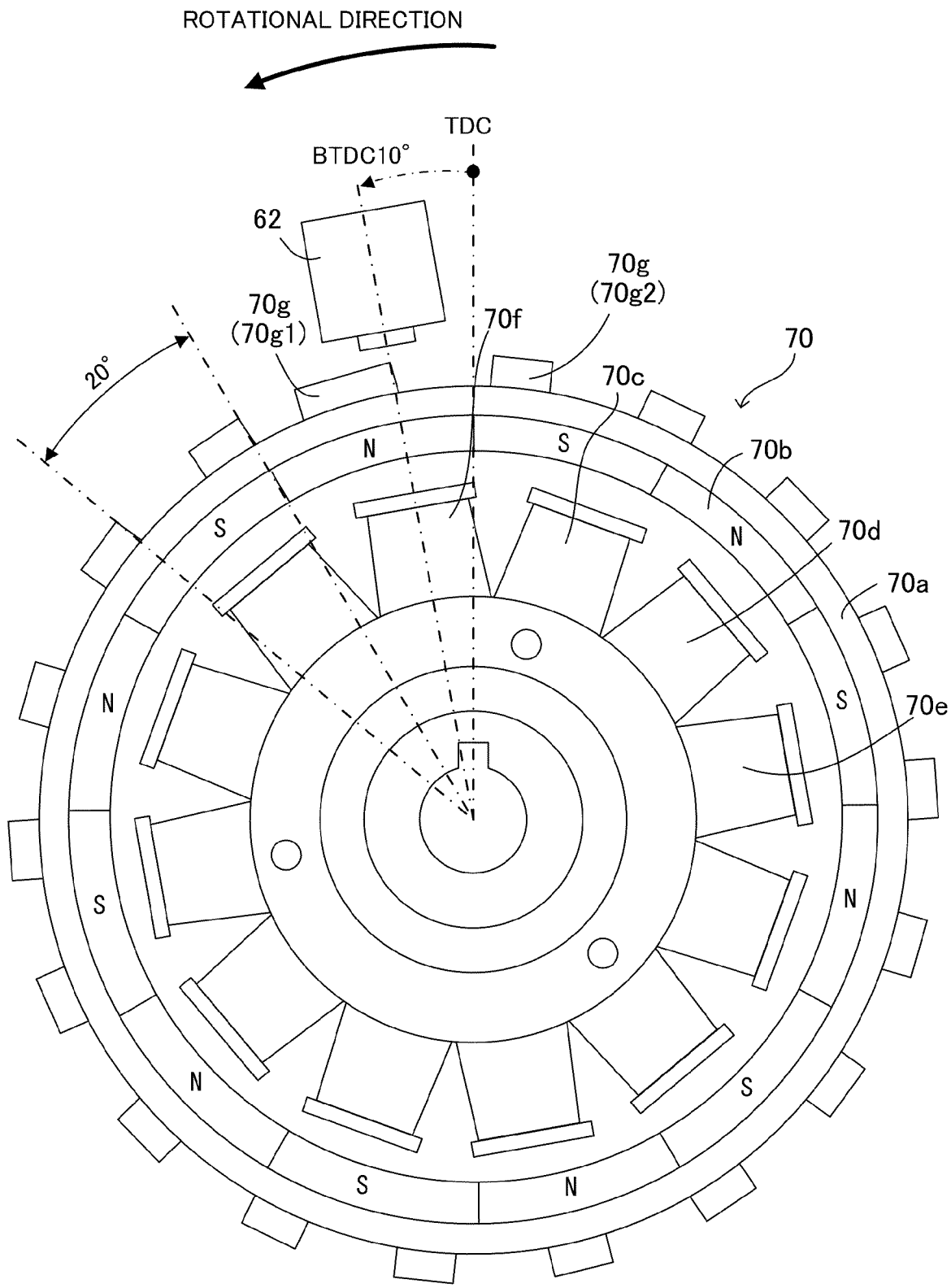
FIG. 18 is an explanatory view similar to FIG. 2, but showing a rotor, etc., constituting a generator shown in FIG. 17.

FIG. 18 is an explanatory view showing the rotor 70a, etc., constituting the generator 70.

As shown in FIG. 18, the rotor 70a having a cylindrical shape functions as the flywheel of the engine 10. The rotor 70a has the same structure as the rotor 64 in the first embodiment, so the details thereof will not be explained. Note that, in FIG. 18, the above-mentioned reference projection is designated by reference numeral 70g1 and the other projections by 70g2. The reference projection 70g1 also functions as a forward rotation determination projection used for determining whether the reverse rotation of the crankshaft 42 has returned to the forward one, which will be explained later.

The crank angle sensor 62 installed at the static position facing the projections 70g of the rotor 70a outputs the pulse signal every time each of the projections 70g passes by the sensor 62 with the rotation of the rotor 70a, as mentioned above. Specifically, the crank angle sensor 62 outputs the pulse signal (front end signal) having negative amplitude when the front end of the projection 70g passes in the rotational direction, and the pulse signal (rear end signal) having positive amplitude when the rear end thereof passes. In other words, it outputs the pulse signal (crank angle signal) having negative or positive amplitude at every predetermined crank angles (20 degrees) of the crankshaft 42. Since the reference projection 70g1 is longer in the length in the circumferential direction than the other projections 70g2, the timing of detecting the front end of the reference projection 70g1 by the crank angle sensor 62 is earlier compared to the projections 70g2.

The permanent magnets 70b are attached on the inner periphery of the rotor 70a so that its South and North poles are alternately arranged at equal angular intervals of 30 degrees, i.e., pairs of South and North poles are arranged at intervals of 60 degrees. The reverse rotation detection coil 70f is to be located at the crank angle reference position (BTDC10°).

With this, when the rotor 70a (precisely, the permanent magnets 70b attached thereto) is rotated with the rotation of the crankshaft 42, the generator 70 generates AC voltage from the stator coils 70c, 70d, 70e and reverse rotation detection coil 70f through electromagnetic induction. Specifically, the coils 70c, 70d, 70e produce three-phase (U, V and W phase) AC voltage and the coil 70f produces single-phase AC voltage.

Thus, the generator 70 comprising a permanent magnet AC generator is driven by the rotation of the crankshaft 42 to produce AC voltage. A period of time taken for the rotor 70a (crankshaft 42) to rotate 60 degrees corresponds to one period or cycle of the AC voltage outputted from the coil 70f.

The explanation of FIG. 17 is resumed. The three-phase AC voltage outputted from the coils 70c, 70d, 70e of the generator 70 is inputted to a battery 74 via a regulator rectifier 72.

The regulator rectifier 72 includes a rectifier circuit 72a and output voltage regulator circuit 72b. The rectifier circuit 72a rectifies the three-phase AC voltage from the coils 70c, 70d, 70e into DC voltage through a bridge circuit (not shown) and outputs it to the regulator circuit 72b. The regulator circuit 72b regulates the inputted DC voltage to generate power voltage to be supplied to the battery 74 for charging it and also supplied to the ECU 66 as operating power. The battery 74 supplies operating power to the ECU 66 in the case where, for example, the generator 70 does not generate the AC voltage at the engine start.

The AC voltage from the coil 70f of the generator 70 is inputted to the ECU 66, like the outputs of the sensors such as the crank angle sensor 62.

Figure 19:
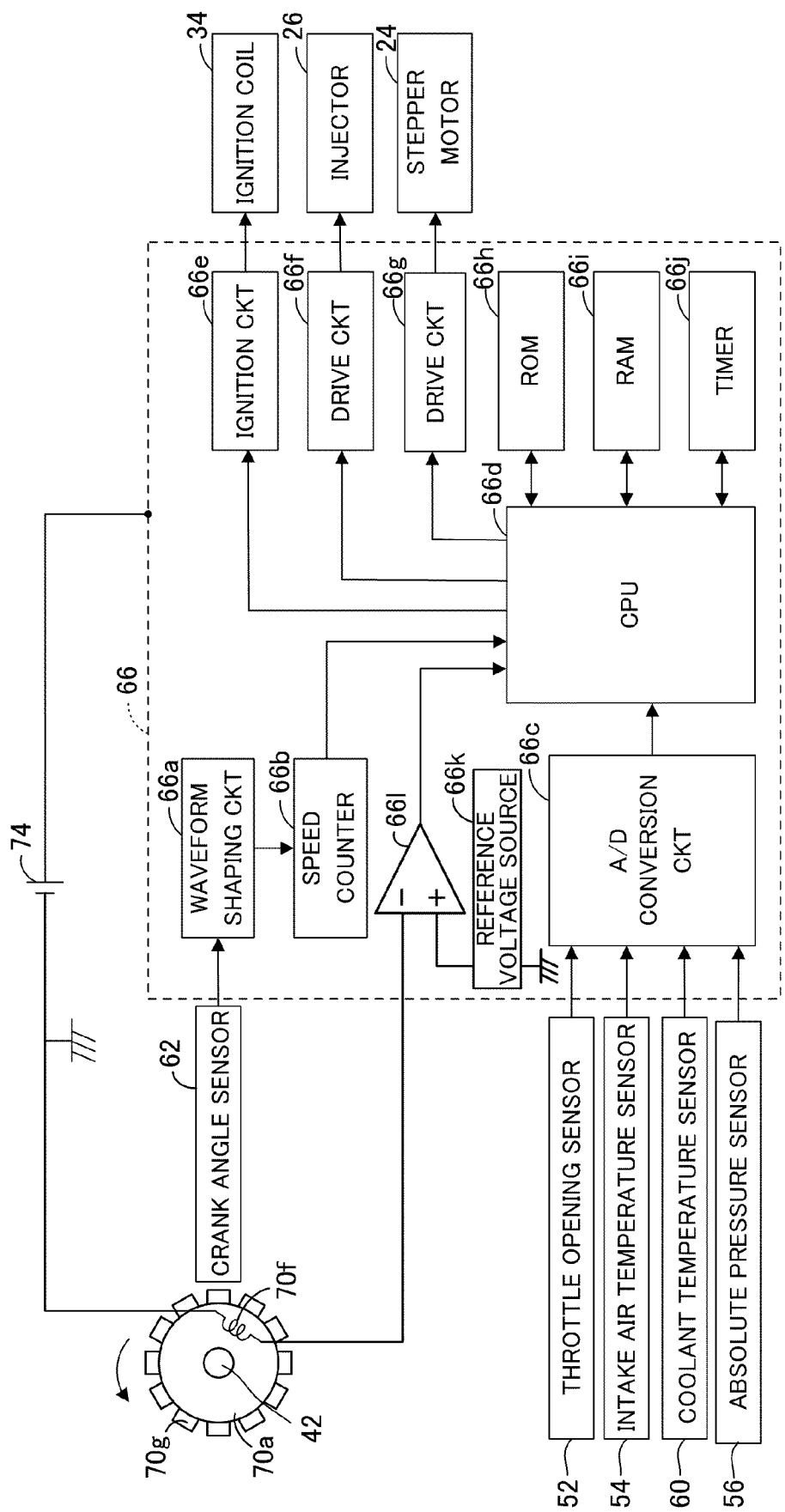
FIG. 19 is a block diagram similar to FIG. 3, but showing an overall configuration of an electronic control unit shown in FIG. 17.

FIG. 19 is a block diagram similar to FIG. 3, but showing an overall configuration of the ECU 66.

As shown in FIG. 19, the ECU 66 according to the fourth embodiment is equipped, in addition to the configuration shown in FIG. 3, with a reference voltage source 66k and comparator circuit 66l.

The reference voltage source 66k outputs negative DC voltage as reference voltage to a noninverting input terminal of the comparator circuit 66l. The comparator circuit 66l constituted of an operational amplifier is inputted with the AC voltage from the coil 70f through its inverting input terminal. The comparator circuit 66l compares the AC voltage with the reference voltage and outputs to the CPU 66d a high level comparison result signal when the AC voltage is greater than the reference voltage (i.e., is positive) and a low level comparison result signal when the AC voltage is less than the reference voltage (i.e., is negative).

Figure 20:
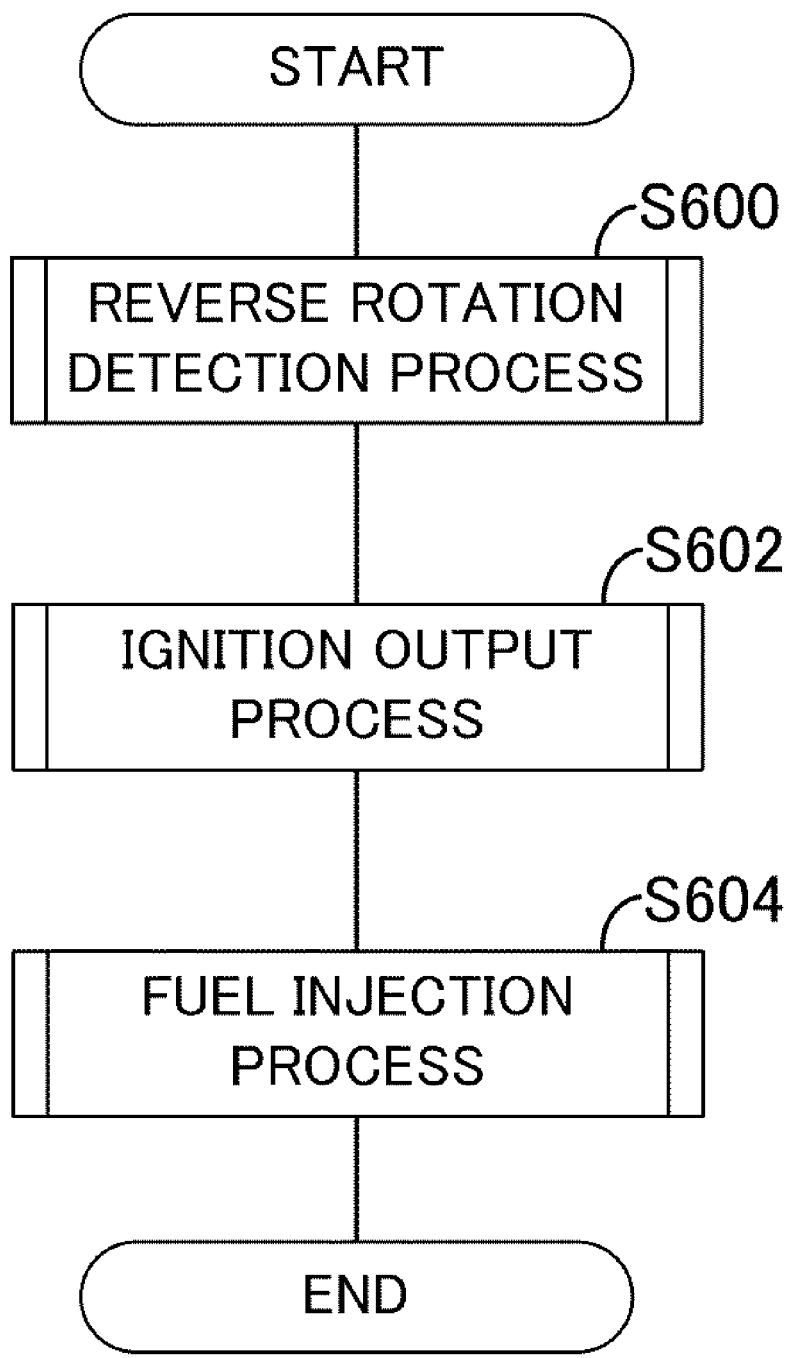
FIG. 20 is a flowchart showing the operation of the apparatus shown in FIG. 17.

FIG. 20 is a flowchart showing the operation of the apparatus according to the fourth embodiment. The illustrated program is executed by the ECU 66 every time the crank angle signal is inputted.

In S600, the reverse rotation of the crankshaft 42 is detected.

Figure 21:
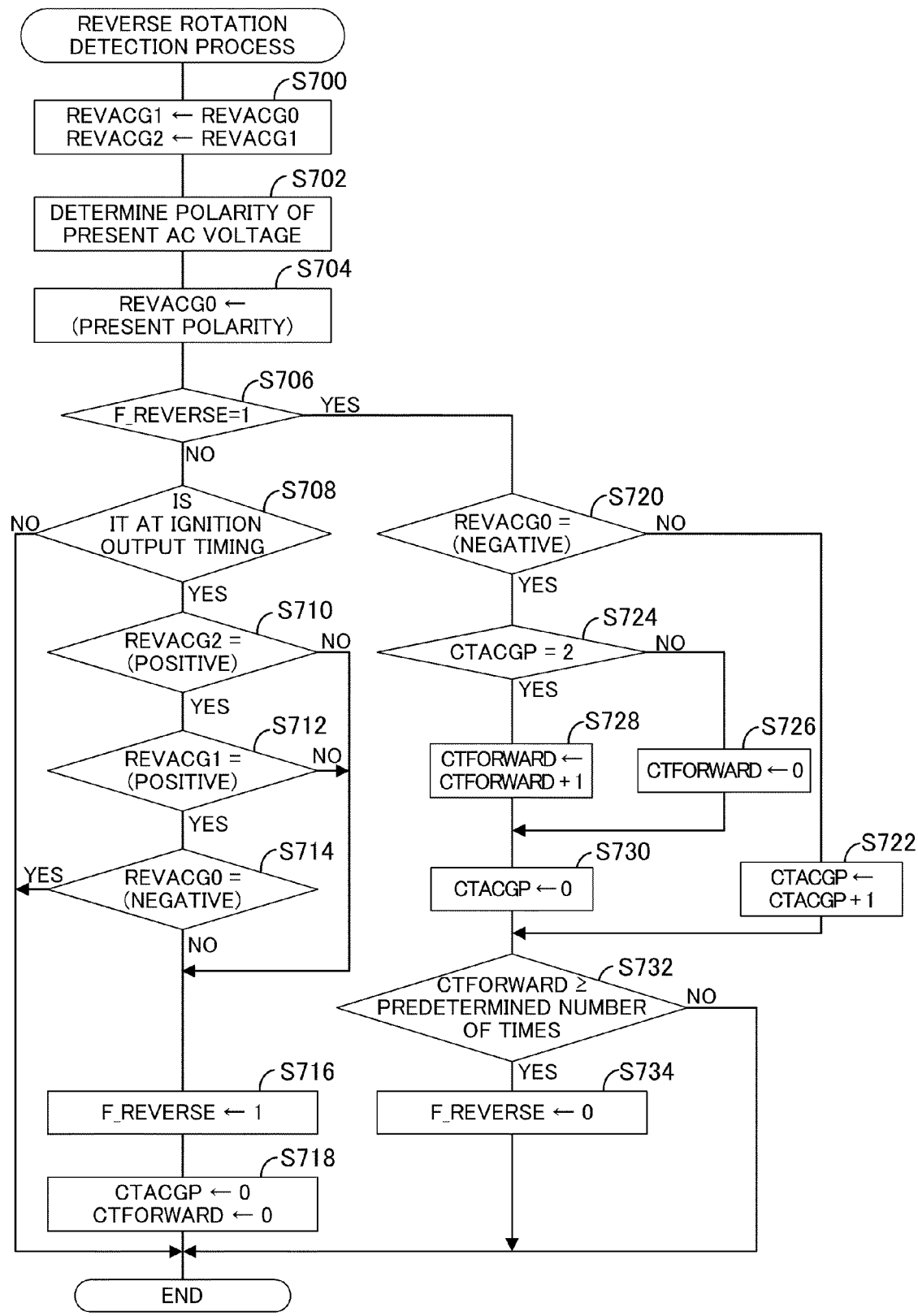
FIG. 21 is a subroutine flowchart of a reverse rotation detection process in FIG. 20.

FIG. 21 is a subroutine flowchart of a reverse rotation detection process in S600 of FIG. 20.

Prior to explaining FIG. 21, the detection of the reverse rotation will be explained with reference to FIG. 22 time chart.

Figure 22:
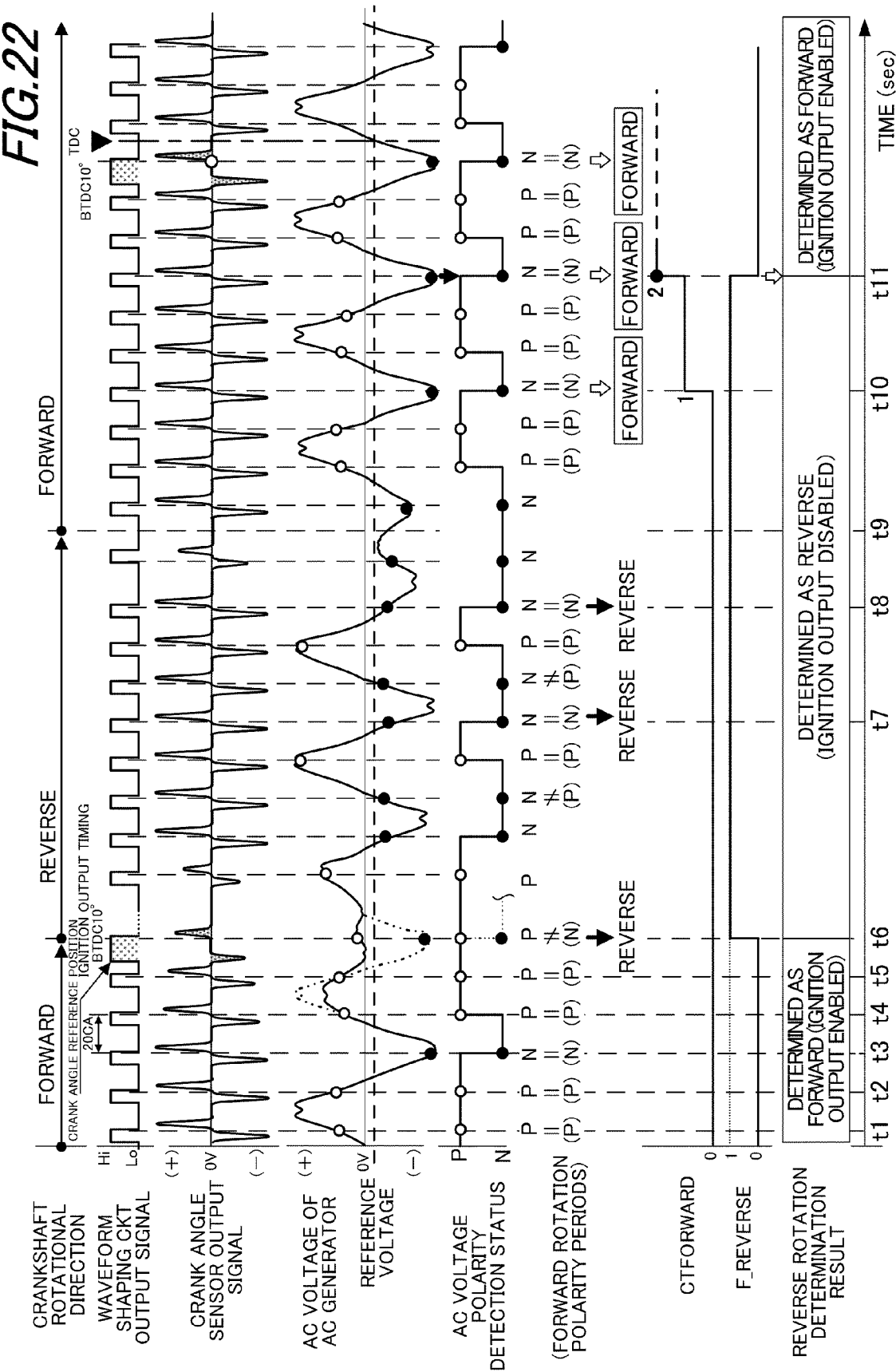
FIG. 22 is a time chart showing the operation of the apparatus shown in FIG. 17.

FIG. 22 indicates, in order from the top, an actual rotating direction of the crankshaft 42, the output signals of the waveform shaping circuit 66a and crank angle sensor 62, the AC voltage outputted from the coil 70f of the generator 70, detection status of polarity of the AC voltage, and a value of a forward rotation period counter CTFORWARD and a reverse rotation detection flag F_REVERSE (both explained later). In the drawing, the positive polarity is indicated by P and the negative polarity by N.

The explanation will be made taking as an example a period from the time t1 to t6 in which the crankshaft 42 is rotated forward. As described above, when the rotor 70a is rotated with the rotation of the crankshaft 42, the crank angle sensor 62 outputs the negative pulse signal upon passing of the front end of the projection 70g in the rotational direction and the positive pulse signal upon passing of the rear end thereof.

The waveform shaping circuit 66a waveform-shapes so that the negative pulse signal of the crank angle sensor 62 becomes high level and the positive pulse signal becomes low level, and outputs them. Therefore, an interval between falling edges (rear end signals) of two consecutive pulse signals from the waveform shaping circuit 66a corresponds to a time period that the crankshaft 42 rotates 20 degrees (20CA).

The coil 70f of the generator 70 outputs the AC voltage whose period corresponds to a time period that the rotor 70a (crankshaft 42) rotates 60 degrees. In the case where the polarity of the AC voltage is detected or determined based on the comparison result signal of the comparator circuit 66l at the time when the crank angle sensor 62 outputs the crank angle signal, i.e., the pulse signal from the waveform shaping circuit 66a falls (at the falling edge), as shown, the polarity is positive at the time t1, positive at the time t2 and negative at the time t3.

Although, in FIG. 22, the rotation of the crankshaft 42 is reversed at the time t6, assuming the case where it is not reversed at the time t6 (the forward rotation continues) as indicated by an imaginary line, the polarity is to be positive at the time t4, positive at the time t5 and negative at the time t6 (i.e., at the ignition output timing), similarly to the time t1 to t3.

Specifically, at the time when the crank angle signal is outputted, a period of polarity of AC voltage from the generator 70 at the time the crankshaft 42 is rotated forward exhibits polarity order of positive, positive and negative. A group of periods having this polarity order is called the "forward rotation polarity periods" in the following. Thus, the apparatus in the fourth embodiment is configured to determine the polarity of the AC voltage from the generator 70 when the crank angle signal is outputted, compare periods of the determined polarities with the forward rotation polarity periods, and determine that the crankshaft 42 is rotated forward (i.e., detects the forward rotation) when the periods of the determined polarities are identical with the forward rotation polarity periods, while determining that the crankshaft 42 is reversely rotated (i.e., detecting the reverse rotation) when they are not identical.

Based on the premise of the foregoing configuration, the explanation of FIG. 21 will be made with reference to FIG. 22.

In S700, a present voltage polarity REVACG0 (described later) set in the preceding loop is set to a previous voltage polarity REVACG1 and the previous voltage polarity REVACG1 set in the preceding loop is set to a last but one voltage polarity REVACG2, i.e., the previous voltage polarity REVACG1 and last but one voltage polarity REVACG2 are updated.

In S702, the polarity of the present AC voltage outputted from the generator 70 is determined or detected (precisely, when the crank angle signal is outputted). Specifically, the polarity is determined based on the comparison result signal of the comparator circuit 66*l*, i.e., is determined to be positive when the AC voltage is greater than the reference voltage and negative when it is less than the reference voltage, as shown in FIG. 22.

In S704, the determined polarity of the AC voltage is set to the present voltage polarity REVACG0. The present voltage polarity REVACG0 represents the polarity of the present AC voltage, the previous voltage polarity REVACG1 represents that at the time when the previous crank angle signal was outputted (e.g., at the time t2 in the case of the present time being t3 in FIG. 22), and the last but one voltage polarity REVACG2 represents that at the time when the last but one crank angle signal was outputted (e.g., at the time t1 in the above case).

Next, in S706, it is determined whether a bit of the reverse rotation detection flag F_REVERSE (described later) is 1. Since the initial value of the flag F_REVERSE is 0, the result in the first program loop is No and the program proceeds to S708, in which it is determined whether the crank angle is positioned at the ignition output timing (e.g., BTDC10°; crank angle reference position) at which an ignition control signal is to be outputted.

The determination in S708 is made based on the output of the waveform shaping circuit 66*a*. To be specific, since, as mentioned above, the reference projection 70*g*1 is installed at the crank angle reference position corresponding to the ignition output timing, when the reference projection 70*g*1 passes the vicinity of the crank angle sensor 62, the pulse signal of long high level period is outputted from the waveform shaping circuit 66*a*, as shown in FIG. 22. Therefore, when the falling edge of such the long pulse signal is detected, a determination can be made that the crank angle is positioned at the ignition output timing.

When the result in S708 is No, the remaining steps are skipped and when the result is Yes, the program proceeds to S710, in which it is determined whether the last but one voltage polarity REVACG2 is positive. When the result in S710 is Yes, in S712, it is determined whether the previous voltage polarity REVACG1 is positive and when the result in S712 is Yes, in S714, it is determined whether the present voltage polarity REVACG0 is negative.

Specifically, the steps of S710 to S714 are conducted to determine whether the polarity periods of the AC voltage determined in the processing of S700 to S704 are identical with the forward rotation polarity periods (i.e., the periods having the polarity order of positive, positive and negative) by comparing them.

When the result in S714 is Yes, i.e., the polarity periods of the AC voltage are identical with the forward rotation polarity periods, the rotation of the crankshaft 42 is determined to be forward and the remaining steps are skipped. On the other hand, when the result is No in one of steps of S710 to S714, i.e., the polarity periods of the AC voltage are not identical with the forward rotation polarity periods as seen at the time t6 of FIG. 22, the rotation of the crankshaft 42 is determined to be reversed and the program proceeds to S716, in which a bit of the reverse rotation detection flag F_REVERSE is set to 1. A bit of the flag F_REVERSE being set to 1 amounts to determining the reverse rotation of the crankshaft 42 and that being reset to 0 to determining the forward rotation thereof.

Next, in S718, values of a positive voltage counter CTACGP and the forward rotation period counter CTFORWARD, which are used in processing described later, are reset to 0. The other steps in FIG. 21 will be explained later.

Returning to the FIG. 20 flowchart, the program proceeds to S602, in which an ignition output process is conducted.

Figure 23:
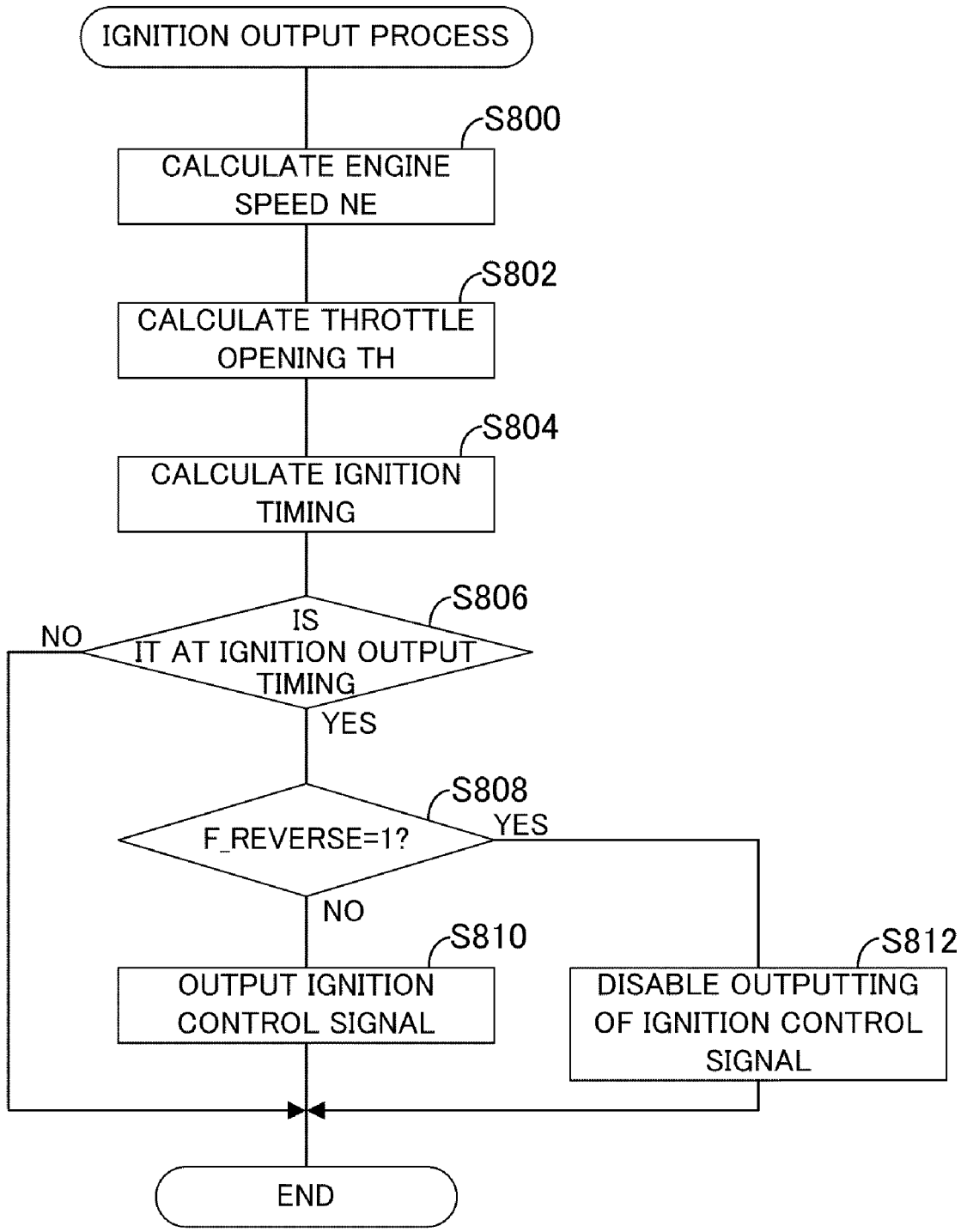
FIG. 23 is a subroutine flowchart showing ignition output process in FIG. 20.

FIG. 23 is a subroutine flowchart showing the process.

As shown in FIG. 23, in S800, the engine speed NE is calculated or detected based on the output of the crank angle sensor 62, in S802, the opening TH of the throttle valve 14 is calculated or detected based on the output of the throttle opening sensor 52, and in S804, based on the calculated engine speed NE and throttle opening TH, the ignition timing is calculated by retrieving mapped values prepared beforehand.

In S806, it is determined whether the crank angle is positioned at the ignition output timing. When the result is No, the remaining steps are skipped and when the result is Yes, the program proceeds to S808, in which it is determined whether a bit of the reverse rotation detection flag F_REVERSE is 1.

When the result in S808 is No, i.e., the rotation of the crankshaft 42 is determined to be forward, the program proceeds to S810, in which the ignition control signal is outputted to conduct the ignition at the calculated ignition timing. When the result in S808 is Yes, i.e., the rotation of the crankshaft 42 is determined to be reversed, in S812, outputting of the ignition control signal is disabled, i.e., the ignition of the engine 10 is cut off.

Returning to the FIG. 20 flowchart, the program proceeds to S604, in which a fuel injection process is conducted.

Figure 24:
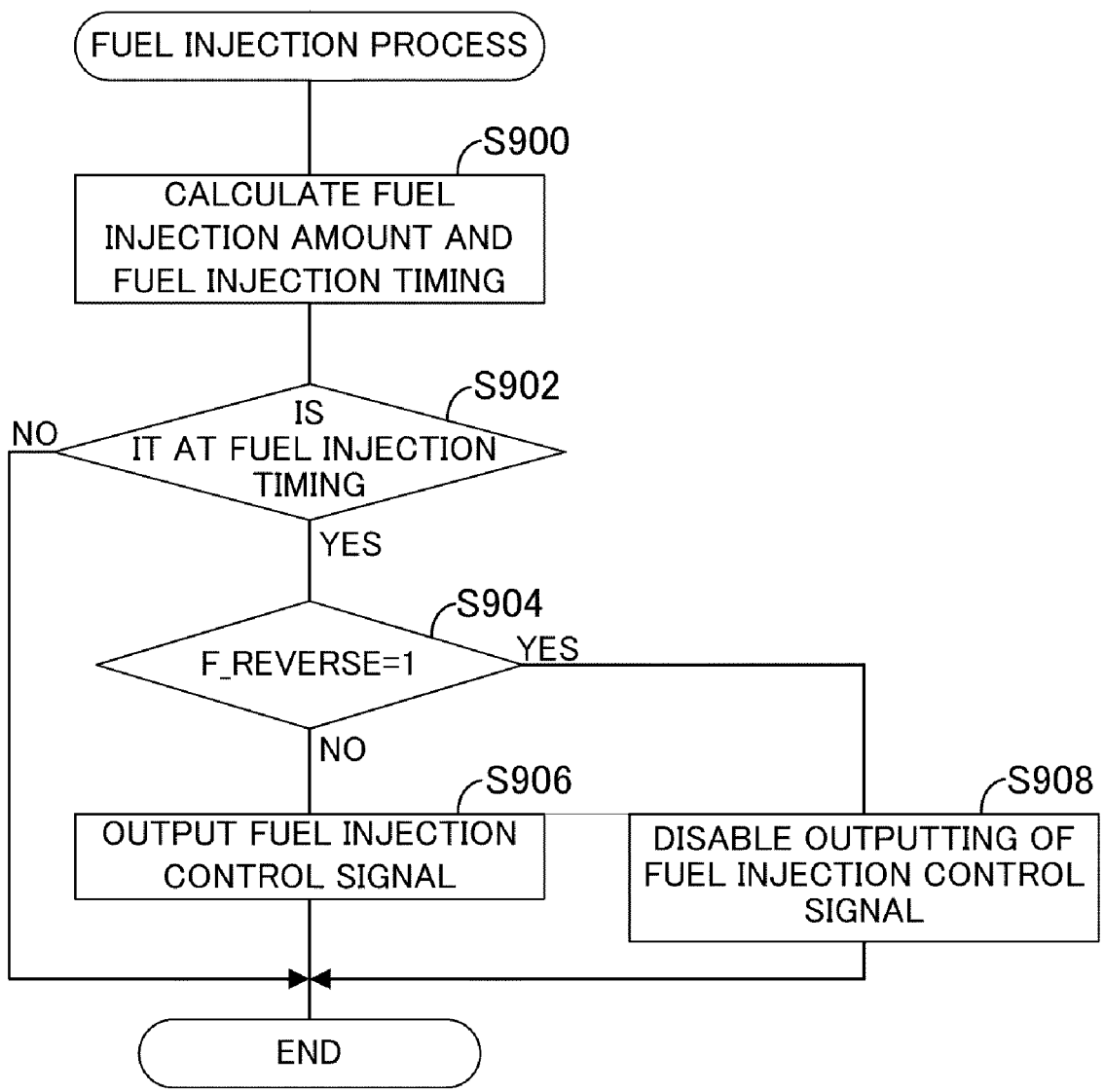
FIG. 24 is a subroutine flowchart showing a fuel injection process in FIG. 20.

FIG. 24 is a subroutine flowchart showing the process.

In S900, a fuel injection amount and fuel injection timing are calculated by retrieving mapped values prepared beforehand using the engine speed NE, throttle opening TH and the like as address data. Next, in S902, it is determined whether the crank angle is positioned at the calculated fuel injection timing. When the result in S902 is No, the remaining steps are skipped and when the result is Yes, the program proceeds to S904, in which it is determined whether a bit of the reverse rotation detection flag F_REVERSE is 1.

When the result in S904 is No, the program proceeds to S906, in which the fuel injection control signal is outputted for injecting fuel from the injector 26. When the result in S904 is Yes, i.e., the rotation of the crankshaft 42 is determined to be reversed, the program proceeds to S908, in which outputting of the fuel injection control signal is disabled, i.e., the ignition of the engine 10 is cut off.

As described, when the crankshaft 42 is determined to be rotated reversely and a bit of the flag F_REVERSE is set to 1, the ignition and fuel injection of the engine 10 is disabled and, in the next and ensuing loops, the result in S706 of FIG. 21 flowchart becomes Yes and the program proceeds to S720. The processing of S720 and subsequent steps is conducted to determine the timing to cancel the disabled condition of the ignition and fuel injection.

Explaining it further in the following, in S720, it is determined whether the present voltage polarity REVACG0 is negative. When the result is No, in S722, a value of the positive voltage counter CTACGP is incremented by 1. Since the processing of S722 is repeated until the result in S720 becomes Yes, the value of the counter CTACGP represents the number of times that the AC voltage polarity is determined to be positive (i.e., the result in S720 is No) before the determination of negative polarity is made in S720.

When the result in S720 is Yes, the program proceeds to S724, in which it is determined whether the value of the counter CTACGP is 2. Specifically, the steps of S720 and S724 are conducted to determine whether the AC voltage polarity in the present program loop is determined to be negative and those in the last two loops are determined to be positive, in other words, whether the polarity periods of the AC voltage are identical with the forward rotation polarity periods.

When the result in S724 is No, i.e., they are not identical (as seen at the times t7 and t8 of FIG. 22), the program proceeds to S726, in which the value of the forward rotation period counter CTFORWARD is reset to 0. When the result in S724 is Yes, i.e., they are identical (at the time t10 in FIG. 22, assuming the case where the actual crankshaft 42 rotation returns to the forward one at the time t9), in S728, the value of the counter CTFORWARD is incremented by 1. Thus, the value of the counter CTFORWARD represents the number of times that the above identical condition is determined to be established after the determination of reverse rotation is made.

Next, in S730, the value of the counter CTACGP is reset to 0 and in S732, it is determined whether the value of the counter CTFORWARD is equal to or greater than a predetermined number of times (two times), i.e., whether the number of times that the identical condition is established reaches the predetermined number of times. When the result in S732 is No, the remaining steps are skipped, while, when the result is Yes (at the time t11 in FIG. 22), it is determined that the reverse rotation of the crankshaft 42 has certainly returned to the forward rotation and the program proceeds to S734, in which a bit of the flag F_REVERSE is reset to 0.

A bit of the flag F_REVERSE being reset to 0 makes the result in S808 No, as explained above, and the program proceeds to S810, in which the ignition control signal is outputted to restart the ignition, i.e., the ignition disabled condition is canceled. Similarly it makes the result in S904 No and the program proceeds to S906, in which the fuel injection control signal is outputted to restart the fuel injection, i.e., the fuel injection disabled condition is canceled.

Figure 25:
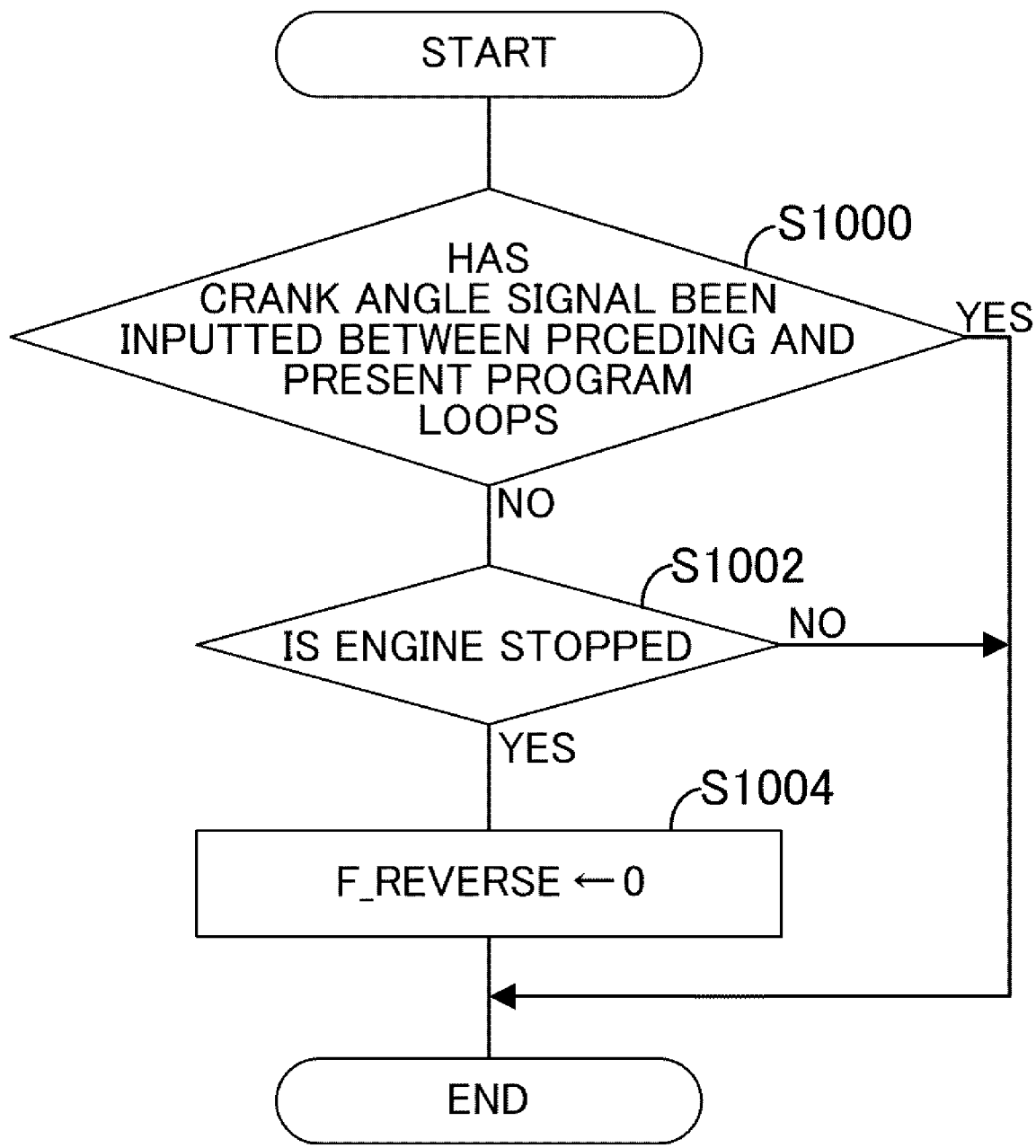
FIG. 25 is a flowchart showing the operation of the apparatus conducted in parallel with the FIG. 20 flowchart.

FIG. 25 is a flowchart showing the operation conducted by the ECU 66 in parallel with the FIG. 20 flowchart. The illustrated program is executed at predetermined interval, e.g., 5 milliseconds.

In S1000, it is determined whether the crank angle signal has been inputted from the crank angle sensor 62 between the preceding program loop and the present program loop.

When the result in S1000 is Yes, the remaining steps are skipped and when the result is No, the program proceeds to S1002, in which it is determined whether the engine 10 is stopped, precisely, the crankshaft 42 is completely stopped. In S1002, when the crank angle signal is not inputted from the crank angle sensor 62 for a predetermined time period (e.g., 200 milliseconds), the determination of engine stop is made.

When the result in S1002 is No, the program is terminated. When the result is Yes, the program proceeds to S1004, in which a bit of the reverse rotation detection flag F_REVERSE is reset to 0. Thus, when the engine 10 is stopped, a bit of the flag F_REVERSE is reset to 0 to cancel the disabled condition of ignition and fuel injection, thereby preparing for the next execution of the program.

Figure 26:
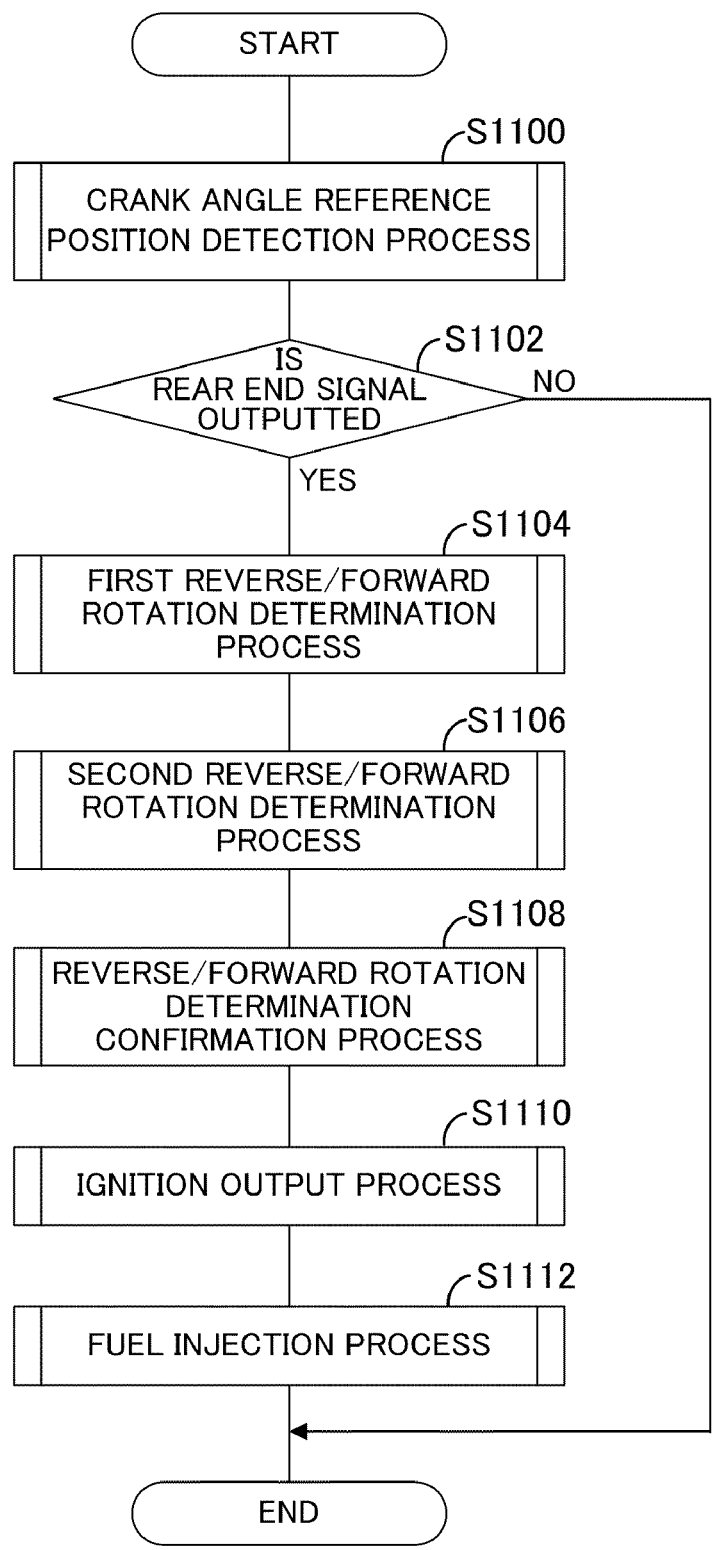
FIG. 26 is a flowchart similar to FIG. 20, but showing the operation of a control apparatus for an internal combustion engine according to a fifth embodiment of this invention.

FIG. 26 is a flowchart showing the operation of a control apparatus for an internal combustion engine according to a fifth embodiment of this invention. The illustrated program is executed by the ECU 66 every time the crank angle signal corresponding to either the front end or rear end of each projection 70g of the rotor 70a is inputted.

Figure 27:
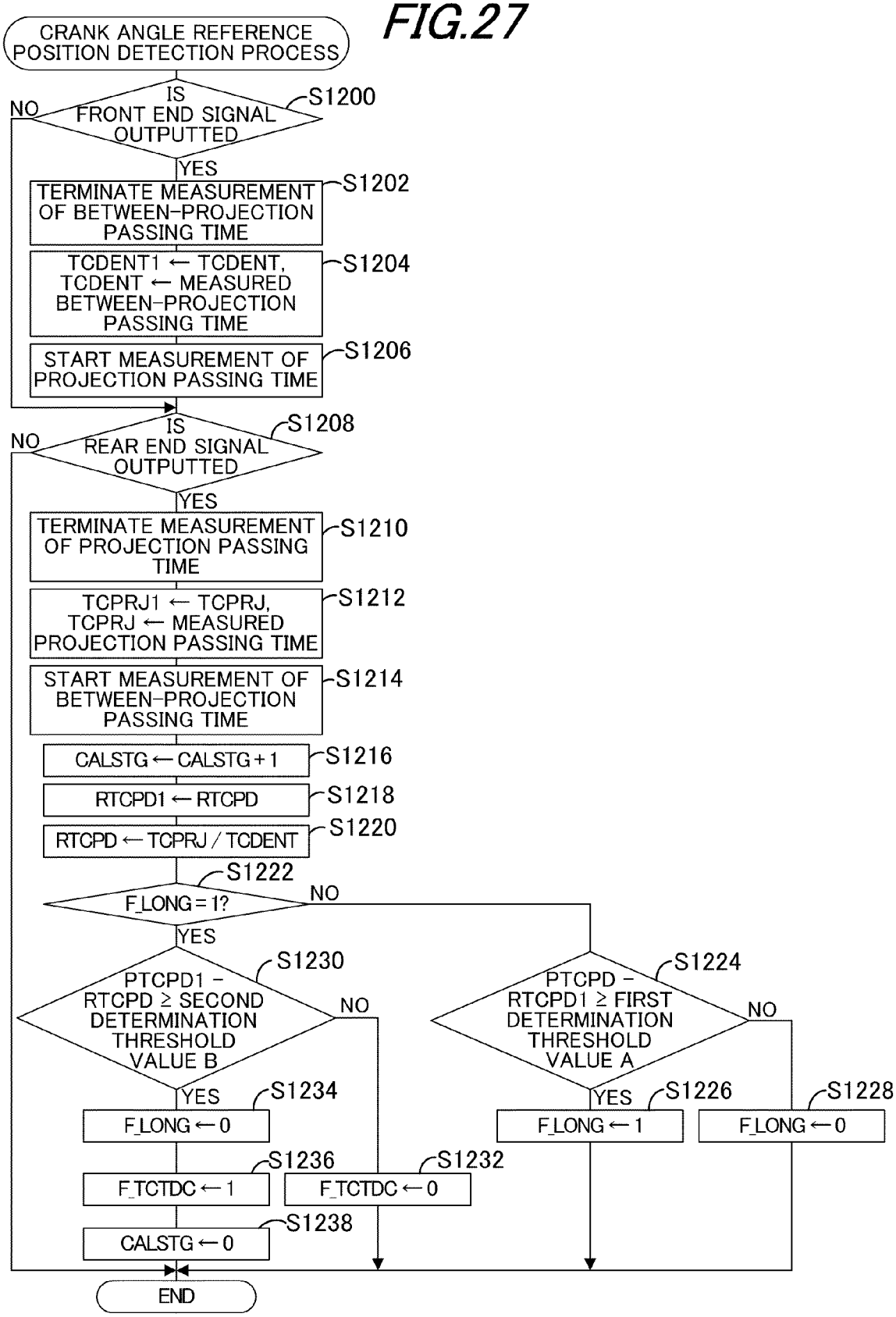
FIG. 27 is a subroutine flowchart showing a crank angle reference position detection process in FIG. 26.
Figure 28:
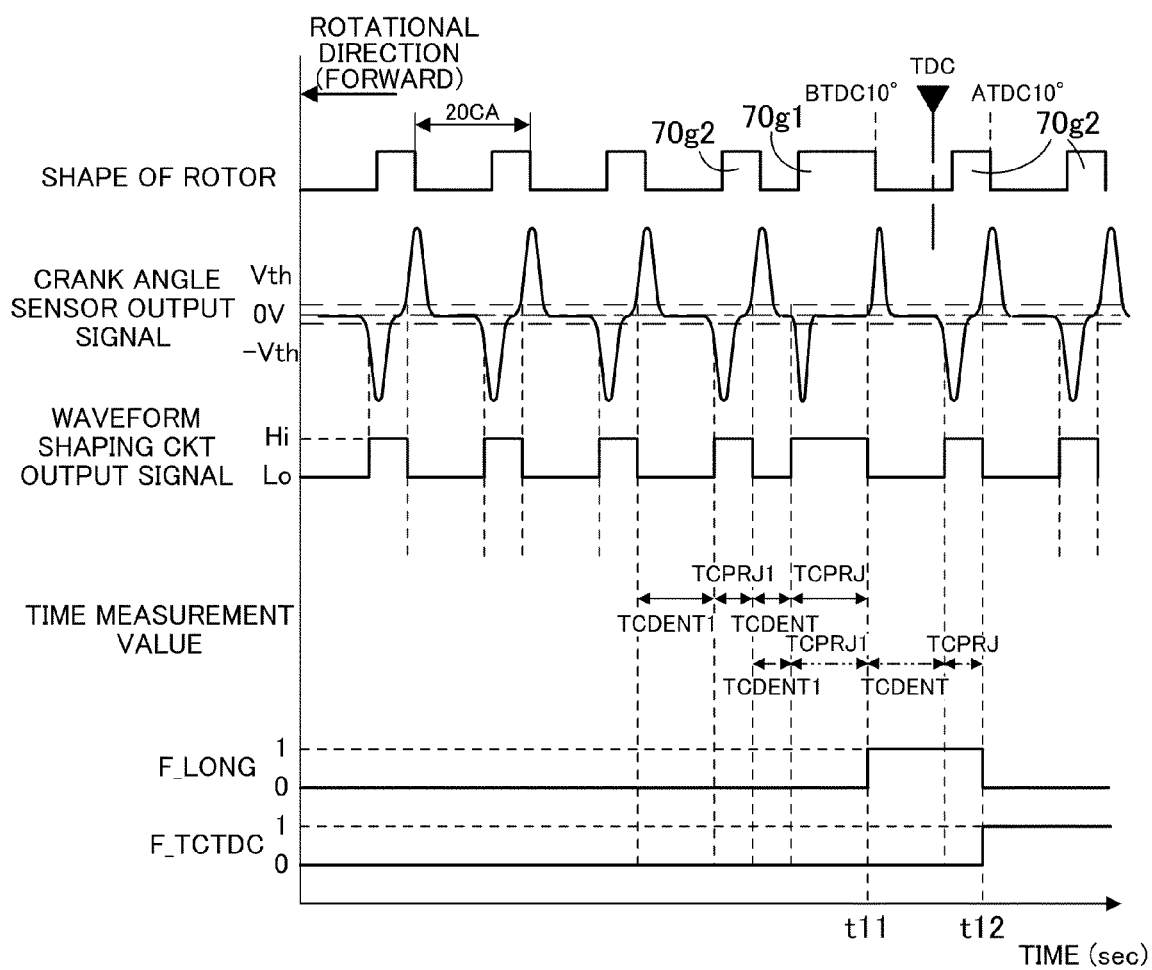
FIG. 28 is a time chart for explaining detection of a crank angle reference position shown in FIG. 27.

The explanation of the fifth embodiment will focus on the points of difference from the fourth embodiment. In S1100, a crank angle reference position detection process is conducted. FIG. 27 is a subroutine flowchart showing the process and FIG. 28 is a time chart for explaining detection of the crank angle reference position.

Prior to explaining FIG. 27, detection of the crank angle reference position will be explained with reference to FIG. 28. FIG. 28 indicates, in order from the top, a shape of periphery of the rotor 70a, the output signal of the crank angle sensor 62, the output signal of the waveform shaping circuit 66a, etc.

The crank angle reference position is determined by checking as to whether the reference projection 70g1 of the rotor 70a is detected based on the pulse signals of the crank angle sensor 62. Specifically, as shown in FIG. 28, the crank angle sensor 62 outputs the front end signal (negative pulse signal) when the front end of the projection 70g passes, and the rear end signal (positive pulse signal) when the rear end thereof passes. The waveform shaping circuit 66a outputs a pulse signal that becomes high level when the signal from the crank angle sensor 62 is the front end signal at or below predetermine voltage −Vth and becomes low level when the signal is the rear end signal at or above predetermine voltage +Vth.

Therefore, a time period that the high level pulse signals are outputted by the waveform shaping circuit 66a corresponds to a time period from when the crank angle sensor 62 outputs the front end signal to when it outputs the rear end signal, i.e., a time period that one of the projections 70g passes. On the other hand, a time period that the low level pulse signals are outputted corresponds to a time period from when the rear end signal is outputted to when the front end signal of the next one of the projections 70g is outputted, i.e., a time period that a portion between two adjacent projections 70g passes. In the following, the time period that one projection 70g passes is called the "projection passing time" and the time period that a portion between two adjacent projections 70g passes is called the "between-projection passing time."

Since the timing of detecting the front end of the reference projection 70g1 by the crank angle sensor 62 is earlier compared to the case of the other projections 70g2 as explained above, the projection passing time and between-projection passing time of the reference projection 70g1 are different from those of the other projections 70g2.

With this configuration, the apparatus according to this embodiment is configured to measure the projection passing time and between-projection passing time, determine whether the reference projection 70g1 has been detected or passed based on the measured times, and determine that the crankshaft 42 is positioned at the crank angle reference position when the reference projection 70g1 is detected.

This will be further explained with reference to the FIG. 27 flowchart. In S1200, it is determined whether the front end signal is outputted by the crank angle sensor 62, i.e., the rising edge is detected in the waveform shaping circuit 66a. When the result is Yes, the program proceeds to S1202, in which measurement of the between-projection passing time by the timer 66j (described later) is terminated, and to S1204, in which a between-projection passing time TCDENT set in the preceding program loop is set to a previous between-projection passing time TCDENT1 and the between-projection passing time obtained in S1202 is set to the between-projection passing time TCDENT as the present value, in other words, the times TCDENT and TCDENT1 are updated.

Next, in S1206, measurement of the projection passing time is started. After the processing of S1206 or when the result in S1200 is No, the program proceeds to S1208, in which it is determined whether the rear end signal is outputted by the crank angle sensor 62, i.e., the falling edge is detected in the waveform shaping circuit 66a. When the result in S1208 is No, the remaining steps are skipped and when the result is Yes, the program proceeds to S1210, in which the measurement of the projection passing time started in S1206 is terminated.

In S1212, a projection passing time TCPRJ set in the preceding program loop is set to a previous projection passing time TCPRJ1 and the projection passing time obtained in S1210 is set to the projection passing time TCPRJ as the present value, in other words, the times TCPRJ and TCPRJ1 are updated. Then, in S1214, measurement of the between-projection passing time is started.

Thus, the processing of S1200 to S1214 is done to measure the projection passing time TCPRJ between the front end signal output and rear end signal output, and the between-projection passing time TCDENT between the rear end signal output and output of the front end signal of next projection 70g. The times TCPRJ and TCDENT are measured for every output of front end signal and rear end signal of each projection 70g, as mentioned above.

The program proceeds to S1216, in which a value of crank stage CALSTG is incremented by 1. The crank stage CALSTG is a stage number obtained by dividing one crankshaft rotation (360CA) by using the projections 70g, i.e., a number indicating each of 18 crank angle positions from 0 to 17 with a position at 10 degrees after the TDC (ATDC10°) as 0, as explained above. The crank stage CALSTG is utilized for the ignition timing control, fuel injection control or the like.

Next, in S1218, a first ratio RTCPD between the times TCPRJ and TCDENT calculated in the preceding program loop is set to a previous first ratio RTCPD1 as a previous value and in S1220, a ratio between the times TCPRJ and TCDENT calculated in S1204 and S1212 is calculated and set the calculated ratio to the first ratio RTCPD as a present value. Specifically, the present first ratio RTCPD is calculated in accordance with the following Equation 1.

$$RTCPD = TCPRJ/TCDENT \quad \text{Eq. 1}$$

The program proceeds to S1222, in which it is determined whether a bit of a reference projection detection flag F_LONG, which indicates that the reference projection 70g1 has been detected, is 1. Since the initial value of the flag F_LONG is 0, the result in the first program loop is No and the program proceeds to S1224, in which a change of the first ratio RTCPD to the previous first ratio RTCPD1 (i.e., a difference thereof obtained by subtracting the previous first ratio RTCPD1 from the first ratio RTCPD) is calculated and it is determined whether the calculated change is equal to or greater than a first determination threshold value A.

The processing of S1224 is explained with reference to FIG. 28. Since the reference projection 70g1 is longer in the length in the circumferential direction than the other projections 70g2, the first ratio RTCPD obtained by dividing the projection passing time TCPRJ by the between-projection passing time TCDENT is greater than the previous first ratio RTCPD1 at the time t11 at which the rear end of the reference projection 70g1 passes. Therefore, in S1224, the change between the ratios RTCPD and RTCPD1 is calculated and when the change is at or above the first determination threshold value A, it is determined that the reference projection 70g1 has passed. The threshold value A is defined taking the length of the reference projection 70g1 in the circumferential direction, etc., into account so as to be capable of determining the passing of the reference projection 70g1.

When the result in S1224 is Yes, the program proceeds to S1226, in which a bit of the flag F_LONG is set to 1, while, when the result is No (i.e., the reference projection 70g1 is determined to have not passed), in S1228, a bit of the flag F_LONG is reset to 0.

A bit of the flag F_LONG being set to 1 makes the result in S1222 in the subsequent loops Yes, and the program proceeds to S1230, in which a change of the previous first ratio RTCPD1 to the first ratio RTCPD (i.e., a difference thereof obtained by subtracting the first ratio RTCPD from the previous first ratio RTCPD1) is calculated and it is determined whether the calculated change is equal to or greater than a second determination threshold value B.

Explaining this processing further, as can be seen in FIG. 28, the first ratio RTCPD obtained by dividing the projection passing time TCPRJ by the between-projection passing time TCDENT (both indicated by imaginary lines) is less than the previous first ratio RTCPD1 at the time t12 at which, after the reference projection 70g1 passed, the next projection 70g2 passes. Therefore, in S1230, a change between the ratios RTCPD1 and RTCPD is calculated through subtraction and when the change is at or above the second determination threshold value B, it is determined that the projection 70g2 next of the reference projection 70g1 has passed. The threshold value B is defined taking the lengths of the projections 70g1 and 70g2 in the circumferential direction, etc., into account so as to be capable of determining the passing of the next projection 70g2.

When the result in S1230 is No, in S1232, a bit of a reference position detection flag F_TCTDC is reset to 0. When the result in S1230 is Yes (i.e., the reference projection 70g1 and the next projection 70g2 are determined to have sequentially passed), since it means that the crank angle reference position (BTDC10°) is certainly detected, the program proceeds to S1234, in which a bit of the flag F_LONG is reset to 0 and to S1236, in which a bit of the flag F_TCTDC is set to 1.

A bit of the flag F_TCTDC being set to 1 means that the crank angle reference position was certainly detected and that being reset to 0 means that it is not detected. Following to the processing of S1236, in S1238, the value of the crank stage CALSTG is reset to 0.

Figure 29:
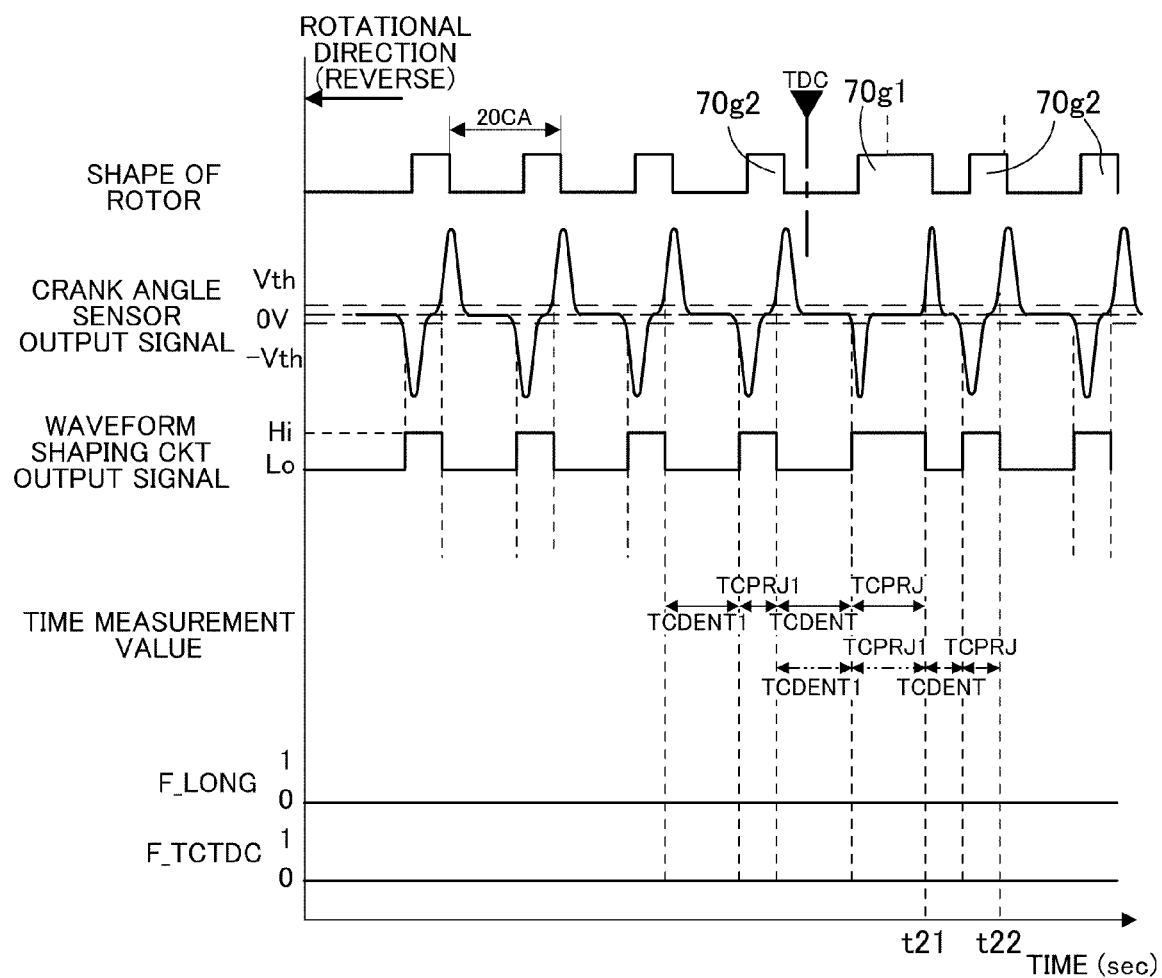
FIG. 29 is a time chart similar to FIG. 28, but for explaining detection of the crank angle reference position.

A crank angle reference position detection process when the crankshaft 42 is rotated reversely will be explained. FIG. 29 is a time chart similar to FIG. 28, but for explaining the process with the reversely rotating crankshaft 42.

As shown in FIG. 29, at the time t21 at which the reference projection 70g1 passes with the crankshaft 42 reversely rotated, a change between the ratios RTCPD and RTCPD1 (obtained by subtracting the ratio RTCPD1 from the ratio RTCPD) is less than that of when the crankshaft 42 is rotated forward, i.e., than the first determination threshold value A. Similarly, at the time t22 at which the projection 70g2 next of the reference projection 70g1 passes, as indicated by imaginary lines, the change between the ratios RTCPD1 and RTCPD (obtained by subtracting the ratio RTCPD from the ratio RTCPD1) is less than that of when the crankshaft 42 is rotated forward, i.e., than the second determination threshold value B.

As a result, when the crankshaft 42 is rotated reversely, the results in S1224 and S1230 are No, the crank angle reference position is not detected and a bit of the reference position detection flag F_TCTDC is not set to 1. Therefore, when a bit of the flag F_TCTDC is set from 0 to 1 and the crank angle reference position is detected after determining the reverse rotation of the crankshaft 42, a determination that the reverse rotation of the crankshaft 42 has returned to the forward rotation can be made (explained later).

Thus, when a change between the first ratio RTCPD (between the times TCPRJ and TCDENT measured in the present program loop) and the previous first ratio RTCPD1 (between the times TCPRJ1 and TCDENT1 measured in the preceding program loop) is calculated and the reference projection 70g1 is detected based on the calculated change, it makes possible to determine that the reverse rotation of the crankshaft 42 has returned to the forward one. Hence, the reference projection 70g1 functions as a forward rotation determination projection used for determining the return of the crankshaft 42 rotation to the forward one.

Returning to the FIG. 26 flowchart, the program proceeds to S1102, in which it is determined whether the rear end signal is outputted by the crank angle sensor 62. When the result is No, the remaining steps are skipped and when the result is Yes, in S1104, a first reverse/forward rotation determination process for determining the reverse rotation of the crankshaft 42 or the return thereof to the forward rotation is conducted based on the projection passing time TCPRJ, etc.

Figure 30:
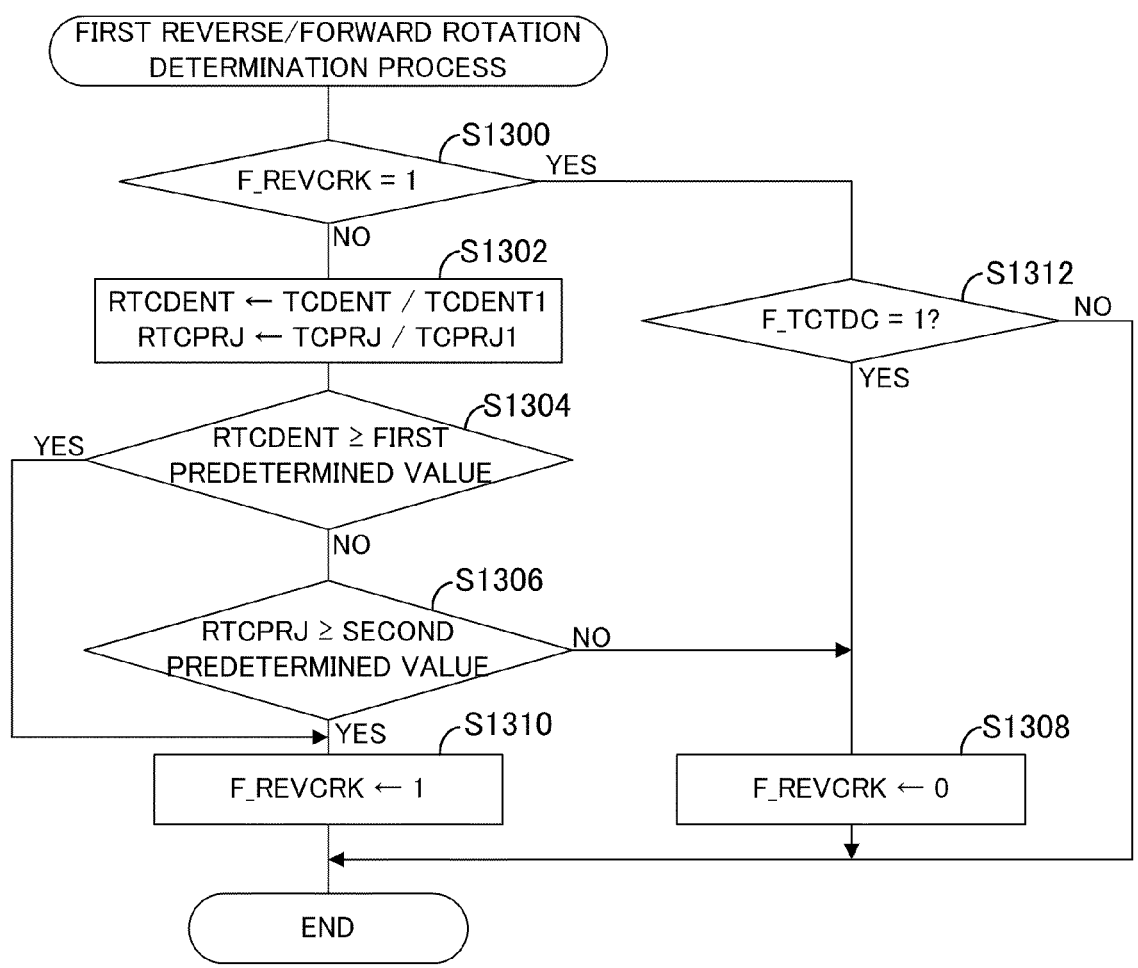
FIG. 30 is a subroutine flowchart showing a first reverse/forward rotation determination process in FIG. 26.
Figure 31:
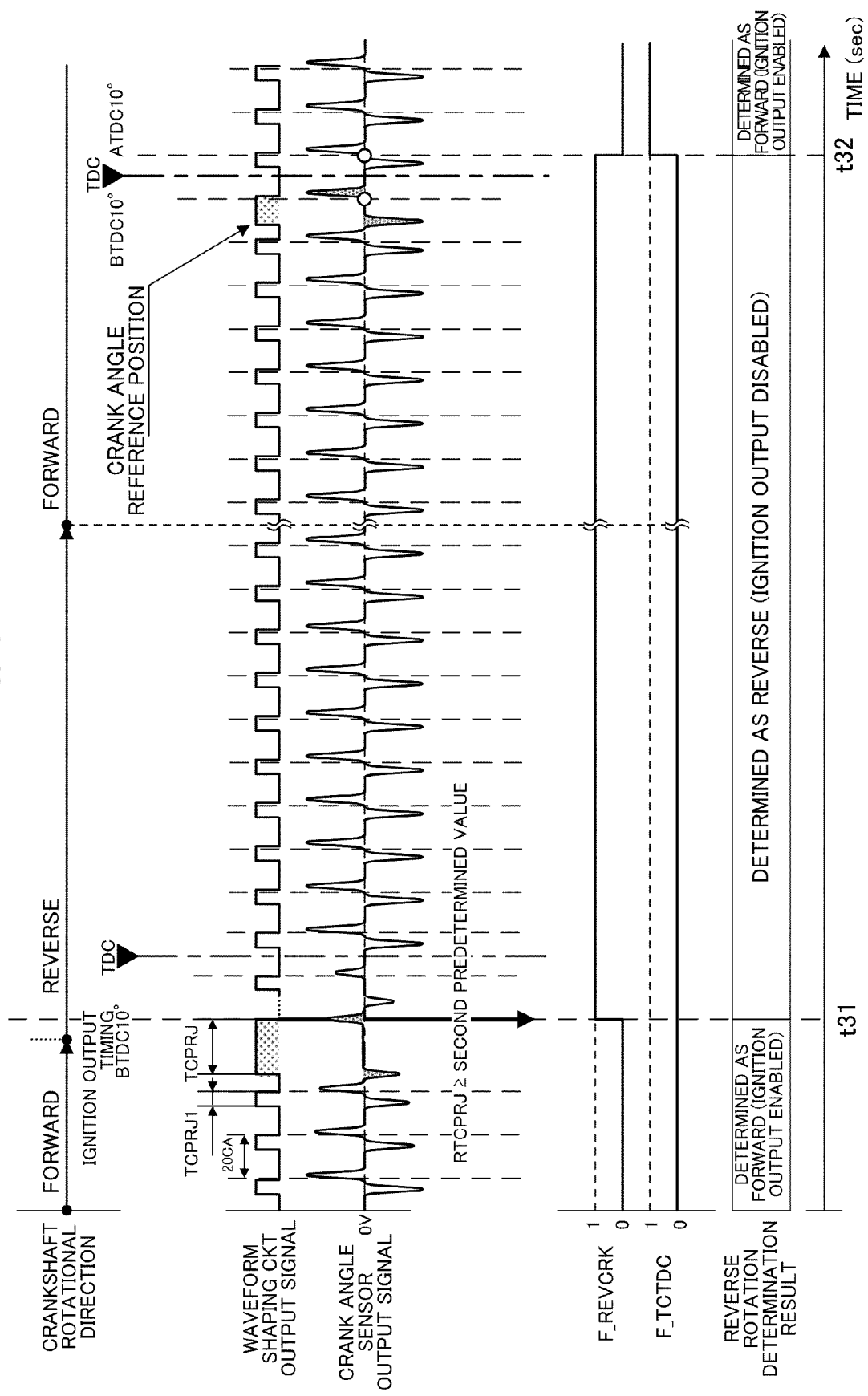
FIG. 31 is a time chart for explaining the first reverse/forward rotation determination process in FIG. 30.

FIG. 30 is a subroutine flowchart of the process of S1104 and FIG. 31 is a time chart for explaining the same.

As shown in FIG. 30, in S1300, it is determined whether a bit of a first reverse rotation determination flag F_REVCRK (described later) is 1. Since the initial value of the flag F_REVCRK is 0, the result in the first program loop is No and the program proceeds to S1302, in which a ratio (second ratio RTCDENT) of the between-projection passing time TCDENT to the previous between-projection passing time TCDENT1 is calculated and a ratio (third ratio RTCPRJ) of the projection passing time TCPRJ to the previous projection passing time TCPRJ1 is calculated. Specifically, the second and third ratios RTCDENT and RTCPRJ are calculated in accordance with the following Equations 2 and 3.

$$RTCDENT = TCDENT/TCDENT1 \quad \text{Eq. 2}$$

$$RTCPRJ = TCPRJ/TCPRJ1 \quad \text{Eq. 3}$$

Next, in S1304, it is determined whether the second ratio RTCDENT is equal to or greater than a first predetermined value. When the result in S1304 is No, in S1306, it is determined whether the third ratio RTCPRJ is equal to or greater than a second predetermined value. The processing of S1302 to S1306 is conducted to check as to whether the crankshaft 42 rotation is reverse.

The further explanation is made with reference to FIG. 31. In the case where the forward rotation is reversed, the crankshaft 42 gradually decreases in the rotational speed in the forward direction and stops, and then increases in the rotational speed in the reverse direction. Accordingly, at the time t31, due to the decreasing rotational speed and stop of the crankshaft 42, the present value of the projection passing time TCPRJ or between-projection passing time TCDENT becomes greater than the previous value.

Based on the foregoing fact, the processing of S1302 to S1306 is conducted to calculate the second and third ratios RTCDENT and RTCPRJ of the present values to the previous values of the times TCDENT and TCPRJ, and, when the second ratio RTCDENT is at or above the first predetermined value or the third ratio RTCPRJ is at or above the second predetermined value, determine that the rotation of the crankshaft 42 has been reversed. The first and second predetermined values are defined to be capable of determining the reverse of the crankshaft 42 rotation. FIG. 31 shows at the time t31 the case where the third ratio RTCPRJ is at or above the second predetermined value.

The explanation of FIG. 30 is resumed. When the result in S1306 is No, the program proceeds to S1308, in which a bit of the first reverse rotation determination flag F_REVCRK is reset to 0. When the result in S1304 or S1306 is Yes, the program proceeds to S1310, in which a bit of the flag F_REVCRK is set to 1. A bit of the flag F_REVCRK being set to 1 amounts to determining the reverse rotation of the crankshaft 42 based on the time TCPRJ or TCDENT, while that being reset to 0 amounts to determining the forward rotation thereof.

When a bit of the flag F_REVCRK is set to 1, the result in S1300 in the subsequent program loops is Yes and the program proceeds to S1312, in which it is determined whether a bit of the reference position detection flag F_TCTDC is 1. As mentioned above, since a determination that the crankshaft 42 rotation has returned to the forward one can be made when a bit of the flag F_TCTDC is set from 0 to 1 and the crank angle reference position is detected after the reverse rotation of the crankshaft 42 is determined, when the result in S1312 is Yes, the program proceeds to S1308, in which a bit of the flag F_REVCRK is reset to 0 (at the time t32). When the result in S1312 is No, the processing of S1308 is skipped.

Returning to the FIG. 26 flowchart, the program proceeds to S1106, in which a second reverse/forward rotation determination process for determining the reverse rotation of the crankshaft 42 or the return thereof to the forward rotation is conducted based on the AC voltage outputted by the generator 70.

Figure 32:
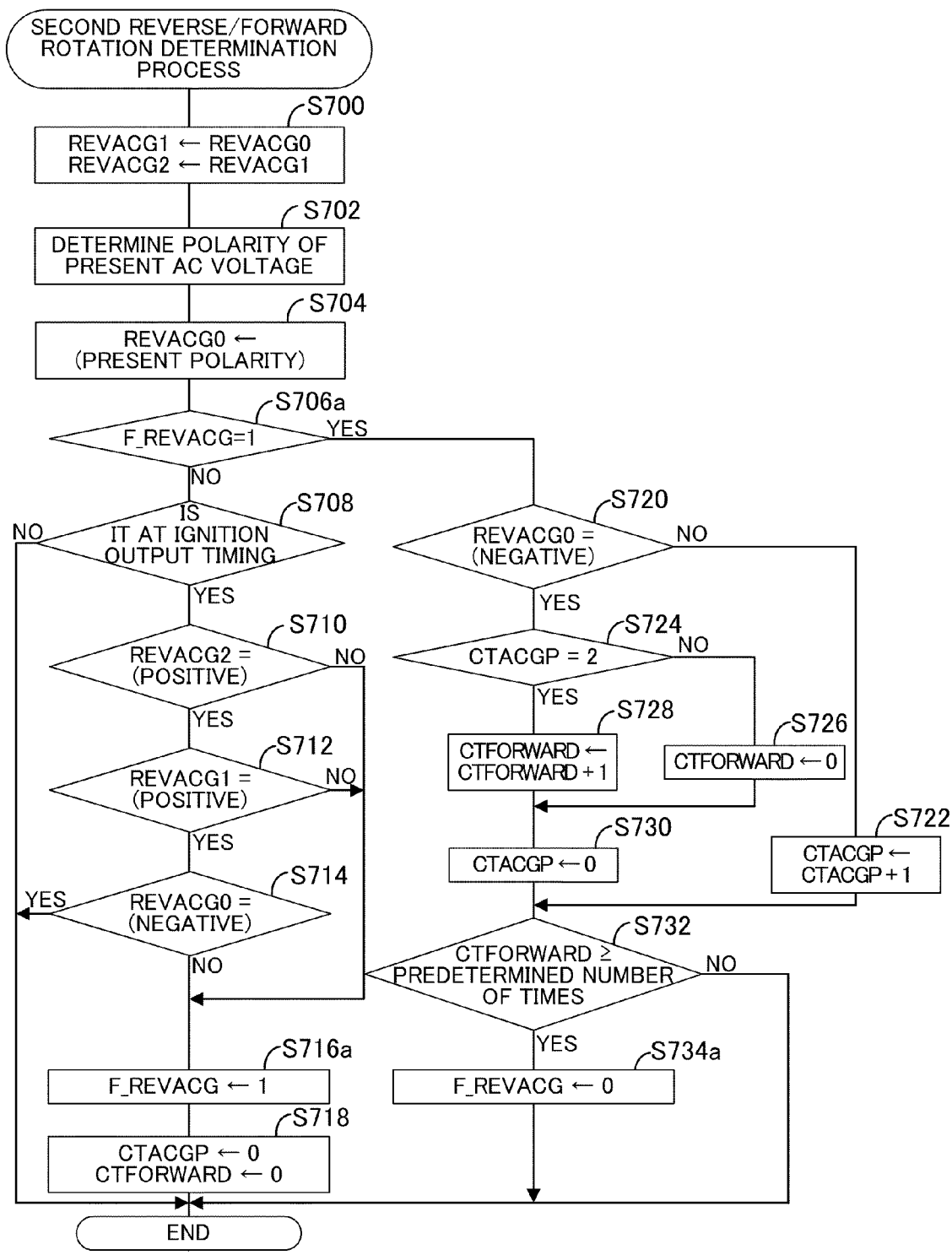
FIG. 32 is a subroutine flowchart showing a second reverse/forward rotation determination process in FIG. 26.

FIG. 32 is a subroutine flowchart of the process. As can be seen in FIG. 32, the process is substantially the same as the reverse rotation detection process in FIG. 21 explained in the fourth embodiment, so the explanation thereof is omitted. Note that the only difference between them is that the reverse rotation detection flag F_REVERSE in FIG. 21 is called a "second reverse rotation determination flag F_REVACG" in FIG. 32.

Returning to the FIG. 26 flowchart, the program proceeds to S1108, in which a reverse/forward rotation determination confirmation process for confirming determinations on the reverse rotation of the crankshaft 42 or the return thereof to the forward rotation made in S1104 and S1106 is conducted.

Figure 33:
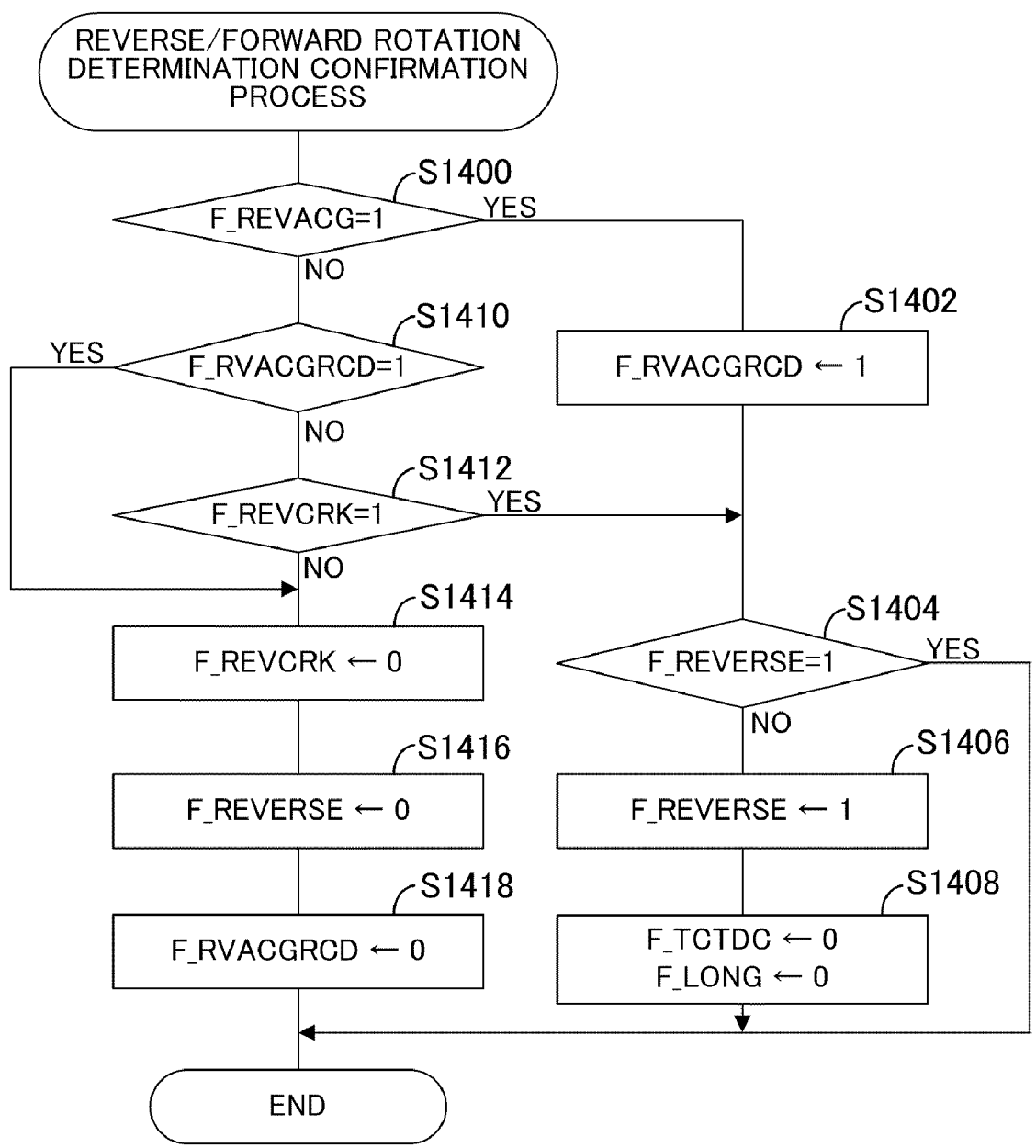
FIG. 33 is a time chart for explaining the second reverse/forward rotation determination process in FIG. 32.

FIG. 33 is a subroutine flowchart of the process.

In S1400, it is determined whether a bit of the second reverse rotation determination flag F_REVACG is 1. When the result is Yes, in S1402, a bit of a history flag F_RVACGRCD (initial value 0) is set to 1. A bit of the flag F_RVACGRCD being set to 1 means that there exists a history of determination of reverse rotation of the crankshaft 42 made in the second reverse/forward rotation determination process, and that being reset to 0 means there is no such a history.

Next, in S1404, it is determined whether a bit of the reverse rotation detection flag F_REVERSE is 1. Since the initial value of the flag F_REVERSE is 0, the result in the first program loop is No and the program proceeds to S1406, in which a bit of the flag F_REVERSE is set to 1. When a bit of the flag F_REVERSE is 0, the ignition and fuel injection of the engine 10 are conducted in a process described later, while, when it is 1, the ignition and fuel injection are disabled.

The program proceeds to S1408, in which bits of the reference position detection flag F_TCTDC and reference projection detection flag F_LONG are reset to 0, thereby preparing for a process of determining the return of the crankshaft 42 to the forward rotation, which is conducted by detecting the crank angle reference position. When a bit of the flag F_REVERSE is set to 1 in S1406, the result in S1404 in the subsequent loops becomes Yes, and the processing of S1406 and S1408 is skipped.

When the result in S1400 is No, in S1410, it is determined whether a bit of the flag F_RVACGRCD is 1. When the result in S1410 is No, the program proceeds to S1412, in which a bit of the flag F_REVCRK is 1 and when the result in S1412 is Yes, to steps of S1404 to S1408, in which a bit of the flag F_REVERSE is set to 1 in S1406 if it is 0, while the program is terminated if it is 1.

Thus, when the reverse rotation of the crankshaft 42 is determined in at least one of the first and second reverse/forward rotation determination processes which have different condition for determination (i.e., when at least one of the flags F_REVCRK and F_REVACG is 1), a bit of the flag F_REVERSE is set to 1 to confirm the determination of the reverse rotation, and then the ignition and fuel injection of the engine 10 are disabled.

When a result in S1400 is No in a program loop after the ignition and fuel injection are disabled, i.e., the return of the crankshaft 42 rotation to the forward one is determined and a bit of the flag F_REVACG is reset to 0 in the second reverse/forward rotation determination process, the program proceeds to S1410.

Since a bit of the flag F_RVACGRCD remains to be 1, a result in S1410 is Yes and the program proceeds to S1414, in which a bit of the first reverse rotation determination flag F_REVCRK is reset to 0. Specifically, when the return to the forward rotation is determined in the second reverse/forward rotation determination process after disabling the ignition and the like, a bit of the flag F_REVCRK is reset to 0 regardless of a result of the first reverse/forward rotation determination process.

Then, in S1416, a bit of the flag F_REVERSE is reset to 0 and in S1418, a bit of the flag F_RVACGRCD is reset to 0.

When a result in S1412 is No in a program loop after the ignition and fuel injection are disabled, i.e., the return of the crankshaft 42 rotation to the forward one is determined and a bit of the flag F_REVCRK is reset to 0 in the first reverse/forward rotation determination process, the processing of S1414 to S1418 is conducted.

Thus, when the return of the crankshaft 42 rotation to the forward rotation is determined in at least one of the first and second reverse/forward rotation determination processes which have different condition for determination (i.e., when at least one of the flags F_REVCRK and F_REVACG is reset to 0), a bit of the flag F_REVERSE is reset to 0 in S1416 to discontinue the reverse rotation detection and cancel the disabled condition of the ignition and fuel injection.

Returning to the FIG. 26 flowchart, the program proceeds to S1110, in which the ignition output process is conducted and to S1112, in which the fuel injection process is conducted. Since the processes are the same as those explained in the fourth embodiment (FIGS. 23 and 24), although the details thereof are omitted here, briefly speaking, when a bit of the flag F_REVERSE is 1, i.e., the crankshaft 42 is determined to be rotated reversely, the ignition and fuel injection are disabled, and when it is 0, i.e., the rotation of the crankshaft 42 is determined to be (or have returned to be) forward, the disabled condition is canceled.

Figure 34:
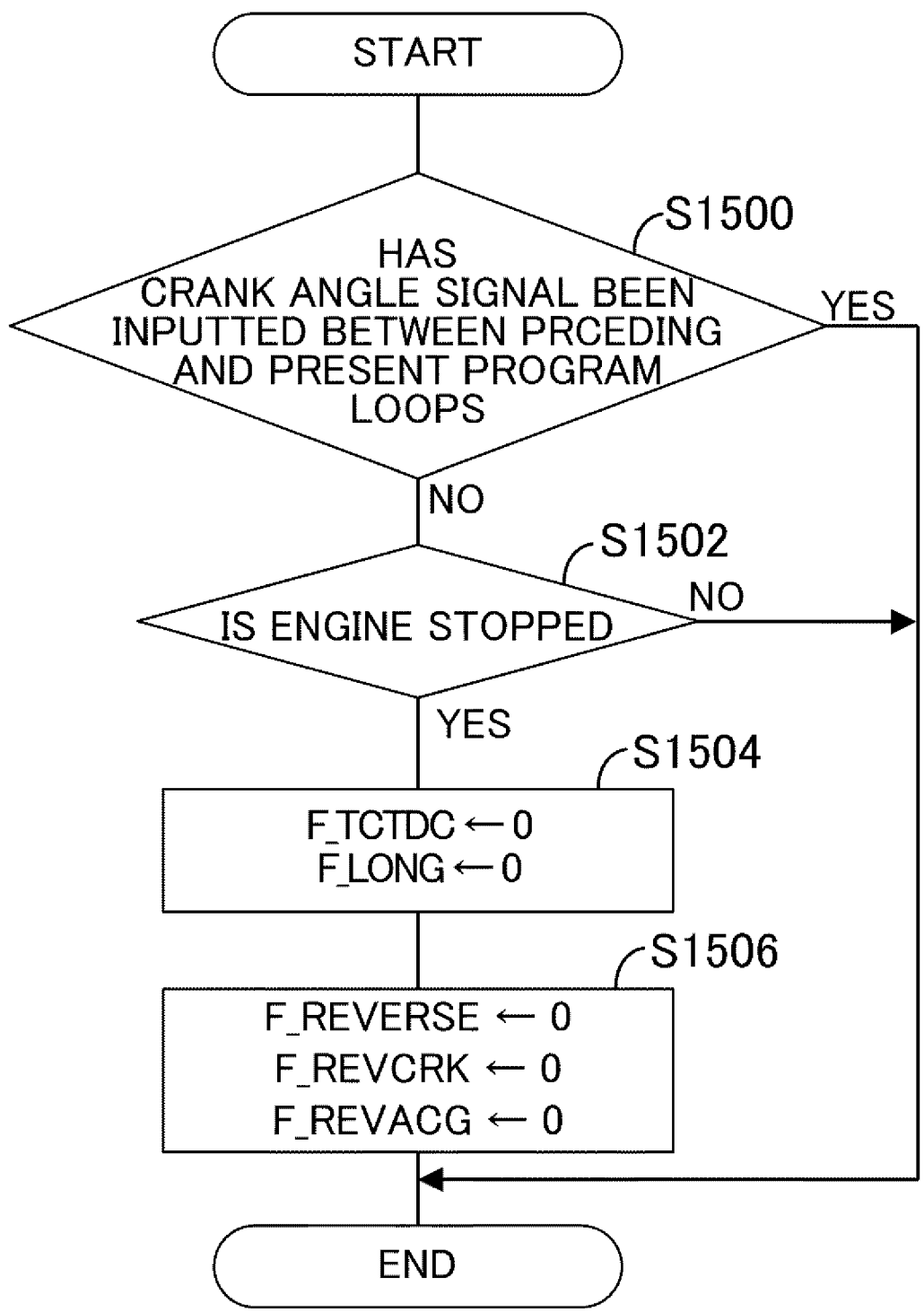
FIG. 34 is a flowchart showing the operation of the apparatus conducted in parallel with the FIG. 26 flowchart.

FIG. 34 is a flowchart similar to FIG. 25, but showing the operation conducted by the ECU 66 at predetermined interval, e.g., 5 milliseconds, in parallel with the FIG. 26 flowchart.

In S1500, it is determined whether the crank angle signal has been inputted from the crank angle sensor 62 between the preceding program loop and the present program loop. When the result is Yes, the remaining steps are skipped and when the result is No, the program proceeds to S1502, in which it is determined whether the engine 10 is stopped.

When the result in S1502 is No, the program is terminated and when the result is Yes, the program proceeds to S1504, in which bits of the reference position detection flag F_TCTDC and reference projection detection flag F_LONG are reset to 0, and to S1506, in which bits of the reverse rotation detection flag F_REVERSE and first and second reverse rotation determination flags F_REVCRK and F_REVACG are reset to 0. Thus, when the engine 10 is stopped, bits of the flags are reset to 0 to cancel the disabled condition of the ignition and fuel injection, thereby preparing for next execution of the program.

As stated in the foregoing, in the first and second embodiments, it is configured to have an apparatus for controlling an internal combustion engine (10) mounted on a vehicle, comprising: an engine speed detector (crank angle sensor 62, CPU 66*d*, S10) that detects speed (NE) of the engine; an ignition timing calculator (CPU 66*d*, S30) that calculates an ignition timing of the engine based on at least the detected engine speed; a load detector (CPU 66*d*, S12, S12*a*, S56, S100 to S116) that detects load (throttle opening TH, intake pressure bottom value PMBTM) in a compression stroke of the engine; and an ignition controller (ignition coil 34, ignition plug 36, ignition circuit 66*e*, CPU 66*d*) that controls the ignition timing to be the calculated timing (S34, S38), and controls the ignition timing to be a retarded timing than the calculated timing when the detected load is equal to or greater than a threshold value (first high load determination threshold value THHDIGINT1, PMHHDIGINT1, second high load determination threshold value THHDIGINT2, PMHHDIGINT2) (S14 to S28, S34 to S50, S18*a* to S28*a*, S42*a*, S44*a*). With this, even when the ignition timing is retarded, it becomes possible to avoid the unnecessary decrease of engine output which adversely affects driving feel of the operator of the vehicle on which the engine 10 is mounted, and effectively prevent the knocking and kickback from occurring. Specifically, by detecting the increase of load in the intake stroke of the engine 10, it becomes possible to accurately detect the increase in the compression load of intake air in the compression stroke next of the intake stroke, and since the ignition timing is retarded only when the compression load increase is detected, it becomes possible to avoid the unnecessary decrease of engine output which adversely affects driving feel of the operator of the vehicle. Also, the ignition timing is retarded in accordance with the increase in the compression load of intake air which causes the knocking and kickback, thereby effectively preventing the knocking and kickback from occurring.

In the apparatus, the ignition controller controls the ignition timing to be the retarded timing when the detected engine speed is equal to or less than a predetermined speed (hard ignition upper limit speed NEHARDIGH) and the detected load is equal to or greater than the threshold value (CPU 66*d*, S14 to S28, S32 to S50, S18*a* to S28*a*, S42*a*, S44*a*). In other words, the ignition timing is retarded only when the inertial energy of crankshaft 42 rotation is small and the engine speed is in the low speed area, such as idle speed, where the knocking and kickback likely occur. With this, the foregoing effects can be achieved further efficiently.

In the apparatus, the ignition controller controls the ignition timing to be a more retarded timing than the retarded timing when the detected load is equal to or greater than a second threshold value (second high load determination threshold value THHDIGINT2, PMHHDIGINT2) which is set greater than the threshold value (first high load determination threshold value THHDIGINT1, PMHHDIGINT1) (CPU 66*d*, S14 to S22, S34 to S42, S50, S18*a* to S22*a*, S42*a*). The ignition timing is retarded more when the further increase in the compression load of intake air is detected, thereby preventing the knocking and kickback further efficiently.

In the apparatus, the load detector has a throttle opening detector (throttle opening sensor 52, CPU 66*d*, S12) that detects opening of the throttle valve of the engine. With this, it becomes possible to accurately detect the engine load with the simple structure. Further, the throttle opening detector for detecting opening of the throttle valve 14 that is operated through the accelerator or throttle grip manipulated by the operator and responds to the manipulation, is applied as a load detector, thereby preventing the knocking and kickback from occurring more effectively.

In the apparatus, the load detector has an intake pressure detector (absolute pressure sensor 56, CPU 66*d*, S12*a*) that detects pressure in the intake pipe of the engine. With this, it becomes possible to accurately detect the engine load with the simple structure. Further, since variation in the pressure in the intake pipe 22 appears more remarkably in the low speed area, it becomes possible to accurately detect load change caused by manipulation of the accelerator.

In the third embodiment, the apparatus further includes a crank angle signal outputter (crank angle sensor 62) that sequentially outputs crank angle signals indicative of positions of a piston (40) with rotation of a crankshaft (42) of the engine at every predetermined rotational angle of the crankshaft; and a crank angle signal interval time measurer (CPU 66*d*, S204 to S210) that measures interval time (crank angle signal interval time TC) between the sequentially outputted crank angle signals, and the ignition controller has: an ignition command outputter (CPU 66*d*, S232, S238, S242, S248) that outputs an ignition command to an ignition unit (ignition coil 34, ignition circuit 66*e*) for igniting the engine in response to a predetermined crank angle signal (a crank angle signal at the BTDC10° in the case of the hard ignition or that at the ignition timer set timing of BTDC30° in the case of the calculation ignition) among the outputted crank angle signals; and an ignition command disabler (CPU 66*d*, S240) that disables outputting of the ignition command when interval time (TC6) between the predetermined crank angle signal and a crank angle signal outputted immediately before the predetermined crank angle signal is equal to or greater than a predetermined value (kickback prevention ignition cut upper limit value TCKICKBACK) which is set based on interval time (TC5) between a crank angle signal outputted when the piston is positioned at bottom dead center or thereabout and a crank angle signal immediately before that crank angle signal. In other words, since the threshold value to be compared with the engine speed of immediately before the ignition command is outputted is set based on the engine speed of near the BDC where the engine speed starts decreasing, a determination accurately reflecting degree of decrease in the engine speed can be used to determine whether the kickback occurs. As a result, it becomes possible to effectively prevent the occurrence of kickback.

In the apparatus, the predetermined value (TCKICKBACK) is set to increase with increasing of the interval time (TC5) between the crank angle signal outputted when the piston is positioned at the bottom dead center or thereabout and the crank angle signal immediately before that crank angle signal. Specifically, since the threshold value to be compared with the engine speed immediately before the ignition command is outputted is set to increase with decreasing engine speed of near the BDC, the same effects as above can be achieved.

In the apparatus, the ignition command disabler disables outputting of the ignition command when the interval time between the crank angle signal outputted when the piston is positioned at the bottom dead center or thereabout and the crank angle signal immediately before that crank angle signal exceeds a predetermined time period (predetermined value TCKICKBKJD) (CPU 66*d*, S300, S302). In other words, outputting of the ignition command is disabled when the engine speed of near the BDC is lower than a predetermined value. With this, in addition to the foregoing effects, since, for example, at the engine start, the ignition command is issued as normal until the engine speed of near the BDC reaches the full-firing engine speed, it becomes possible to avoid deterioration in the engine start performance.

In the fourth embodiment, it is configured to have an apparatus for controlling an internal combustion engine (10) mounted on a vehicle, comprising: a crank angle signal outputter (crank angle sensor 62) that outputs a crank angle signal at every predetermined crank angle of a crankshaft (42) of the engine; an AC generator (70) that generates AC voltage by being driven by rotation of the crankshaft; a polarity determiner (ECU 66, S600, S702) that determines a polarity of the AC voltage from the AC generator when the crank angle signal is outputted; a crankshaft rotation direction determiner (ECU 66, S600, S602, S716, S808, S812) that compares periods of the determined polarities of the AC voltage with forward rotation polarity periods which are exhibited when the crankshaft is rotated forward, and determines that the crankshaft is rotated forward when the periods of the determined polarities are identical with the forward rotation polarity periods and that the crankshaft is rotated reversely when they are not identical; and an ignition controller (ECU 66) that controls an ignition timing and has an ignition disabler (ECU 66) that disables an ignition of the engine when reverse rotation of the crankshaft is determined (S600, S602, S716, S808, S812) and cancels the disabled condition of the ignition of the engine when the periods of the determined polarities are identical with the forward rotation polarity periods after the reverse rotation of the crankshaft is determined (S600, S602, S706, S720 to S734, S808, S810).

Thus, since it is configured to determine the polarity of the AC voltage from the generator 70 when the crank angle signal is outputted, and determine that the crankshaft 42 is rotated forward when the periods of the determined polarities are identical with the forward rotation polarity periods, while determining that the crankshaft 42 is reversely rotated when they are not identical and then disabling the ignition of the engine 10. With this, it becomes possible to accurately detect the reverse rotation of the crankshaft 42 and disable the ignition so that a reverse rotation load does not affect the crankshaft 42, etc., thereby avoiding a damage of the engine body.

Also, the disabled condition of the ignition is canceled when the periods of the determined polarities are identical with the forward rotation polarity periods after the reverse rotation of the crankshaft 42 is determined, i.e., when the return of the crankshaft 42 rotation to the forward one is detected. With this, it becomes possible to avoid canceling the ignition disabled condition while the crankshaft 42 rotation is reverse, specifically, it can be canceled at the appropriate timing. Even when the operator operates the engine 10 to restart before the engine 10 is stopped, if the crankshaft 42 is rotated forward, the ignition disabled condition can be canceled, thereby improving the restart performance.

In the apparatus, the crankshaft rotation direction determiner determines whether the periods of the determined polarities are identical with the forward rotation polarity periods every time the crank angle signal is outputted and determines that the reverse rotation of the crankshaft is returned to forward rotation when number of times that the identical condition is established reaches a predetermined number of times (two times) after the reverse rotation of the crankshaft is determined (S600, S720 to S734). With this, it becomes possible to accurately detect the return of the reverse rotation of the crankshaft 42 to the forward rotation and the ignition disabled condition can be canceled at the more appropriate timing.

The apparatus includes a fuel injection disabler (ECU 66, S600, S604, S716, S904, S908) that disables fuel injection of the engine when the reverse rotation of the crankshaft is determined, and the fuel injection disabler cancels the disabled condition of the fuel ignition of the engine when the periods of the determined polarities are identical with the forward rotation polarity periods after the reverse rotation of the crankshaft is determined (S600, S604, S706, S720 to S734, S904, S906).

Thus, since the fuel injection of the engine 10 is disabled when the reverse rotation of the crankshaft 42 is detected, a load caused by the reverse rotation does not affect the crankshaft 42, etc., and a damage of the engine body can be avoided more reliably. In other words, the fuel injection disabled condition is canceled when the return of the crankshaft 42 rotation to the forward one is detected. With this, it becomes possible to avoid canceling the fuel injection disabled condition while the crankshaft 42 rotation is reverse, specifically, it can be canceled at the appropriate timing. Even when the operator operates the engine 10 to restart before the engine 10 is stopped, if the crankshaft 42 is rotated forward, the fuel injection disabled condition can be canceled and the fuel injection is conducted, thereby improving the restart performance.

In the fifth embodiment, the apparatus includes a plurality of reverse rotation determiners (ECU 66, first and second reverse/forward rotation determination processes, S1104, S1106) that determine whether forward rotation of the crankshaft of the engine is reversed based on different conditions for determining the reverse rotation; and a plurality of forward rotation return determiners (ECU 66, first and second reverse/forward rotation determination processes, S1100 to S1106) that determine whether the reverse rotation of the crankshaft is returned to the forward rotation based on different conditions for determining return to the forward rotation, and the ignition disabler disables the ignition of the engine when the reverse rotation of the crankshaft is determined by at least one of the reverse rotation determiners and cancels the disabled condition of the ignition when the return of the reverse rotation of the crankshaft to the forward rotation is determined by at least one of the forward rotation return determiners (S1104 to S1110, S1308, S734a, S1416).

Owing to this configuration, it becomes possible to accurately detect the reverse rotation of the crankshaft 42 and disable the ignition so that a reverse rotation load does not affect the crankshaft 42, etc., thereby avoiding a damage of the engine body. Further, since the ignition disabled condition is canceled when the return of the crankshaft 42 rotation to the forward rotation is detected by not all the multiple reverse/forward rotation determiners but at least one of them, the cancellation can be made at the appropriate early timing, thereby improving the restart performance.

In the apparatus, at least one of the reverse rotation determiners determines the reverse rotation of the crankshaft when the periods of the determined polarities are not identical with the forward rotation polarity periods (S1106, S710 to S716), and at least one of the forward rotation return determiners determines the return of the reverse rotation of the crankshaft to the forward rotation when the periods of the determined polarities are identical with the forward rotation polarity periods (S1106, S706, S720 to S734). With this, it becomes possible to detect the return of the crankshaft 42 rotation to the forward rotation further accurately.

The apparatus includes a plurality of projections (70g (reference projection 70g1, other projections 70g2)) that have predetermined length in circumferential direction and are installed at equal angular interval on circumference of a rotor (70a) which is rotated in association with the crankshaft; a projection position signal outputter (crank angle sensor 62) that is installed at a static position (crank case 10a) to face the projections and outputs a front end signal indicative of a front end position of each of the projections and a rear end signal indicative of a rear end position thereof; and a time measurer (ECU 66, S1100, S1200 to S1214) that measures a projection passing time (TCPRJ) from when the front end signal is outputted to when the rear end signal is outputted and a between-projection passing (TCDENT) time from when the rear end signal is outputted to when a front end signal of next one of the projections is outputted (ECU 66, S1100, S1200 to S1214), and at least one of the reverse rotation determiners determines the reverse rotation of the crankshaft based on the measured projection passing time and the measured between-projection passing time (S1104, S1302 to S1306, S1310), and at least one of the forward rotation return determiners determines the return of the reverse rotation of the crankshaft to the forward rotation based on the measured projection passing time and the measured between-projection passing time (S1100, S1104, S1218 to S1236, S1300, S1308, S1312). With this, it becomes possible to detect that the crankshaft 42 rotation is reversed and returns to the forward rotation further accurately.

In the apparatus, the time measurer measures the projection passing time and the between-projection every time the front end signal or rear end signal is outputted (S1100, S1200 to S1214), and the reverse rotation determiner determines the reverse rotation of the crankshaft when a ratio (second ratio RTCDENT) of the between-projection passing time measured this time to that previously measured (previous between-projection passing time TCDENT1) is equal to or greater than a first predetermined value or when a ratio (third ratio RTCPRJ) of the projection passing time measured this time to that previously measured (previous projection passing time TCPRJ1) is equal to or greater than a second predetermined value (S1104, S1302 to S1306, S1310). With this, it becomes possible to detect that the crankshaft 42 rotation is reversed further accurately.

In the apparatus, one of the projections is a forward rotation determination projection (reference projection 70g1) formed different in length in the circumferential direction from remainder of the projections (70g2), the time measurer measures the projection passing time and the between-projection passing time every time the front end signal or rear end signal is outputted (S1100, S1200 to S1214), and the one of the forward rotation return determiners calculates a change between a ratio (first ratio RTCPD) of the projection passing time (TCPRJ) to the between-projection passing time (TCDENT) both measured this time and a ratio (previous first ratio RTCPD1) of the projection passing time (TCPRJ1) to the between-projection passing time (TCDENT1) both previously measured and determines the return of the reverse rotation of the crankshaft to the forward rotation when the forward rotation determination projection is detected based on the change (S1100, S1104, S1218 to S1236, S1300, S1308, S1312). With this, it becomes possible to detect the return of the crankshaft 42 rotation to the forward rotation further accurately so that the ignition disabled condition can be canceled at the more appropriate timing.

The apparatus includes a fuel injection disabler (ECU 66) that disables fuel injection of the engine when the reverse rotation of the crankshaft is determined by at least one of the reverse rotation determiners (S1104, S1106, S1112, S1310, S716a, S1406), and cancels the disabled condition of the fuel ignition of the engine when the return of the reverse rotation of the crankshaft to the forward rotation is determined by at least one of the forward rotation return determiners (S1104, S1106, S1112, S1308, S734a, S1416).

Owing to this configuration, a reverse rotation load does not affect the crankshaft 42, etc., thereby avoiding a damage of the engine body more reliably. Further, since the fuel injection disabled condition is canceled when the return of the crankshaft 42 rotation to the forward rotation is detected by not all the multiple reverse/forward rotation determiners but at least one of them, the cancellation can be made at the appropriate early timing, thereby further improving the restart performance.

It should be noted that the motorcycle is used as an example of the vehicle, but it is not limited thereto and can be a four-wheel vehicle.

It should also be noted that, in the fourth and fifth embodiments, although the forward rotation polarity periods have the polarity order of positive, positive and negative, it may be changed in accordance with specification of the generator 70.

It should also be noted that, although the predetermined number of times to be compared with a value of the counter CTFORWARD, the displacement of the engine 10, etc., are indicated with specific values in the foregoing, they are only examples and not limited thereto.

It should further be noted that, in the fifth embodiment, although the reference projection 70g1 is longer in the length in the circumferential direction than the other projections 70g2, it may be shorter. In that sense, in claim 17, it is described "one of the projections is a forward rotation determination projection formed different in length in the circumferential direction from remainder of the projections." The first and second determination threshold values A, B and first and second predetermined values are defined in accordance with the length.

Japanese Patent Application Nos. 2009-037460 and 2009-037461 both filed on Feb. 20, 2009 and Japanese Patent Application Nos. 2009-055422 and 2009-055423 both filed on Mar. 9, 2009, are incorporated by reference herein in its entirety.

While the invention has thus been shown and described with reference to specific embodiments, it should be noted that the invention is in no way limited to the details of the described arrangements; changes and modifications may be made without departing from the scope of the appended claims.

What is claimed is:

1. An apparatus for controlling an internal combustion engine mounted on a vehicle, comprising:
   an engine speed detector that detects speed of the engine;
   an ignition timing calculator that calculates an ignition timing of the engine based on at least the detected engine speed;
   a load detector that detects load in an intake stroke of the engine to determine whether a load of compressing intake air is increased in a next compression stroke of the engine; and
   an ignition controller that controls the ignition timing to be the calculated timing, and controls the ignition timing to be a retarded timing than the calculated timing when the detected load is equal to or greater than a threshold value.

2. The apparatus according to claim 1, wherein the ignition controller controls the ignition timing to be the retarded timing when the detected engine speed is equal to or less than a predetermined speed and the detected load is equal to or greater than the threshold value.

3. The apparatus according to claim 1, wherein the ignition controller controls the ignition timing to be a more retarded timing than the retarded timing when the detected load is equal to or greater than a second threshold value which is set greater than the threshold value.

4. The apparatus according to claim 1, wherein the load detector has a throttle opening detector that detects opening of the throttle valve of the engine.

5. The apparatus according to claim 1, wherein the load detector has an intake pressure detector that detects pressure in the intake pipe of the engine.

6. The apparatus according to claim 1, further including:
   a crank angle signal outputter that sequentially outputs crank angle signals indicative of positions of a piston with rotation of a crankshaft of the engine at every predetermined rotational angle of the crankshaft; and
   a crank angle signal interval time measurer that measures interval time between the sequentially outputted crank angle signals,
   and the ignition controller has:
   an ignition command outputter that outputs an ignition command to an ignition unit for igniting the engine in response to a predetermined crank angle signal among the outputted crank angle signals; and
   an ignition command disabler that disables outputting of the ignition command when interval time between the predetermined crank angle signal and a crank angle signal outputted immediately before the predetermined crank angle signal is equal to or greater than a predetermined value which is set based on interval time between a crank angle signal outputted when the piston is positioned at bottom dead center or thereabout and a crank angle signal immediately before that crank angle signal.

7. The apparatus according to claim 6, wherein the predetermined value is set to increase with increasing of the interval time between the crank angle signal outputted when the piston is positioned at the bottom dead center or thereabout and the crank angle signal immediately before that crank angle signal.

8. The apparatus according to claim 6, wherein the ignition command disabler disables outputting of the ignition command when the interval time between the crank angle signal outputted when the piston is positioned at the bottom dead center or thereabout and the crank angle signal immediately before that crank angle signal exceeds a predetermined time period.

9. An apparatus for controlling an internal combustion engine mounted on a vehicle, comprising:

an engine speed detector that detects speed of the engine;

an ignition timing calculator that calculates an ignition timing of the engine based on at least the detected engine speed;

a load detector that detects load in an intake stroke of the engine to determine whether a load of compressing intake air is increased in a next compression stroke of the engine; and an ignition controller that controls the ignition timing to be the calculated timing, and controls the ignition timing to be a retarded timing than the calculated timing when the detected load is equal to or greater than a threshold value;

wherein the ignition controller controls the ignition timing to be a more retarded timing than the retarded timing when the detected load is equal to or greater than a second threshold value which is set greater than the threshold value.

* * * * *